(12) United States Patent
Word

(10) Patent No.: US 9,843,528 B2
(45) Date of Patent: Dec. 12, 2017

(54) CLIENT SELECTION IN A DISTRIBUTED STRICT QUEUE

(71) Applicant: Amazon Technologies, Inc., Reno, NV (US)

(72) Inventor: Jonathan Brian Word, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 768 days.

(21) Appl. No.: 14/318,216

(22) Filed: Jun. 27, 2014

(65) Prior Publication Data

US 2015/0381511 A1 Dec. 31, 2015

(51) Int. Cl.
*G06F 15/16* (2006.01)
*H04L 12/863* (2013.01)

(52) U.S. Cl.
CPC .................................. *H04L 47/50* (2013.01)

(58) Field of Classification Search
None
See application file for complete search history.

(56) References Cited

U.S. PATENT DOCUMENTS

| | | | |
|---|---|---|---|
| 7,003,644 B2 | 2/2006 | Heath et al. | |
| 7,023,856 B1 * | 4/2006 | Washabaugh | H04L 12/5601 370/395.1 |
| 7,454,751 B2 | 11/2008 | Sun et al. | |
| 7,840,611 B2 | 11/2010 | Potter et al. | |
| 7,843,928 B2 | 11/2010 | Pike et al. | |
| 8,514,872 B2 * | 8/2013 | Williams | H04M 3/523 370/412 |
| 2003/0041073 A1 | 2/2003 | Collier | |
| 2006/0218279 A1 * | 9/2006 | Yamaguchi | H04L 67/1008 709/226 |
| 2008/0263564 A1 | 10/2008 | Gambino | |
| 2012/0047518 A1 | 2/2012 | Parkinson et al. | |
| 2013/0081060 A1 | 3/2013 | Otenko | |
| 2014/0207918 A1 * | 7/2014 | Kowalski | H04L 41/0803 709/220 |
| 2015/0058484 A1 * | 2/2015 | Mehta | H04L 67/10 709/225 |

OTHER PUBLICATIONS

U.S. Appl. No. 14/073,513, filed Nov. 6, 2013, Jonathan Brian Word.

(Continued)

*Primary Examiner* — Natisha Cox
(74) *Attorney, Agent, or Firm* — Robert C. Kowert; Meyertons, Hood, Kivlin, Kowert, Goetzel, P.C.

(57) ABSTRACT

Methods and systems for implementing client selection in a distributed strict queue are disclosed. A plurality of messages are distributed to a plurality of queue servers based on strict order parameters for the messages. Messages that share a value for the strict order parameter are distributed to the same queue server. The messages are enqueued at the queue servers. Messages that share a value for the strict order parameter are enqueued in a strict order based on the time of receipt at the queue server. One or more queue clients are selected to process the enqueued messages. The queue clients are selected based on their message processing capability along with the message processing throughput for values for the strict order parameter.

20 Claims, 51 Drawing Sheets

(56) References Cited

OTHER PUBLICATIONS

U.S. Appl. No. 14/073,517, filed Nov. 6, 2013, Jonathan Brian Word.
U.S. Appl. No. 14/318,171, filed Jun. 27, 2014, Jonathan Brian Word.
U.S. Appl. No. 14/318,177, filed Jun. 27, 2014, Jonathan Brian Word.
U.S. Appl. No. 14/318,184, filed Jun. 27, 2014, Jonathan Brian Word.
U.S. Appl. No. 14/318,200, filed Jun. 27, 2014, Jonathan Brian Word.
U.S. Appl. No. 14/318,213, filed Jun. 27, 2014, Jonathan Brian Word.
U.S. Appl. No. 14/318,224, filed Jun. 27, 2014, Jonathan Brian Word.

* cited by examiner

CLIENT SELECTION IN A DISTRIBUTED STRICT QUEUE

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

For example, a queuing service may be implemented using a distributed system in a manner that prioritizes high availability and redundancy. However, prior approaches for implementing a distributed queuing service may present messages out of their intended order. Additionally, prior approaches for implementing a distributed queuing service may present a message more than the number of intended times (e.g., once). The presentation of messages out of their intended order and the presentation of messages more than once may pose problems for applications that require strict queue behavior.

Figure 1:
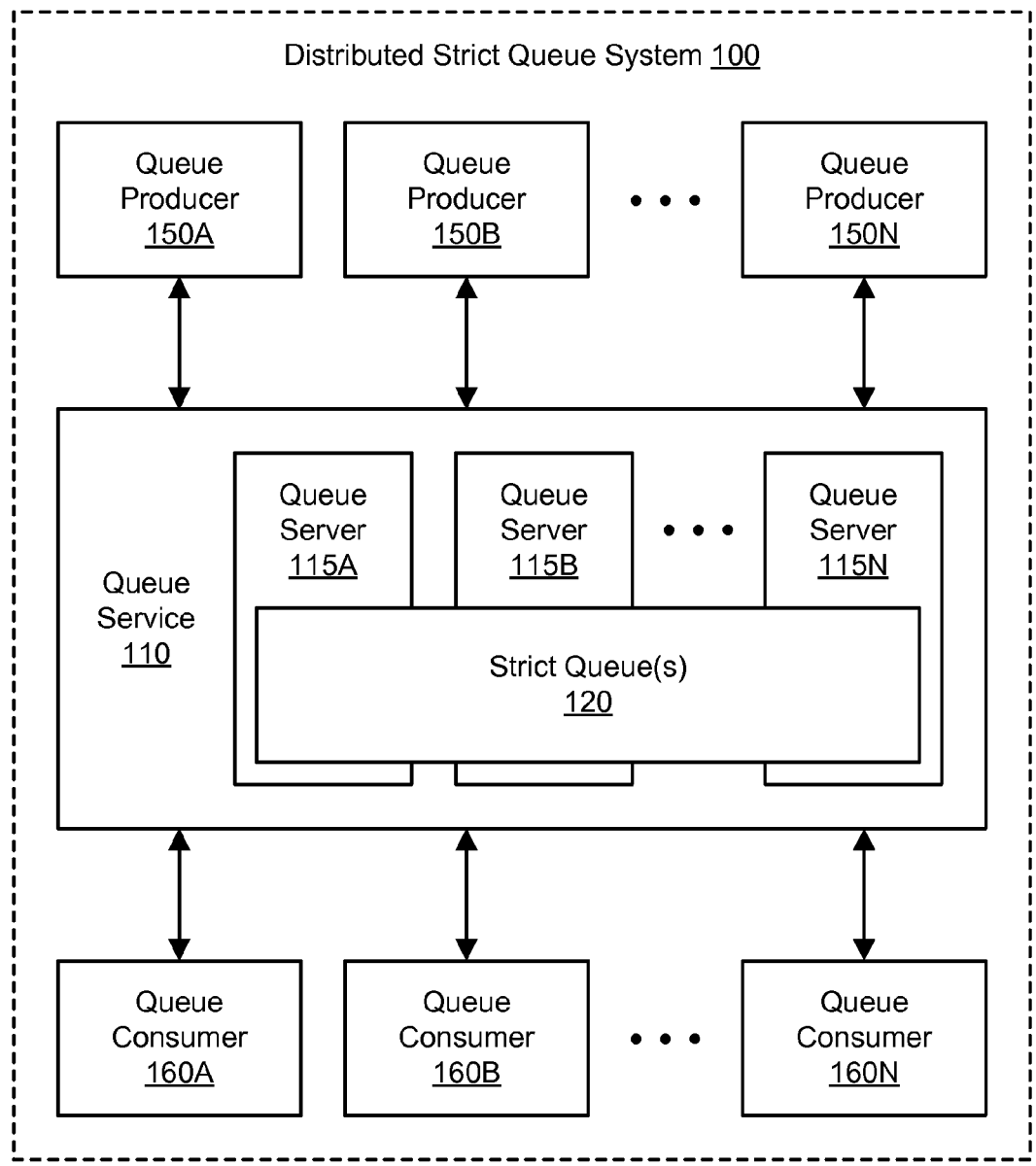
FIG. 1 illustrates an example system environment for strict queue ordering in a distributed system, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing strict queue ordering in a distributed system are described. In a distributed strict queue system with multiple queue servers, each queue server may be assigned a portion of a range of values for a strict order parameter. Based on the value of its strict order parameter, an incoming message may be forwarded to the appropriate queue server for the value of the strict order parameter, and the queue server may assign a sequence identifier to the message. The message may then be presented in the intended order with respect to other messages with the same value for the strict order parameter. Additionally, each message may be delivered to a queue consumer once and only once in the distributed strict queue system.

In one embodiment, the queue system may batch messages in a manner that preserves the strict order guarantee and the guaranteed once delivery. In one embodiment, the queue system may select and/or provision queue clients based on system parameters, performance metrics, and/or cost considerations. In one embodiment, the queue system may control queue clients using control messages. For example, control messages may be used to update a client configuration or client software. In one embodiment, queue clients may generate log data for attempted message processing, and the queue system may perform various failure management functions using the log data. In one embodiment, the queue system may use a network proxy for network traffic involving the queue clients; in this manner, the queue system may restrict network interactions for any of the client or otherwise isolate any of the clients. In one embodiment, the queue system may use geographical awareness techniques to improve the performance, cost, and/or risk in the system. In one embodiment, a multi-tiered processing algorithm may use the strict queues to generate a final result following transformation, summarization, and aggregation phases.

Distributed Strict Queue System

FIG. 1 illustrates an example system environment for strict queue ordering in a distributed system, according to one embodiment. A distributed strict queue system 100 may include a plurality of queue producers (e.g., queue producers 150A and 150B through 150N), a queue service 110 implemented using a plurality of queue servers (e.g., queue servers 115A and 115B through 115N), and a plurality of queue consumers (e.g., queue consumers 160A and 160B through 160N). The queue producers 150A-150N may represent various clients, client accounts, computing instances, resources, processes, or any suitable combinations thereof. Each of the queue producers 150A-150N may supply one or more messages to the queue service 110 to be enqueued. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. As will be described in greater detail below, the queue service 110 may implement one or more strict queues 120 in which messages with the same value for a strict order parameter (also referred to as a strict order identifier) are presented in their intended order. The queue consumers 160A-160N may pull the messages from the strict queue(s) 120 and execute or otherwise implement the messages. In one embodiment, the queue service 110 may deliver each message only once.

In one embodiment, the strict queue(s) 120 may include messages associated with different values for a strict order parameter. Messages with the same value for the strict order parameter may be enqueued in the correct order relative to each other. However, for messages with different values for the strict order parameter, the queue service 110 may use a "best effort" ordering technique that is not guaranteed to present messages with different values for the strict order parameter in the correct order. The best effort ordering may result in some messages with different values for the strict order parameter being processed by queue clients in a different order than the messages were received by the queue service 110. Accordingly, the strict queue(s) 120 may be strict for messages with the same value for the strict order parameter and non-strict for messages with different values for the strict order parameter.

It is contemplated that the distributed strict queue system 100 may include additional components not shown, fewer components than shown, or different combinations, configurations, or quantities of the components shown. For example, although three queue producers 150A, 150B, and 150N are shown for purposes of example and illustration, it is contemplated that different quantities and combinations of queue producers may be used. Additionally, although three queue servers 115A, 115B, and 115N are shown for purposes of example and illustration, it is contemplated that different quantities and combinations of queue servers may be used. Furthermore, although three queue consumers 160A, 160B, and 160N are shown for purposes of example and illustration, it is contemplated that different quantities and combinations of queue consumers may be used.

Figure 36:
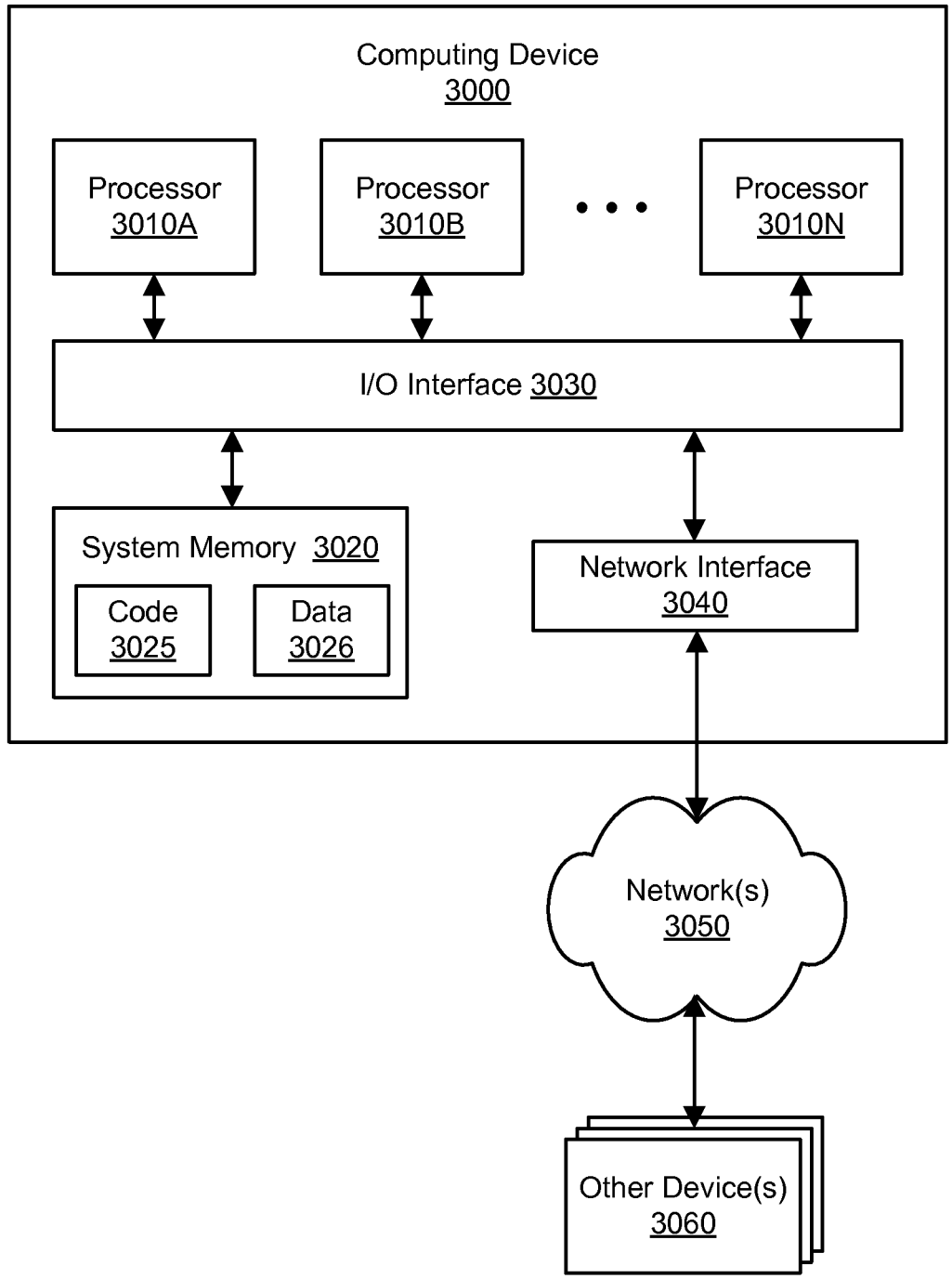
FIG. 36 illustrates an example of a computing device that may be used in some embodiments.

The distributed strict queue system 100 may comprise one or more computing devices, any of which may be implemented by the example computing device 5000 illustrated in FIG. 36. In various embodiments, portions of the functionality of the distributed strict queue system 100, including the queue producers 150A-150N, queue servers 115A-115N, and/or queue consumers 160A-160N, may be provided by the same computing device or by any suitable number of different computing devices. If any of the components of the distributed strict queue system 100 are implemented using different computing devices, then the components and their respective computing devices may be communicatively coupled, e.g., via a network. Each of the illustrated components may represent any combination of software and hardware usable to perform their respective functions.

In some embodiments, the queue servers 115A-115N and queue consumers 160A-160N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 36.

In one embodiment, a suitable component of the distributed strict queue system 100 may select and/or provision the queue servers 115A-115N and/or queue consumers 160A-160N. For example, the queue servers 115A-115N and/or queue consumers 160A-160N may be provisioned from a suitable pool of available computing instances. In one embodiment, additional computing instances may be added to the queue servers 115A-115N and/or queue consumers 160A-160N as needed. In one embodiment, computing instances may be returned to the pool of available computing instances from the queue servers 115A-115N and/or queue consumers 160A-160N if the computing instances are not needed at a particular point in time.

In one embodiment, the functionality of the distributed strict queue system 100 may be provided to clients using a provider network. For example, the functionality of the distributed strict queue system 100 may be presented to clients as a web-accessible service. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resources. In one embodiment, queue resources may be reserved on behalf of clients using a client-accessible service that implements the distributed strict queue system 100. According to one such embodiment, a distributed strict queue system 100 in such an environment may receive specifications for the various messages to be enqueued, e.g., a description of one or more tasks and an indication of a source of input data to be used by the task(s). In response, the distributed strict queue system 100 may enqueue and execute the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

In one embodiment, the client may use one or more suitable interfaces (such as one or more web pages, an application programming interface [API], or a command-line interface [CLI]) to provide the various messages to be enqueued and otherwise configure the distributed strict queue system 100. In one embodiment, the client may be able to view the current status of the messages using the interface(s). In one embodiment, additional information about messages in the distributed strict queue system 100 may be available via the interface(s), such as program output, error logs, exception logs, and so on.

Figure 2A:
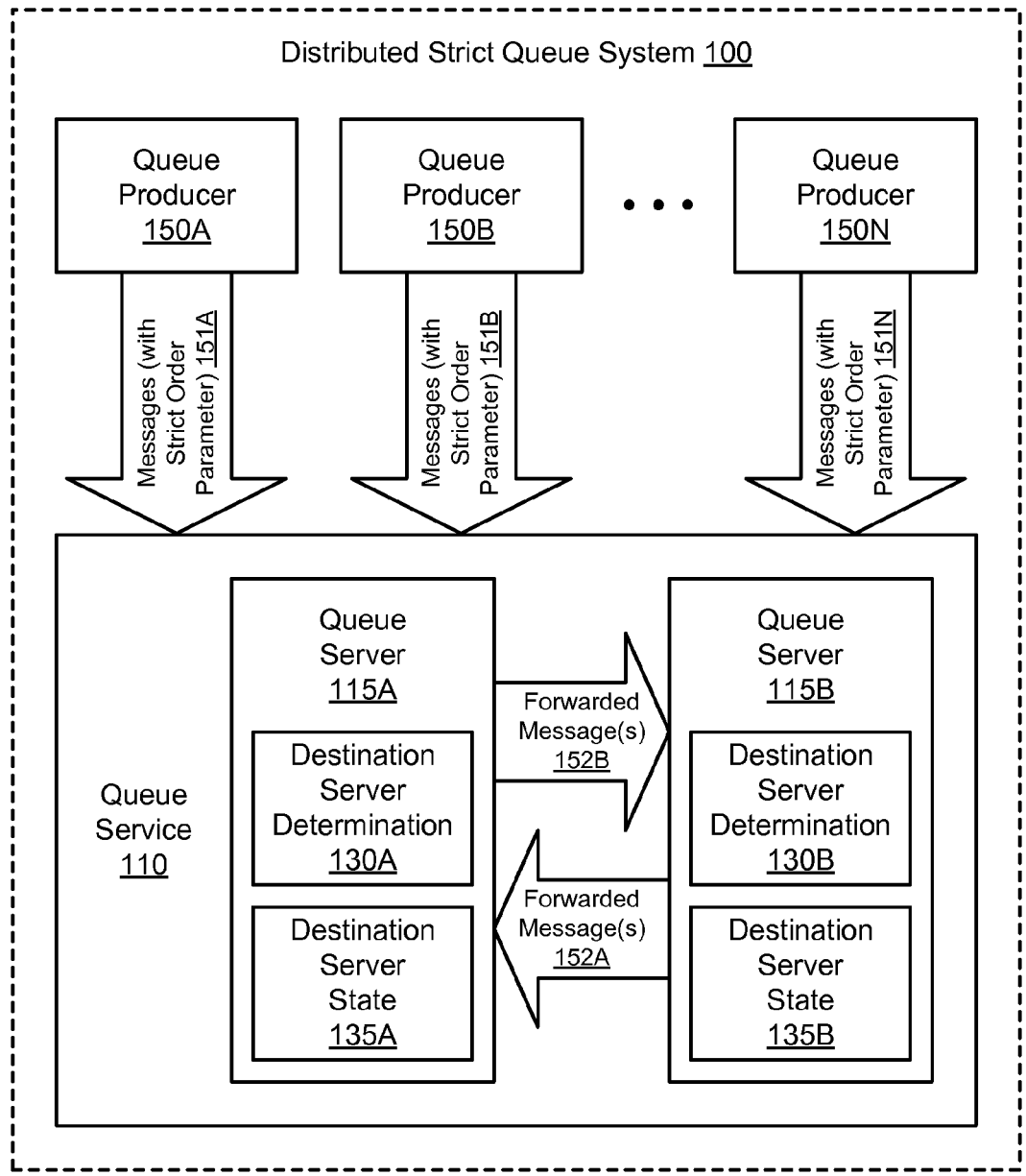
FIGS. 2A and 2B illustrate an example system environment for implementing message forwarding with strict queue ordering in a distributed system, according to one embodiment.
Figure 2B:
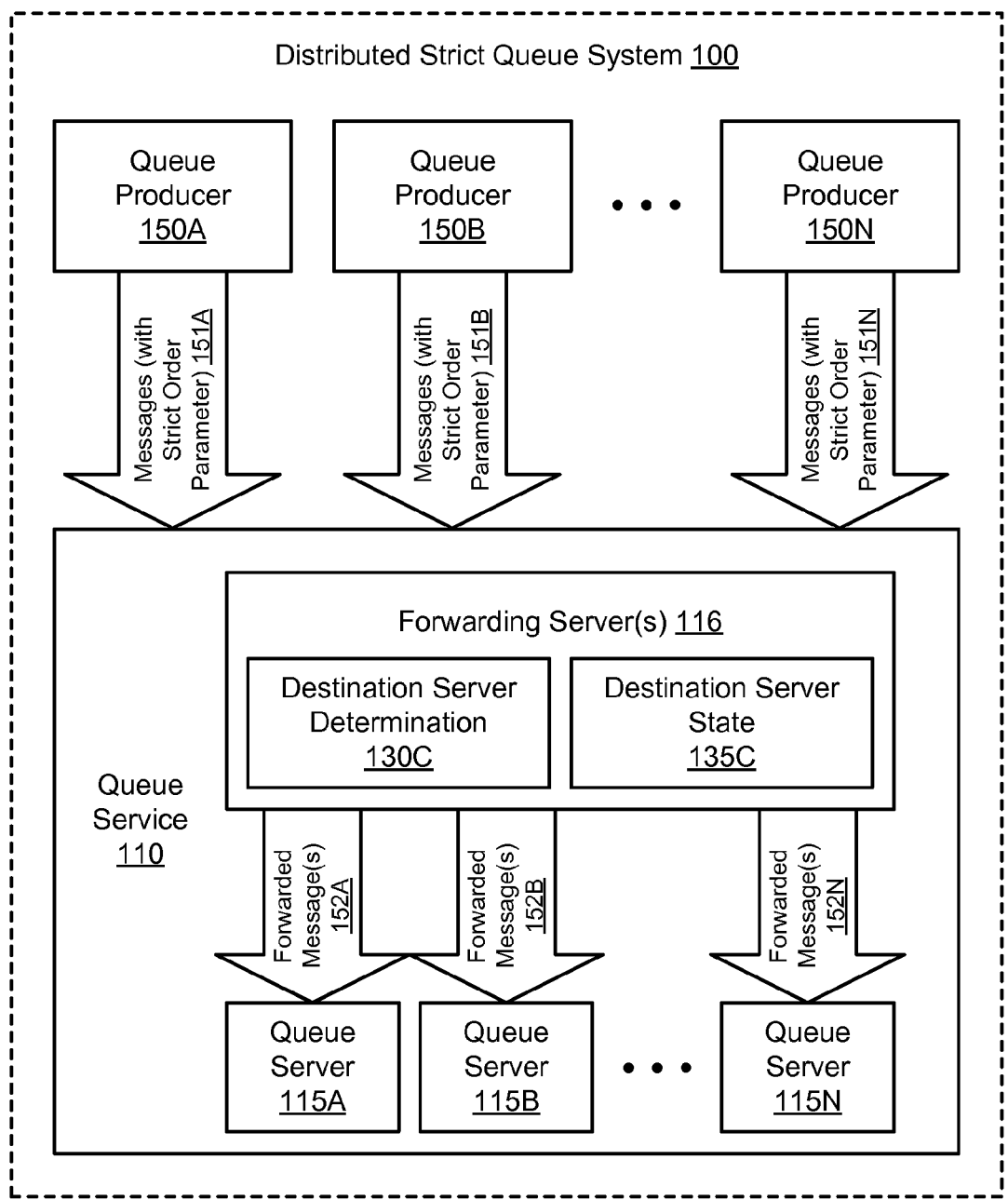

FIGS. 2A and 2B illustrate an example system environment for implementing message forwarding with strict queue ordering in a distributed system, according to one embodiment. Each queue producer may provide a set of messages to the queue service 110 over time. For example, the queue producer 150A may provide messages 151A, the queue producer 150B may provide messages 151B, and the queue producer 150N may provide messages 151N. Each message may include a strict order parameter (i.e., a value for the strict order parameter). In one embodiment, the strict order parameter may be assigned by a queue producer within the distributed strict queue system 100. In one embodiment, different queue producers may produce messages that share the same value for the strict order parameter. Additionally, a single queue producer may produce messages that have different values for the strict order parameter. The messages 151A-151N may be received by the queue service 110 at various points in time.

In one embodiment, the messages 151A-151N may be received by one or more designated instances of the queue servers 115A-115N. As shown in FIG. 2A, for example, the messages 151A-151N may be received by substantially any of the queue servers, such as queue server 115A and queue server 115B, for example. Based on the value of the strict order parameter associated with a message, the queue server that initially receives the message from the corresponding queue producer may forward the message to a particular queue server that is associated with that value of the strict order parameter.

In one embodiment, a range of values for the strict order parameter may be divided among the queue servers 115A-115N such that a particular one of the queue servers may be responsible for handling messages identified by each value of the strict order parameter. The range of values may include any collection of values, and the values may include integers, alphanumeric values, binary values, etc. In one embodiment, each value of the strict order parameter may be assigned to one and only one of the queue servers 115A-115N. In one embodiment, any of the queue servers 115A-115N may be responsible for one or more values of the strict order parameter.

The value of the strict order parameter for a message, or a basis for the value, may be generated by the corresponding queue producer. For example, the value of the strict order parameter may be a string, a binary value, or an integer. In one embodiment, a stable hash function may be applied by the initial recipient queue servers to the values of the strict order parameter as expressed in incoming messages. In this manner, the various initial values for the strict order parameter may be standardized to a particular length and/or data type within a known range for more efficient handling by the queue service 110. As used herein, the term "strict order parameter" may refer to the original strict order parameter (or the value thereof) associated with a message or to the result of a hash function that uses the original strict order parameter as input. In one embodiment, a message may be forwarded to an appropriate queue server (i.e., a destination server) based on the hash value.

In one embodiment, each of the queue servers 115A-115N that is configured to receive incoming messages from the queue producers 150A-150N may include functionality for destination server determination. For example, the queue server 115A may include a module 130A that implements the destination server determination functionality, and the queue server 115B may include a module 130B that implements the destination server determination functionality. Using the destination server determination module 130A or 130B, the corresponding queue server may compare the value of the strict order parameter of an incoming message to the range of values assigned to the various queue servers. The destination server determination module 130A or 130B may implement the destination server determination functionality using any suitable technique, such as the use of a lookup function that maps an input value representing a strict order parameter to an output value representing a queue server. The destination server determination module 130A or 130B may determine the identity of the queue server to which the message should be forwarded, i.e., the destination queue server, based on the value of the strict order parameter for the message. The queue server 115A may forward one or more messages 152B to the queue server 115B based on one or more values of the strict order parameter, and the queue server 115B may forward one or more messages 152A to the queue server 115A based on one or more values of the strict order parameter.

The value of the strict order parameter for the message may be within the range of values assigned to the destination queue server. The output of the destination server determination functionality may be stored for later reference using a module for storage of the destination server state. For example, the queue server 115A may include a module 135A that implements the destination server state functionality, and the queue server 115B may include a module 135B that implements the destination server state functionality. In one embodiment, the destination server state 135A or 135B may represent a whole or partial list of active servers within the queue service 110.

In one embodiment, the destination server determination modules 130A and 130B and/or the states 135A and 135B may change if one or more new queue servers become active in the distributed strict queue system 100, if one or more queue servers stop being active or are removed from the distributed strict queue system 100, or if the range of values of the strict order parameter is otherwise reassigned to the queue servers. For example, the range of strict order parameters may be rebalanced if a set of messages with a particular value for the strict order parameter begins placing excessive demands on the resources of the particular queue server assigned to that value of the strict order parameter. In such circumstances, the load for the particular queue server may be reduced by reassigning one or more values of the strict order parameter to another queue server. As another example, if the load provided by a set of messages with a particular value for the strict order parameter decreases sufficiently, the responsible queue server may be assigned additional values of the strict order parameter so that it may optimize its resource usage. In one embodiment, queue servers 110 may be added to the distributed strict queue system 100 or removed from the distributed strict queue system 100 as needed to handle the current load and/or anticipated load.

As shown in FIG. 2B, one or more components 116 may be configured to serve as an interface between the queue producers 150A-150N and the queue servers 115A-115N. Each of the component(s) 116 may be referred to as a forwarding server. Although one forwarding server 116 is shown for purposes of example and illustration, it is contemplated that different quantities and combinations of forwarding servers may be used. The forwarding server(s) 116 may be implemented by the example computing device 5000 illustrated in FIG. 36. In one embodiment, each forwarding server 116 may be provisioned from among the queue servers 115A-115N. The one or more forwarding servers 116 may be used to receive messages from the queue producers 150A-150N and forward each message to the appropriate queue server based on the value of the strict order parameter for the message. For example, the one or more forwarding servers 116 may forward one or more messages 152A to the queue server 115A based on one or more values of the strict order parameter, one or more messages 152B to the queue server 115B based on one or more values of the strict order parameter, and one or more messages 152N to the queue server 115N based on one or more values of the strict order parameter. As discussed above with reference to FIG. 2A, each forwarding server 116 may include a module 130C for destination server determination and a module 135C for destination server state storage. The forwarding server(s) 116 may be used with the distributed strict queue system 100 on any suitable basis, e.g., a queue-by-queue or account-by-account basis.

If the queue producer for a message does not supply a value for the strict order parameter, then a value may be generated by another entity within the distributed strict queue system 100, such as the queue server or forwarding server that initially receives the message from the queue producer. The value for the strict order parameter may be generated using any suitable technique, including uniform random selection from a range of possible values (e.g., within the same range of values assigned to the various queue servers 115A-115N) or round-robin selection from a range of possible values. The ranges of values may be a parameter of the distributed strict queue system 100 or configurable per strict queue.

Figure 3A:
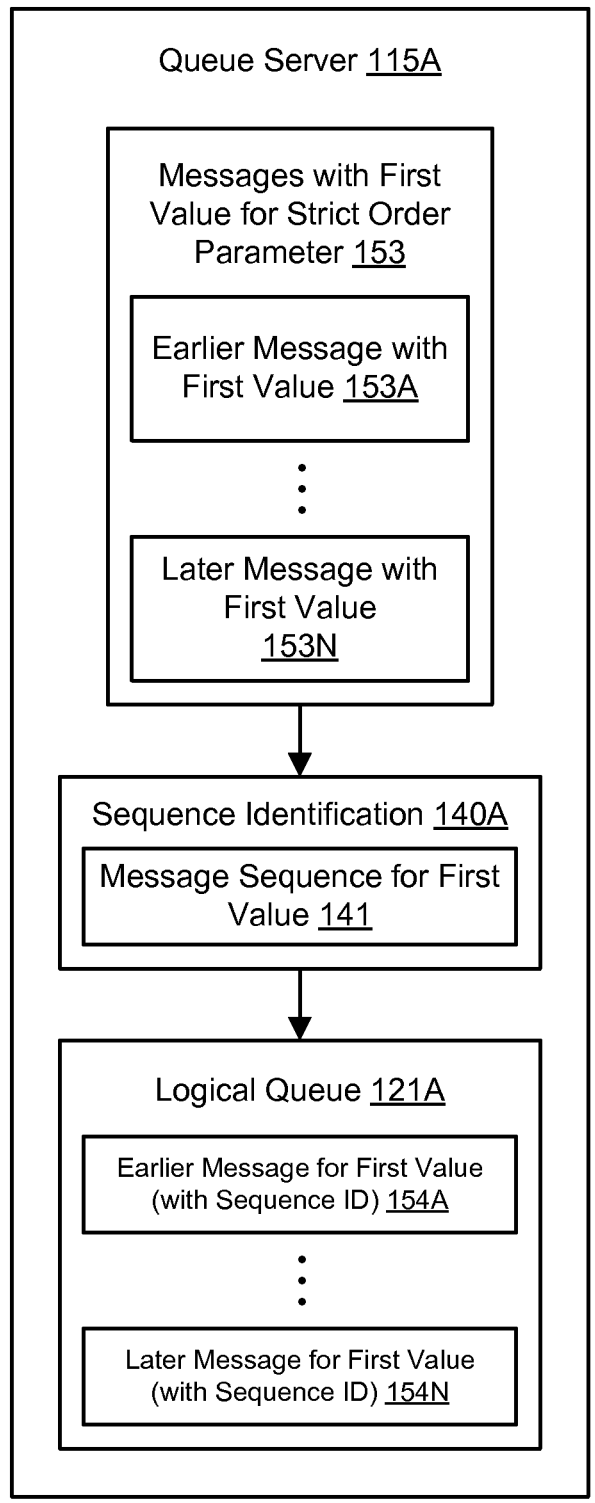
FIGS. 3A and 3B illustrate aspects of queue server functionality in an example system environment for strict queue ordering in a distributed system, according to one embodiment.
Figure 3B:
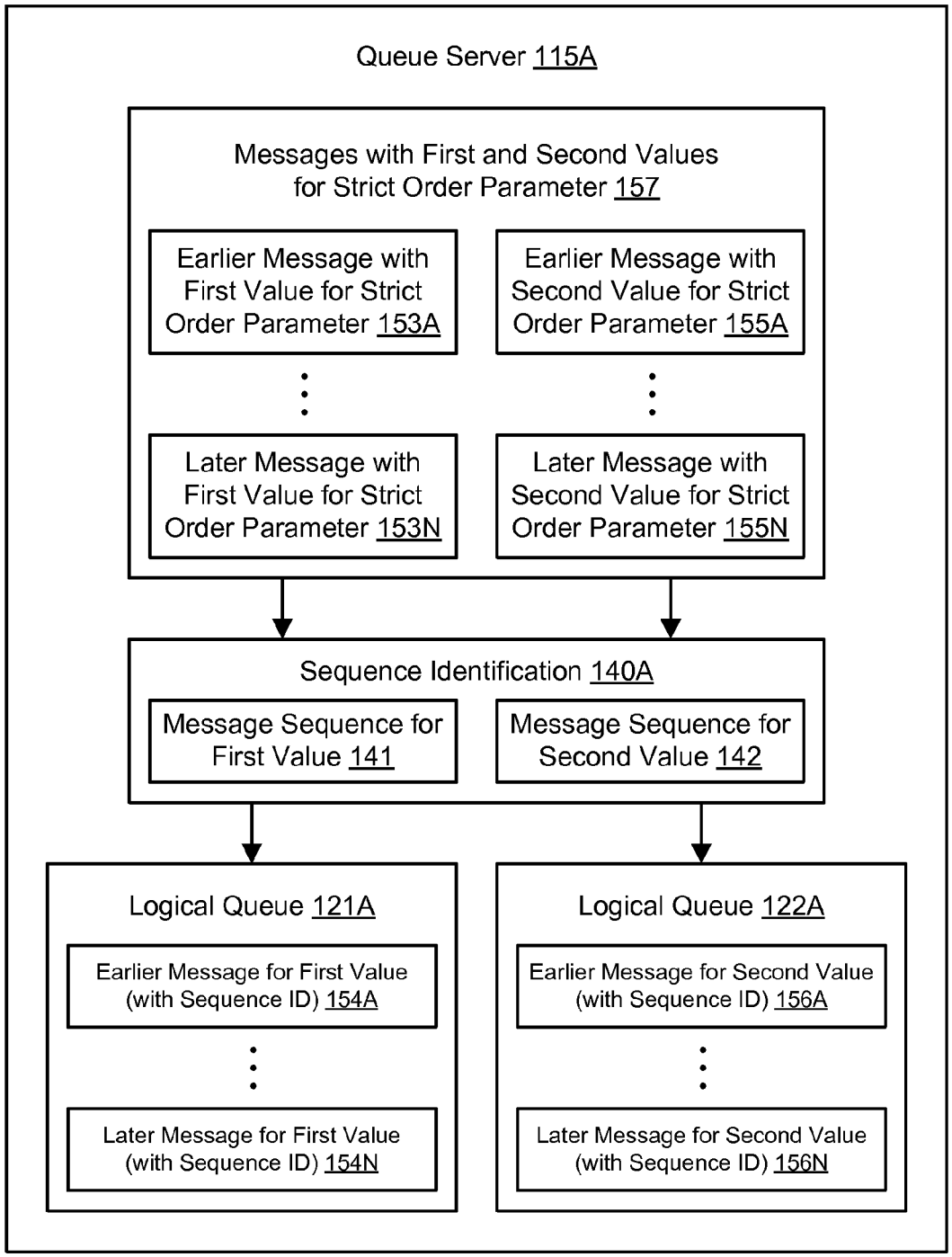

FIGS. 3A and 3B illustrate aspects of queue server functionality in an example system environment for strict queue ordering in a distributed system, according to one embodiment. Although the queue server functionality is illustrated with reference to queue server 115A, it is contemplated that the same or similar functionality may be implemented by any of the queue servers 115A-115N in the distributed strict queue system 100. At least one of the values of the strict order parameter may be assigned to the queue server 115A. Accordingly, the queue server 115A may receive messages 153 with a first value for the strict order parameter from one or more of the queue producers 150A-150N. The messages may be received at different points in time. For example, the messages 153 may include an earlier message 153A and a later message 153N. Any suitable number of messages may be received by the queue server 115A. As discussed above, the messages 153 may be forwarded to the queue server 115A from another one of the queue servers or from a forwarding server based on the strict order parameters within the messages.

The queue server 115A may include a sequence identification functionality 140A. In one embodiment, each incoming message within the range of strict order parameters assigned to the queue server 115A may undergo sequence identification using the sequence identification functionality 140A. The sequence identification functionality 140A may employ any suitable technique to assign each incoming message a place in a message sequence for the corresponding value of the strict order parameter. For example, the sequence identification functionality 140A may generate a message sequence 141 for the first value based on the messages 153 received over time. The message sequence 141 may indicate an ordering of the messages based on the time of receipt at the queue server 115A. The time of receipt may be based on the time of receipt of the first byte received, the time of receipt of the last byte received, or any time in between. Accordingly, the message sequence 141 for the first value may place the earlier message 153A before the later message 153N.

The sequence identification functionality 140A may assign a sequence identifier to each message. Each sequence identifier may indicate a respective position in the message sequence for the message, where the respective position is based on the time of receipt (e.g., the time of receipt of the first byte received, the time of receipt of the last byte received, or any time in between). In one embodiment, the sequence identifier may include a timestamp (e.g., indicating the time of receipt) and/or an ordinal number indicating the relative position of the message in a sequence associated with a particular value of the strict order parameter. In one embodiment, the sequence identification functionality 140A may remember the last sequence identifier for a particular value of the strict order parameter as long as the particular value is active in the distributed strict queue system 100 and associated with new messages provided to the queue server 115A. If the particular value of the strict order parameter has not been associated with a new message since the last message was delivered to a queue customer, then the message sequence for that particular value may be discarded. The message sequence may be restarted (e.g., from the beginning value) if the one or more queue providers resume sending messages with the particular value of the strict order parameter to the queue server 115A.

After the sequence identifier has been added to an incoming message, the queue server 115A may enqueue the message in a logical queue 121A. In one embodiment, a logical queue may be managed by a single queue server (e.g., server 115A) and may contain only those messages associated with a particular value for the strict order parameter. The logical queue 121A may be strictly ordered for messages with a particular value of the strict order parameter. By referencing the sequence identifiers for messages 153 having a particular value of the strict order parameter, the messages 153 may be added to the logical queue 121A in the order in which the messages were received by the queue server 115A that is designated to handle the particular value. As a result, the logical queue 121A may include the messages for a particular value of the strict order parameter in a strict order relative to each other. For example, the earlier message (with a sequence identifier) with the first value 154A and the later message (with a sequence identifier) with the first value 154N may be enqueued in the correct order relative to each other.

As shown in FIG. 3B, the queue server 115A may receive messages 157 having different values for the strict order parameter. Although the queue server functionality is illustrated with reference to queue server 115A, it is contemplated that the same or similar functionality may be implemented by any of the queue servers 115A-115N in the distributed strict queue system 100. At least two of the values of the strict order parameter may be assigned to the queue server 115A, e.g., within a range of values assigned to the queue server 115A. Accordingly, the queue server 115A may receive a set of messages 157 from one or more of the queue producers 150A-150N, where the set of messages 157 includes both messages with a first value for the strict order parameter and messages with a second value for the strict order parameter. The messages 157 may be received at different points in time. For example, the messages 157 may include an earlier message 153A and a later message 153N with the first value, and the messages 157 may also include an earlier message 155A and a later message 155N with the second value. Any suitable number of messages may be received by the queue server 115A. As discussed above, the messages 157 may be forwarded to the queue server 115A from another one of the queue servers or from a forwarding server based on the strict order parameters within the messages.

The queue server 115A may include a sequence identification functionality 140A. In one embodiment, each incoming message within the range of strict order parameters assigned to the queue server 115A may undergo sequence identification using the sequence identification functionality 140A. The sequence identification functionality 140A may employ any suitable technique to assign each incoming message a place in a message sequence for the corresponding value for the strict order parameter. For example, the sequence identification functionality 140A may generate a message sequence 141 for the first value based on the messages 153A-153N with the first value received over time, and the sequence identification functionality 140A may generate a message sequence 142 for the second value based on the messages with the second value 155A-155N received over time. Each message sequence 141 and 142 may indicate an ordering of the messages based on the time of receipt at the queue server 115A. The time of receipt may be based on the receipt of the first byte of the message or the receipt of the last byte of the message. Accordingly, the message sequence 141 for the first value may place the earlier message 153A before the later message 153N, and the message sequence 142 for the second value may place the earlier message 155A before the later message 155N.

As discussed above, the sequence identification functionality 140A may assign a sequence identifier to each message. Each sequence identifier may indicate a respective position in the message sequence for the message, where the respective position is based on the time of receipt (e.g., of the first byte or last byte). In one embodiment, the sequence identifier may include a timestamp (e.g., indicating the time of receipt) and/or an ordinal number indicating the relative position of the message in a sequence associated with a particular value of the strict order parameter.

After the sequence identifier has been added to an incoming message, the queue server 115A may enqueue the message in a logical queue 121A for the first value of the strict order parameter or in a logical queue 122A for the second value of the strict order parameter. In one embodiment, each logical queue 121A and 122A may be managed by a single queue server (e.g., server 115A) and may contain only those messages associated with a particular value for the strict order parameter. The logical queue 121A may be strictly ordered for messages with the first value of the strict order parameter, and the logical queue 122A may be strictly ordered for messages with the second value of the strict order parameter. By referencing the sequence identifiers for messages having particular values of the strict order parameter, the messages may be added to the appropriate logical queue 121A or 122A in the order in which the messages were received by the queue server 115A that is designated to handle the particular values. As a result, the logical queue 121A may include the messages for the first value of the strict order parameter in a strict order relative to each other, and the logical queue 122A may include the messages for the second value of the strict order parameter in a strict order relative to each other. For example, the earlier message (with a sequence identifier) with the first value 154A and the later message (with a sequence identifier) with the first value 154N may be enqueued in the correct order relative to each other. Additionally, the earlier message (with a sequence identifier) with the second value 156A and the later message (with a sequence identifier) with the second value 156N may be enqueued in the correct order relative to each other In one embodiment, the strict queue(s) 120 may include a plurality of logical queues such as logical queues 121A and 122A. Each of the logical queues may be managed by a single queue server and may correspond to a particular value for the strict order parameter. Messages with the same value for the strict order parameter may be enqueued in the correct order relative to each other. However, for messages with different values for the strict order parameter, the queue service 110 may use a "best effort" ordering technique that is not guaranteed to present messages with different values for the strict order parameter in the correct order. The best effort ordering may result in some messages with different values for the strict order parameter being placed in the queue(s) 120 in a different order than the messages were received by the queue service 110. Accordingly, the strict queue(s) 120 may be strict for messages with the same value for the strict order parameter and non-strict for messages with different values for the strict order parameter.

Figure 4A:
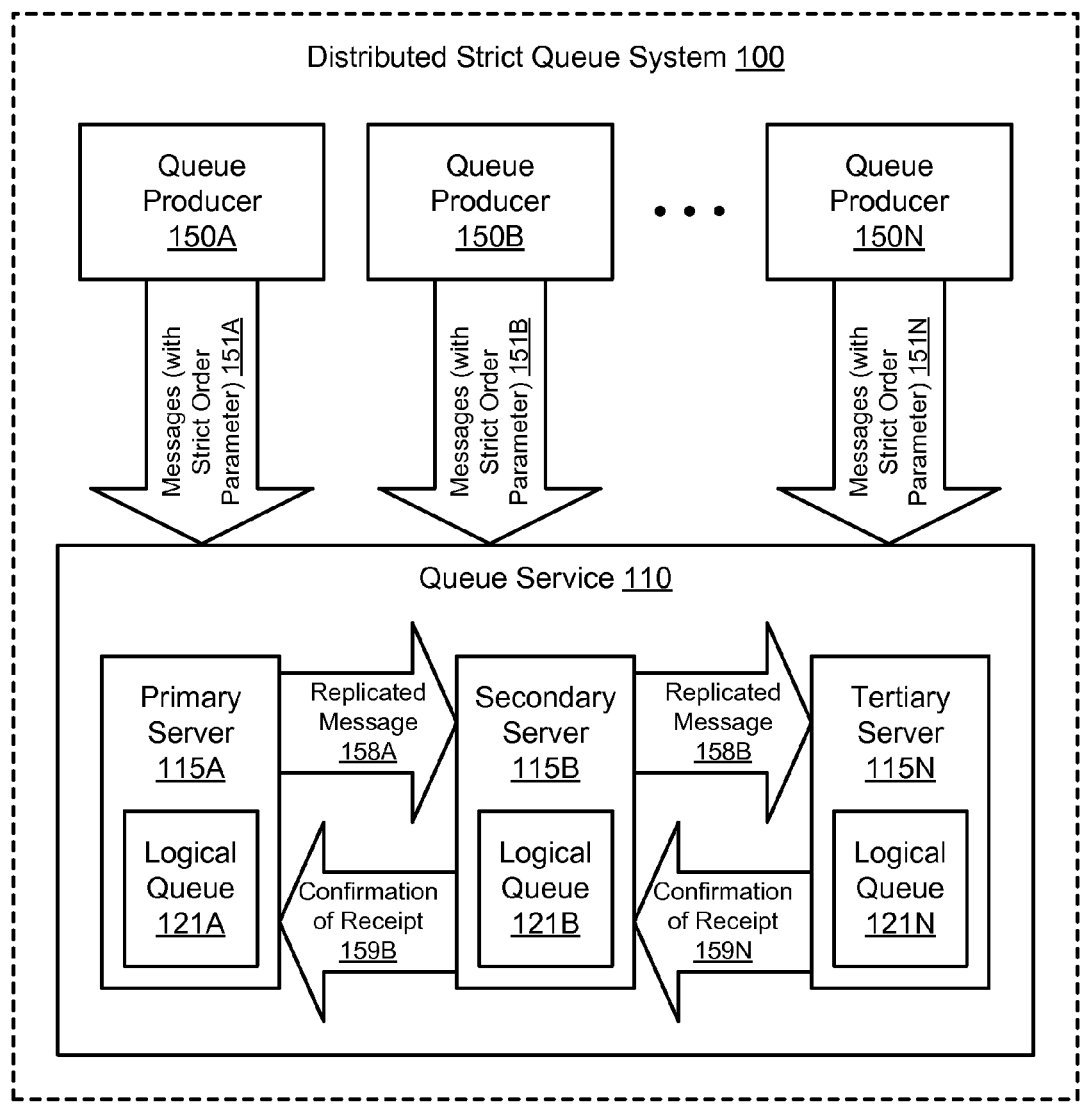
FIGS. 4A and 4B illustrate an example system environment for implementing redundancy with strict queue ordering in a distributed system, according to one embodiment.
Figure 4B:
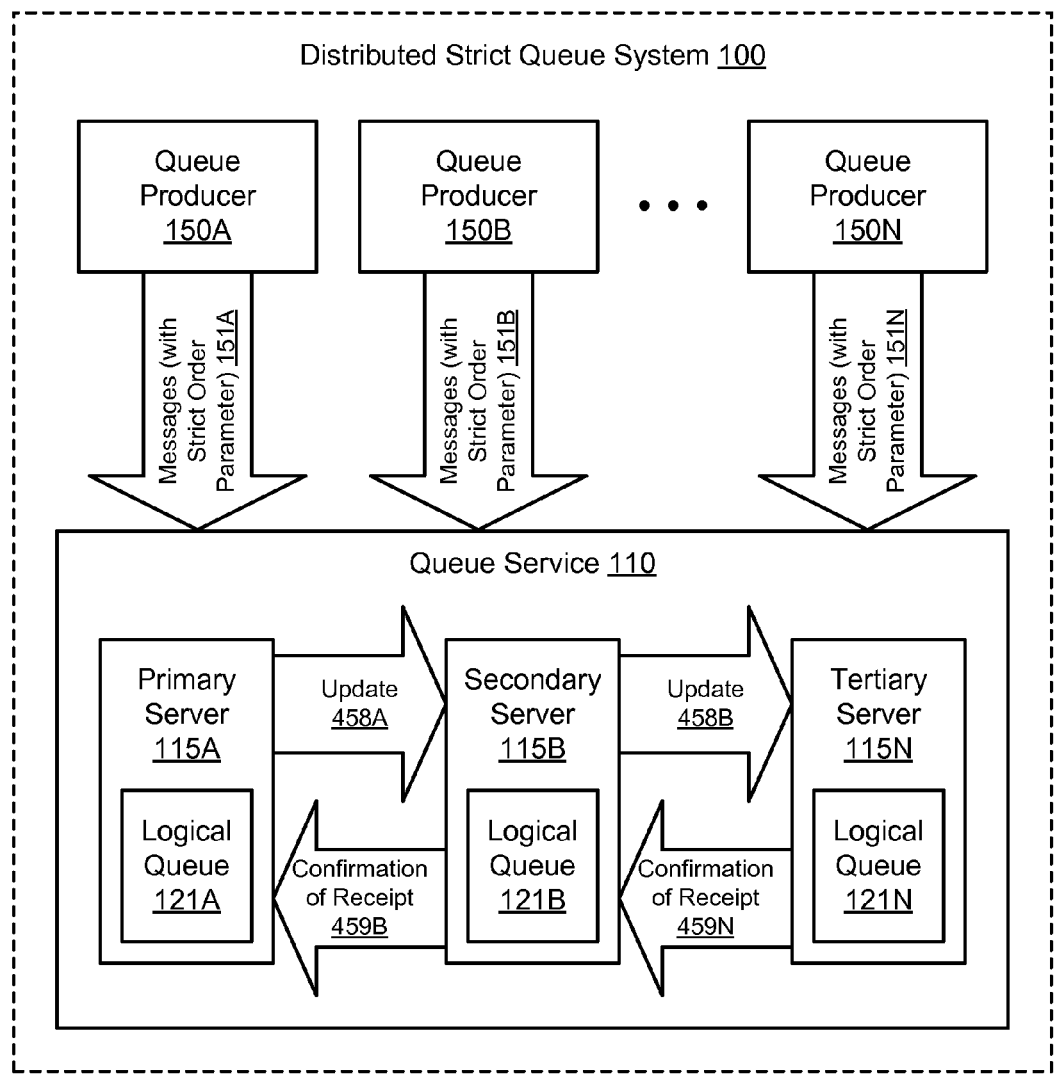

FIGS. 4A and 4B illustrate an example system environment for implementing redundancy with strict queue ordering in a distributed system, according to one embodiment. In one embodiment, the distributed strict queue system 100 may use one or more backup servers for each queue server. The one or more backup servers may be configured to resume the responsibilities of a primary server if the primary server should experience a failure. As shown in the example of FIG. 4A, the queue server 115A is a primary server for one or more values of the strict order parameter. As further shown in the example, the queue server 115B is a secondary backup server for the primary server 115A, and the queue server 115N is a tertiary backup server for the primary server 115A and secondary server 115B. Each of the servers may include a corresponding logical queue 121A, 121B, or 121N for a particular value of the strict order parameter. It is contemplated that different numbers and configurations of backup servers may be used in the distributed strict queue system 100.

When a message is received by the primary server 115A and stamped with a sequence identifier, the stamped message may be forwarded to the one or more backup servers (e.g., secondary server 115B and tertiary server 115N). The replicated message 158A may be sent from the primary server 115A to the secondary server 115B, and the replicated message 158B may be sent from the secondary server 115B to the tertiary server 115N. The tertiary server 115N may then send a confirmation of receipt 159N to the secondary server 115B, and the secondary server 115B may then send a confirmation of receipt 159B to the primary server 115A. In one embodiment, the primary server 115A may place the message in the logical queue 121A and/or confirm the enqueuing of the message to the message source only after receiving the confirmation of receipt 159B from the secondary server 115B.

Similarly, as shown in the example of FIG. 4B, when preparing to deliver a message to a consumer, the primary server 115A may send updates 458A and 458B to the secondary server 115B and tertiary server 115N before delivering the message. The updates 458A and 458B may indicate that the primary server 115A is preparing to deliver the message. In one embodiment, the message may be delivered to the consumer only after the one or more backup servers have confirmed receipt of the update(s) sent by the primary server, e.g., with confirmations of receipt 459B and 459N. In one embodiment, the delivery of a message to a consumer may include a preparation step in which the one or more backup servers are notified of the impending delivery, a locking step to flag the message in the queue as "locked" after the message has been delivered, and a deletion step to delete the message from the queue after the consumer has confirmed successful processing of the message. Updates 458A and 458B may be sent from the primary server to the one or more backup servers before each step, and the step may be completed only after the one or more backup servers have confirmed receipt of the updates with receipt confirmations 459B and 459N. For example, the primary server 115A may delete the message from the queue 121A only after receiving confirmation of processing from the consumer, sending updates 458A and 458B to the secondary server 115B and tertiary server 115N, and receiving confirmations 459B and 459N of receipt of the updates. In this manner, the distributed strict queue system 100 may provide "guaranteed once" delivery for messages (i.e., a guarantee that each message is delivered once and only once) using one or more backup servers in case the primary server 115A fails at some point during the delivery process.

Figure 5:
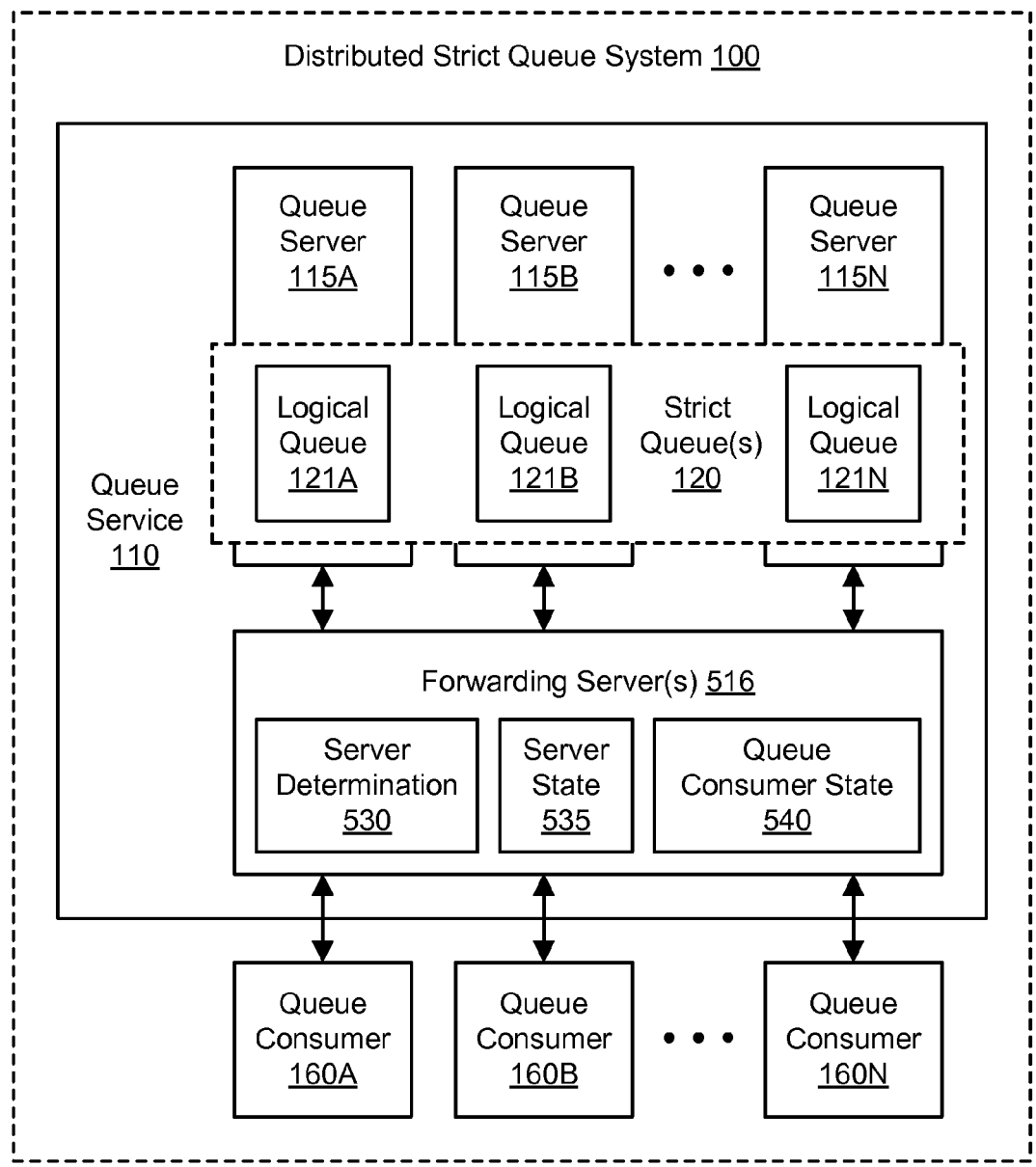
FIG. 5 illustrates an example system environment for efficiently employing queue consumers with strict queue ordering in a distributed system, according to one embodiment.

FIG. 5 illustrates an example system environment for efficiently employing queue consumers with strict queue ordering in a distributed system, according to one embodiment. In one embodiment, the distributed strict queue system 100 may give preferential treatment to particular consumers 160A-160N to increase the efficiency of message execution. Each queue consumer (e.g., queue consumer 160A) may be assigned a portion of the range of values of the strict order parameter. The distributed strict queue system 100 may attempt to allow the consumer associated with a particular value of the strict order parameter to continue to consume messages associated with that particular value of the strict order parameter. In one embodiment, each queue consumer may be associated with one or more particular queue servers that provides messages with one or more particular values of the strict order parameter. As shown in the example of FIG. 5, each logical queue 121A-121N may represent a particular value of the strict order parameter. In various embodiments, each queue consumer may have a one-to-one or one-to-many correspondence with one or more particular values of the strict order parameter (and the corresponding logical queue(s)).

In one embodiment, in a similar manner as discussed above with reference to FIGS. 2A and 2B, a queue consumer may be directed to an appropriate queue server based on one or more values of the strict order parameter assigned to the queue consumer. As shown in FIG. 5, one or more components 516 may be configured to serve as an interface between the queue consumers 160A-160N and the queue servers 115A-115N. Each of the component(s) 516 may be referred to as a forwarding server. Although one forwarding server 516 is shown for purposes of example and illustration, it is contemplated that different quantities and combinations of forwarding servers may be used. The forwarding server(s) 516 may be implemented by the example computing device 5000 illustrated in FIG. 36. The one or more forwarding servers 516 may be used to receive requests from the queue consumers 160A-160N and forward each request to the appropriate queue server based on the one or more values of the strict order parameter associated with the requesting queue consumer. After a forwarding server 516 determines a corresponding queue server for a particular queue consumer, the queue server may push messages to the queue consumer, or the queue consumer may pull messages from the queue server.

Each forwarding server 516 may include a module 530 for performing server determination, a module 535 for storing queue server state information, and a module 540 for storing queue consumer state information. In one embodiment, one or more values of the strict order parameter may be assigned to each of the queue consumers using any suitable technique, including uniform random selection from a range of possible values (e.g., within the same range of values assigned to the various queue servers 115A-115N) or round-robin selection from a range of possible values. The value(s) of the strict order parameter associated with a particular queue consumer may be stored in the queue consumer state information 540. Using the server determination module 530, the forwarding server(s) 516 may compare the value(s) of the strict order parameter associated with a queue consumer to the ranges of values assigned to the various queue servers. The server determination module 530 may implement the server determination functionality 530 using any suitable technique, such as the use of a lookup function that maps a value or range of values of the strict order parameter to a queue server. The server determination module 530 may determine the identity of a queue server that should provide messages to a queue consumer based on one or more values or range of values of the strict order parameter associated with the queue consumer. The output of the server determination functionality 530 may be stored for later reference using a module 535 for storage of queue server state information.

After performing the server lookup process to determine the queue server responsible for a particular value or range of values of the strict order parameter, the server determination module 530 (or any other suitable component of the forwarding server 516) may forward a request (e.g., a request from a queue consumer for messages) to that queue server. If the logical queue corresponding to the value of the strict order parameter contains any messages that are available to the queue consumer, then the queue server may return the next message in the logical queue to the queue consumer. If the logical queue corresponding to the value of the strict order parameter is empty, then the association between the queue consumer and the value of the strict order parameter may be removed, and the server determination module 530 (or any other suitable component of the forwarding server 516) may restart the server lookup process.

If no queue server has messages among the queue servers that are responsible for the value(s) of the strict order parameter assigned to the queue consumer, then the forwarding server 516 may assign one or more new values or a range of values of the strict order parameter to the queue consumer and restart the lookup process. Alternatively, the forwarding server 516 may send a message to the queue consumer indicating that the queue consumer is not currently responsible for processing any messages. In response to such a message from the forwarding server 516, the queue consumer may enter a sleep state in which its interaction with the distributed strict queue system 100 is reduced.

By allowing queue servers to give preferential treatment to particular queue consumers based on the strict order parameter, the efficiency and reliability of failover operations may be enhanced. Additionally, the performance characteristics of a consumer may be enhanced by allowing the consumer to process messages for particular values of the strict order parameter, particularly if the messages tend to require the same input data or other resources. The range of values of the strict order parameter assigned to various consumers may be rebalanced to optimize resource usage, e.g., using load balancing techniques.

Figure 6:
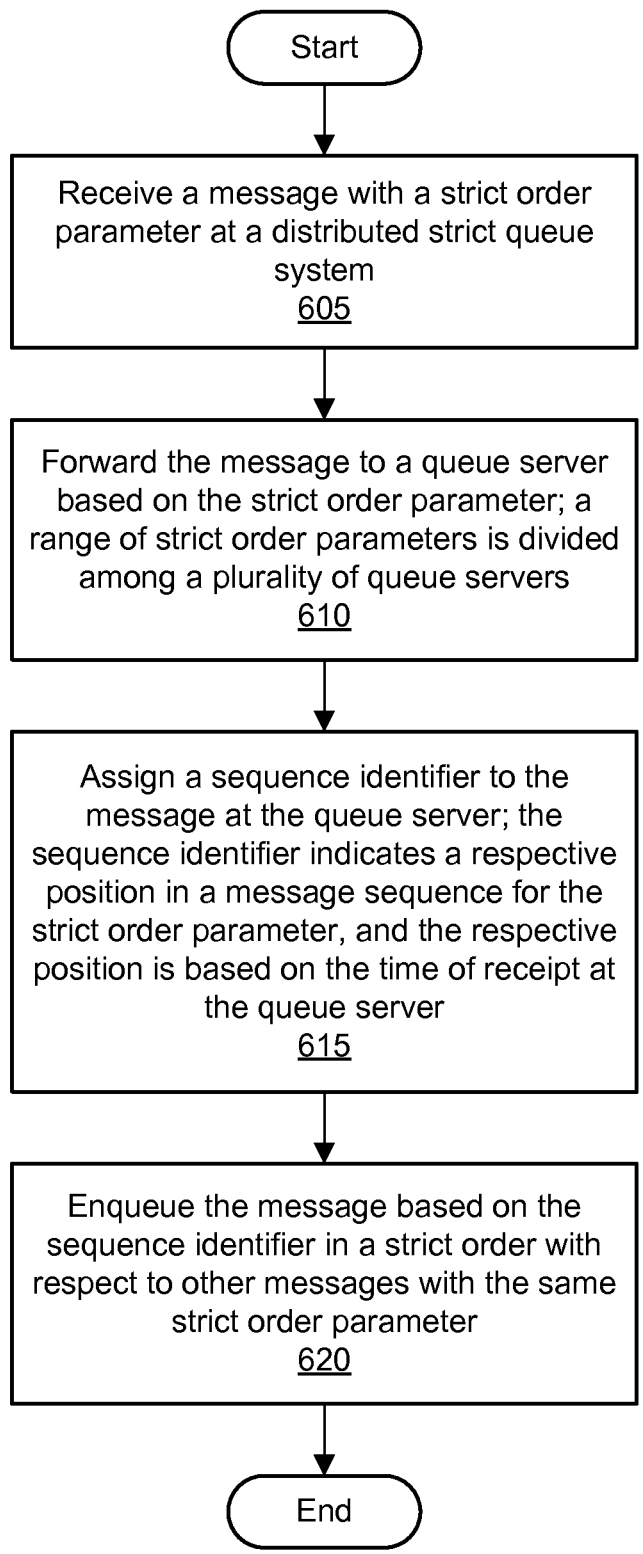
FIG. 6 is a flowchart illustrating a method for implementing strict queue ordering in a distributed system, according to one embodiment.

FIG. 6 is a flowchart illustrating a method for implementing strict queue ordering in a distributed system, according to one embodiment. As shown in 605, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 610, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 615, a sequence identifier may be assigned to the message at the queue server responsible for all of the messages with the strict order parameter. The sequence identifier may indicate a respective position in a message sequence for the strict order parameter. The respective position may be based on the time of receipt. The time of receipt may be based on the receipt of the first or last byte of the message at the destination queue server.

As shown in 620, the message may be enqueued based on the sequence identifier. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message.

Pre-Processing and Processing Pipeline

Figure 7:
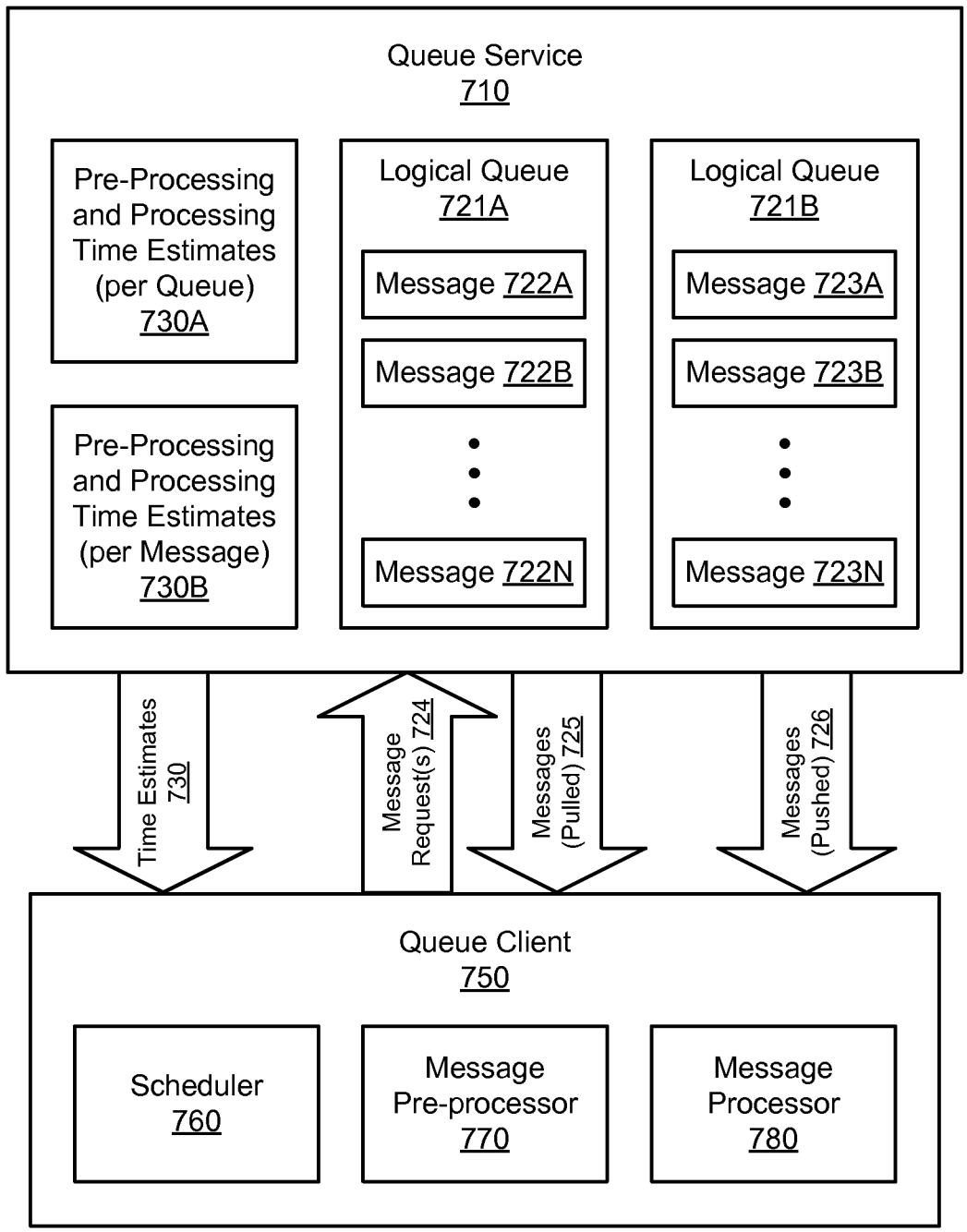
FIG. 7 illustrates an example system environment for a pre-processing and processing pipeline for a queue client, according to one embodiment.

FIG. 7 illustrates an example system environment for a pre-processing and processing pipeline for a queue client, according to one embodiment. A queue client 750 may receive messages from a queue service 710 and perform various operations to execute or otherwise implement the messages. In one embodiment, the queue client 750 may be used in conjunction with the distributed strict queue system 100. The queue client 750 may implement any aspects of the queue consumers 160A-160N discussed above. The queue service 710 may implement any aspects of the queue service 110 discussed above.

The queue client 750 may comprise one or more computing devices, any of which may be implemented by the example computing device 5000 illustrated in FIG. 36. In various embodiments, portions of the functionality of the queue client 750 may be provided by the same computing device or by any suitable number of different computing devices. If any of the components of the queue client 750 are implemented using different computing devices, then the components and their respective computing devices may be communicatively coupled, e.g., via a network. Each of the illustrated components may represent any combination of software and hardware usable to perform their respective functions. In some embodiments, the queue client 750 may be implemented as one or more virtual compute instances and/or physical compute instances. It is contemplated that the queue client 750 may include additional components not shown, fewer components than shown, or different combinations, configurations, or quantities of the components shown.

The queue service 710 may maintain one or more logical queues such as logical queue 721A and logical queue 721B. Each logical queue may use a first-in, first-out (FIFO) data structure to store one or more messages associated with a particular value for a strict order parameter. For example, the logical queue 721A may store message 722A and message 722B through message 722N having one value for the strict order parameter, and the logical queue 721B may store message 723A and message 723B through message 723N having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations.

In one embodiment, the queue service 710 may include functionality to estimate a time (i.e., a duration of time) to process one of the messages. Processing a message may include performing or implementing the one or more tasks described in the message. For messages with the same value for the strict order parameter, the processing stage may have a strictness guarantee such that the queue service 710 is expected to perform the processing of the messages in a particular predetermined order. The queue service 710 may also include functionality to estimate a time (i.e., a duration of time) to pre-process one of the messages. Pre-processing a message may include any part of the message computation for which strict ordering between different messages is not required. For example, pre-processing a message may sometimes include performing one or more tasks to prepare the message for processing, such as fetching or otherwise loading the data described in the message as input for the processing stage. When pre-processing a message includes fetching data, the elements of input data may be acquired from any appropriate source(s), such as local storage locations, remote storage locations, and/or other servers in a distributed system.

In one embodiment, the pre-processing and processing time estimates may be configured at the queue level, such that the same estimates may generally be applied to all the messages in the queue by default, but the queue-level estimates may be overridden for particular messages in a queue. In one embodiment, each message may have its own respective time estimates. Therefore, the queue service may store the pre-processing and processing time estimates per queue 730A and/or per message 730B. Any suitable techniques may be used to determine the estimates. In one embodiment, the time estimates may be determined based on a user-specified configuration per message and/or per queue. In one embodiment, information usable to determine the estimates may be supplied by the queue producer using any suitable interface presented by the queue service 710. For example, a message size parameter may be supplied by the queue producer on a message-by-message basis. The message size parameter may be an integer for which smaller values tend to indicate a shorter processing time and for which larger values tend to indicate a longer processing time. In one embodiment, the queue service 710 may be configured to programmatically estimate the pre-processing and/or processing times based on analysis of performance of the queue client 750 over time. For example, the queue service 710 may programmatically determine a relationship between the message size parameter and processing time for various processed messages, and the queue service 710 may programmatically determine a relationship between the message size parameter and pre-processing time for various processed messages. In this manner, the queue service 710 may generate better estimates for the pre-processing and/or processing times of subsequent messages based on the determined relationships between the message size parameter and the pre-processing and/or processing times for prior messages.

The queue client 750 may receive a sequence of messages from the queue service and process the messages. In one embodiment, the queue client 750 may pull messages 725 from the queue service 710. The client 750 may pull messages 725 from one or more of the logical queues 721A and 721B by sending one or more requests 724 for one or more additional messages to the queue service 710 or by otherwise initiating the pulling of messages from the queue service. In one embodiment, the queue service 710 may push messages 726 to the queue client 750. Messages 726 may be pushed to the queue client 750 periodically based on an analysis of the queue client's health by the queue service 710. The queue client 750 may send to the queue service 710 an indication of the client's health at appropriate points in time. For example, the queue client 750 may send a health indication upon receipt of a message from the queue service 710. In general, the health indication for a queue client 750 may comprise any data usable by the queue service 710 to determine whether to send additional messages 726 to the queue client, how many messages 726 to send to the queue client, and/or how many logical queues to assign to the queue client. For example, the health indication may tend to indicate the load at the client. Based on one or more of the health indications received over time, the queue service 710 may perform a rebalancing of the assignment of logical queues to the queue client 750 and one or more additional queue clients. The queue service 710 may also determine that a particular queue client is unnecessary if the other queue clients are able to handle the strict queue load; consequently, the queue service may reassign any logical queues to the other clients and may instruct the queue client considered unnecessary to enter a sleep state, thereby reducing the queue client's traffic with the queue service The queue client 750 may also receive the time estimates 730 for pre-processing and processing each message. The time estimates 730 for each message may be received along with the message on a message-by-message basis, i.e., in a bundle along with the body of the message. In one embodiment, relevant per-queue time estimates 730A or relevant per-message time estimates 730B may be sent by the queue service 710 for each individual message.

Based on the pre-processing and processing time estimates 730, the queue client 750 may implement a pipeline for pre-processing and processing the messages 721. Using the pipeline, the queue client 750 may begin pre-processing one message while continuing to process an earlier message. In other words, the queue client may concurrently process one message and pre-process another message. In one embodiment, the queue client 750 may include functionality for message pre-processing 770 and functionality for message processing 780. The message processor 780 may be configured to perform the tasks described in the message, e.g., by executing or interpreting instructions and/or invoking functions or services included in the body of the message. In one embodiment, the message pre-processor 770 may be configured to perform any tasks that may be used to prepare a message for processing, such as fetching or otherwise loading the data described in the message as input for the processing stage. In general, however, the pre-processing stage may include any computation for which a strict order guarantee is not required. For consecutive messages with different values for the strict order parameter, both pre-processing and processing may be performed concurrently. For consecutive messages with the same value for the strict order parameter, the pre-processing of the second message may sometimes be performed concurrently with the processing of the first message.

The queue client 750 may include a scheduler component 760. In one embodiment, the scheduler 760 may schedule the receipt and/or pre-processing of the next message based on the estimated time to process the current message and estimated time to pre-process the next message. For example, if the estimated time to process the current message is 2.0 seconds, and the estimated time to pre-process the next message is 0.3 seconds, then the scheduler may cause the queue client 750 to begin pre-processing the next message after the current message has been processing for 1.7 seconds. As a result, the next message may be fully pre-processed and ready for processing near the time when the processing of the current message is complete. Using the pipeline in this manner, the queue client 750 may perform all or part of the pre-processing for a particular message by the time the client is ready to initiate the processing of the message. In one embodiment, however, the pre-processing of the next message may be initiated at substantially any point in time during the processing of the current message, even if the pre-processing is likely to finish before the processing of the current message or after the processing of the current message.

When a message is first received by the queue client 750 from the queue service 710, the scheduler 760 may receive and analyze the message. At different stages during the pre-processing and processing of the message, the queue service 710 may use different flags to indicate the status of the message. For example, the message may be flagged as "prepared" when sent to the queue client 750 and as "locked" when processing begins. The message may be deleted from the queue (or flagged for deletion) when the queue service 710 is informed by the queue client 750 that processing is complete.

Figure 8:
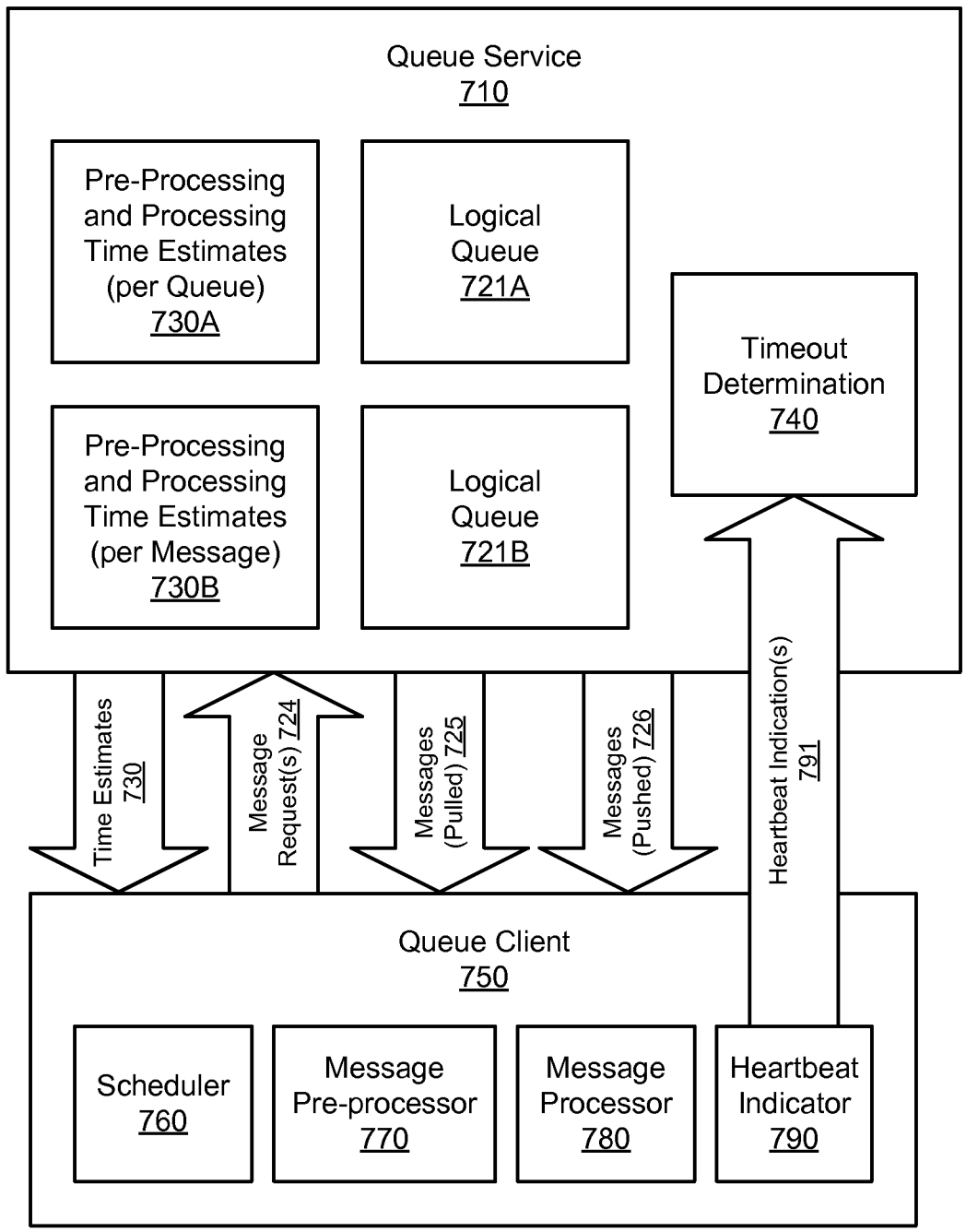
FIG. 8 illustrates an example system environment for a pre-processing and processing pipeline for a queue client with heartbeat functionality, according to one embodiment.

FIG. 8 illustrates an example system environment for a pre-processing and processing pipeline for a queue client with heartbeat functionality, according to one embodiment. In one embodiment, the queue service 710 may include a timeout determination functionality 740. The timeout determination functionality 740 may use the estimates for processing time to determine a timeout duration for a message. The timeout duration may be calculated in any suitable manner, e.g., as the estimated processing time plus an additional time or as a multiplier (e.g., 1.5×) of the estimated processing time. The queue service 710 may consider a message delivered to the queue client 750 to have failed if the client does not confirm the completion of the processing within the timeout duration. In one embodiment, the queue client 750 may request additional time to complete the processing of a message. The timeout determination functionality 740 may be configured to extend the timeout duration based on the receipt of such a request. In this manner, a timeout may be prevented or delayed.

In one embodiment, the queue client 750 may include a heartbeat indicator functionality 790. Using the heartbeat indicator functionality 790, the queue client 750 may send one or more heartbeat indications 791 at appropriate intervals. In one embodiment, the health indications discussed above may be communicated using the same or similar modules. In one embodiment, the heartbeat indication(s) 791 may include data usable by the queue service 710 to determine the load at the queue client 750. Using the heartbeat indication(s) 791 for multiple queue clients, the queue service may decide to put one or more of the clients to sleep if the heartbeats indicate that there are too many active clients for the current load represented by the queue(s).

Figure 9:
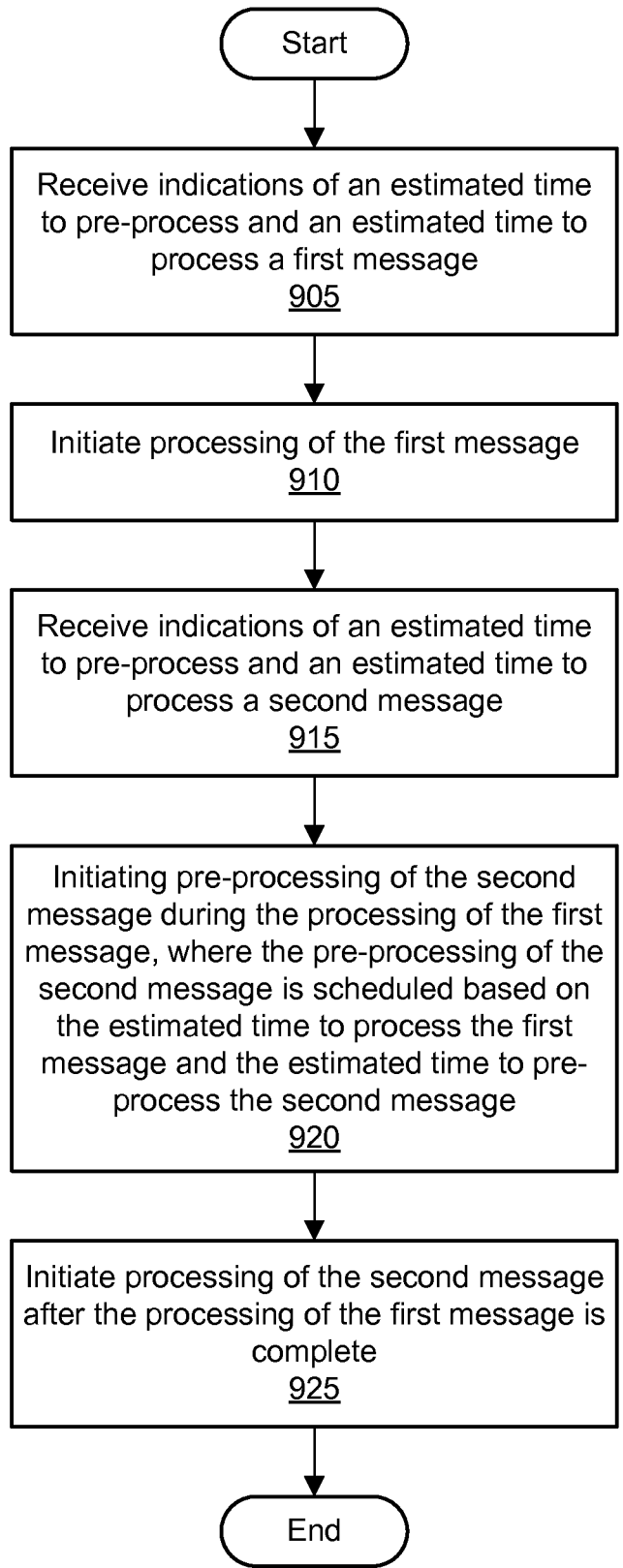
FIG. 9 is a flowchart illustrating a method for implementing a pre-processing and processing pipeline for a queue client, according to one embodiment.

FIG. 9 is a flowchart illustrating a method for implementing a pre-processing and processing pipeline for a queue client, according to one embodiment. As shown in 905, the queue client may receive, e.g., from a queue service, data indicative of an estimated time to pre-process a first message and data indicative of an estimated time to process the first message. As shown in 910, the queue client may initiate processing of the first message. As shown in 915, the queue client may also receive, e.g., from the queue service, data indicative of an estimated time to pre-process a second message and data indicative of an estimated time to process the second message.

As shown in 920, the queue client may initiate pre-processing of the second message during the processing of the first message. The pre-processing may comprise fetching data described in the second message or any other computation associated with the second message that is not required to be performed in a strict order with respect to the processing of the first message. The pre-processing of the second message may be scheduled to begin based on the estimated time to process the first message and the estimated time to pre-process the second message. In one embodiment, the pre-processing of the second message may be scheduled to be completed by the end of the processing of the first message based on the estimated time to process the first message and the estimated time to pre-process the second message. In one embodiment, the operation shown in 920 may be performed during the processing of the first message based on analysis of the strict order parameters for the first and second messages.

As shown in 925, the queue client may initiate processing of the second message. In one embodiment, the processing of the second message may use any of the results generated from the pre-processing of the second message. The processing of the second message may be initiated after the processing of the first message is completed. In this manner, the queue client may implement a pipeline for pre-processing and processing consecutive messages in a queue. The queue client may also send a status of the processing of any of the messages to the queue service, e.g., after the processing of the message is complete.

Message Batching

Figure 10A:
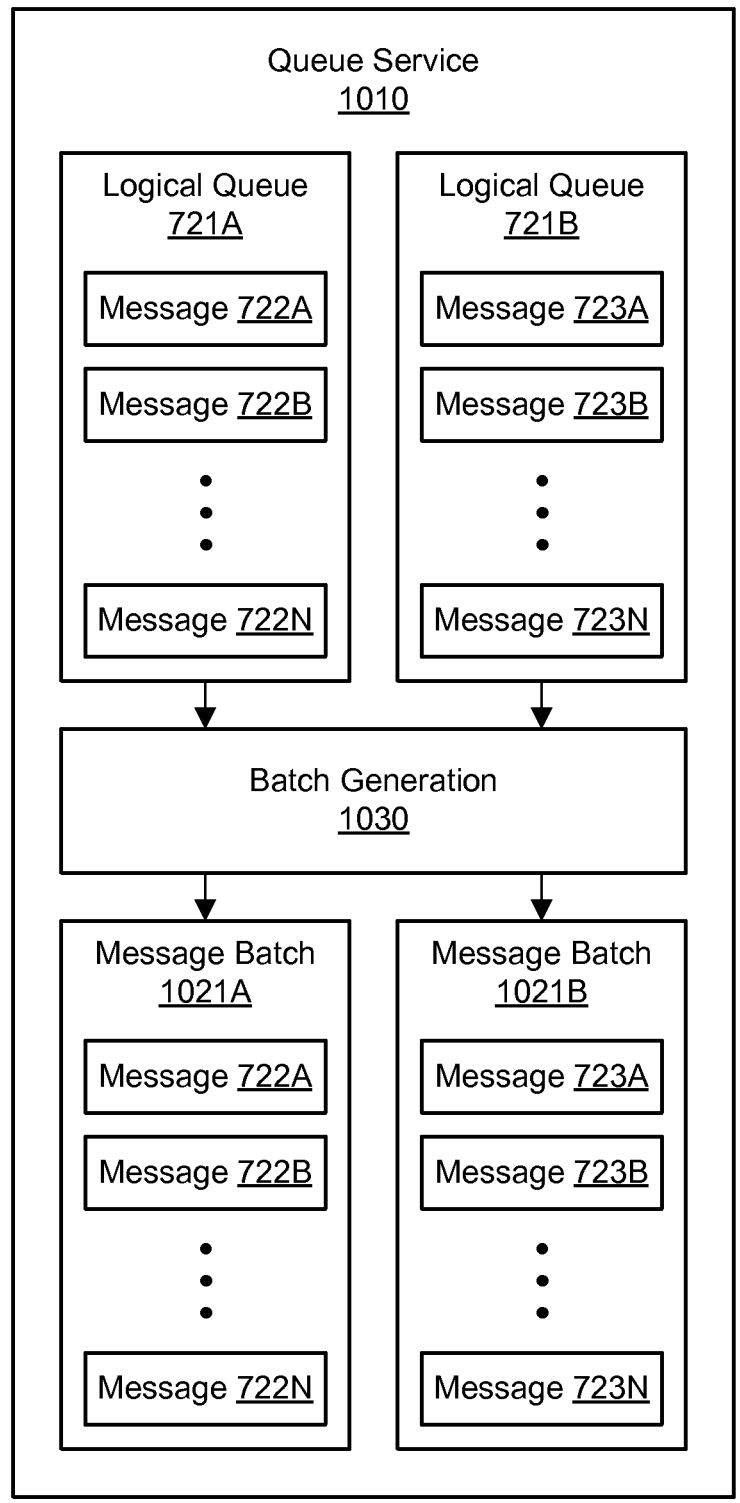
FIG. 10A illustrates an example system environment for message batching in a distributed strict queue, according to one embodiment.

FIG. 10A illustrates an example system environment for message batching in a distributed strict queue, according to one embodiment. A queue service 1010 may be implemented as part of a distributed strict queue system, such as the distributed strict queue system 100. Additionally, the queue service 1010 may be implemented using any combination of the features described herein with respect to queue services, such as the queue service 110. For example, the queue service 1010 may be implemented using one or more queue servers, such as queue servers 115A-115N shown in FIG. 1. As discussed above with respect to the queue service 110, the queue service 1010 may implement one or more logical queues (such as logical queues 721A and 721B) in which messages with the same value for a strict order parameter are presented in their intended order.

It is contemplated that the queue service 1010 may include additional components not shown, fewer components than shown, or different combinations, configurations, or quantities of the components shown. The queue service 1010 may be implemented using one or more computing devices, any of which may be implemented by the example computing device 5000 illustrated in FIG. 36. In some embodiments, the queue service 1010 may be implemented as one or more virtual compute instances and/or physical compute instances. In various embodiments, portions of the functionality shown in FIG. 10A may be provided by the same computing device or by any suitable number of different computing devices. If any of the components shown in FIG. 10A are implemented using different computing devices, then the components and their respective computing devices may be communicatively coupled, e.g., via a network. Each of the illustrated components may represent any combination of software and hardware usable to perform their respective functions.

The queue service 1010 may maintain one or more logical queues, such as logical queue 721A and logical queue 721B. Although two logical queues 721A and 721B are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 721A may store a series of ordered messages (such as messages 722A and 722B through 722N) having one value for the strict order parameter, and the logical queue 721B may store another series of ordered messages (such as messages 723A and 723B through 723N) having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations.

In one embodiment, the queue service 1010 may include functionality 1030 to generate batches of messages. The batch generation functionality 1030 may generate a batch that includes multiple messages. In one embodiment, a message batch may include messages having a particular value for the strict order parameter. For example, as shown in FIG. 10A, the batch generation functionality 1030 may generate a message batch 1021A. The batch 1021A may include a plurality of messages (such as messages 722A and 722B through 722N) taken from the logical queue 721A and having one value for the strict order parameter. Similarly, the batch generation functionality 1030 may generate a message batch 1021B. The batch 1021B may include a plurality of messages (such as messages 723A and 723B through 723N) taken from the logical queue 721B and having another value for the strict order parameter. The batch generation functionality 1030 may generate the batches 1021A and 1021B such that the strictness guarantee is met for particular values for the strict order parameter. Accordingly, messages within a batch that share a particular value for the strict order parameter may be strictly ordered, e.g., based on the time of receipt at the queue server, as discussed above with respect to FIGS. 1-6. Additionally, a batch may be locked on the originating queue server once the batch has been delivered to a queue client; as a result, the same batch may not be provided to another queue client unless the batch is unlocked, e.g., due to a processing failure or timeout on the first queue client. In general, the queue service 1010 may implement the same or similar behavior for batches as for individual messages.

In one embodiment, a batch may be generated by the queue service 1010 in response to a request from a queue client for one or more messages. In one embodiment, a batch may be generated by the queue service 1010 prior to receiving such a request from a queue client. In one embodiment, the batches 1021A and 1021B may be generated by retrieving the constituent messages from the logical queues 721A and 721B and sending the batched messages to a queue client. As discussed above with respect to FIGS. 1-6, the messages included in the batch may remain in the one or more logical queues 721A and 721B, but the status of the queued messages may be changed so that they are not delivered to another queue client while the recipient queue client is attempting to process the messages.

A batch may be generated in order to optimize the use of network resources, processing resources, memory resources, or any suitable combination thereof. In one embodiment, a batch may be generated in order to minimize the use of network bandwidth between the queue server(s) and queue client(s). In one embodiment, a batch may be generated in order to minimize the number of calls made over the network between the queue server(s) and queue client(s). Accordingly, the batch generation functionality 1030 may generate batches of a particular size, e.g., batches having a particular number of messages, batches having a total size in bytes within a particular range, or batches having a combined message size parameter within a particular range. In one embodiment, the queue service 1010 may delay sending messages to a queue client until a batch of sufficient size is ready; in the interim, the queue service 1010 may report to a queue client that no messages are available in the queue. In one embodiment, the size of a batch may be determined using machine learning techniques. For example, the queue service 1010 may send batches of varying sizes to the queue client 1050, analyze the performance of the client for the different sizes (e.g., using performance metrics gathered by the queue client and/or one or more queue servers), and determine an optimal batch size for the client or class of clients. In one embodiment, the individual messages in the batch may be compressed to further optimize the use of network resources. In one embodiment, the batch may be compressed based on data derived from messages having one or more values for the strict order parameter for the messages in the batch.

In one embodiment, a queue producer may send messages in batch form to the queue service 1010. Because a batch from the queue producer may include messages having different values for the strict order parameter, the queue service 1010 may divide such a batch into its constituent messages prior to forwarding the messages to one or more destination servers and placing the messages in one or more logical queues based on their individual values for the strict order parameter. As discussed above, the messages may then be rebatched for delivery to one or more queue clients. As discussed above with respect to FIGS. 1-6, the queue service may confirm receipt of messages from a queue producer after all the messages have been delivered to the primary server and replicated to any secondary and/or tertiary servers. Messages having different values for the strict order parameter may be delivered to different primary servers. In one embodiment, to avoid a distributed commit problem involving different primary servers, the queue service 1010 may reject batches from queue producers having multiple values for the strict order parameter.

Figure 10B:
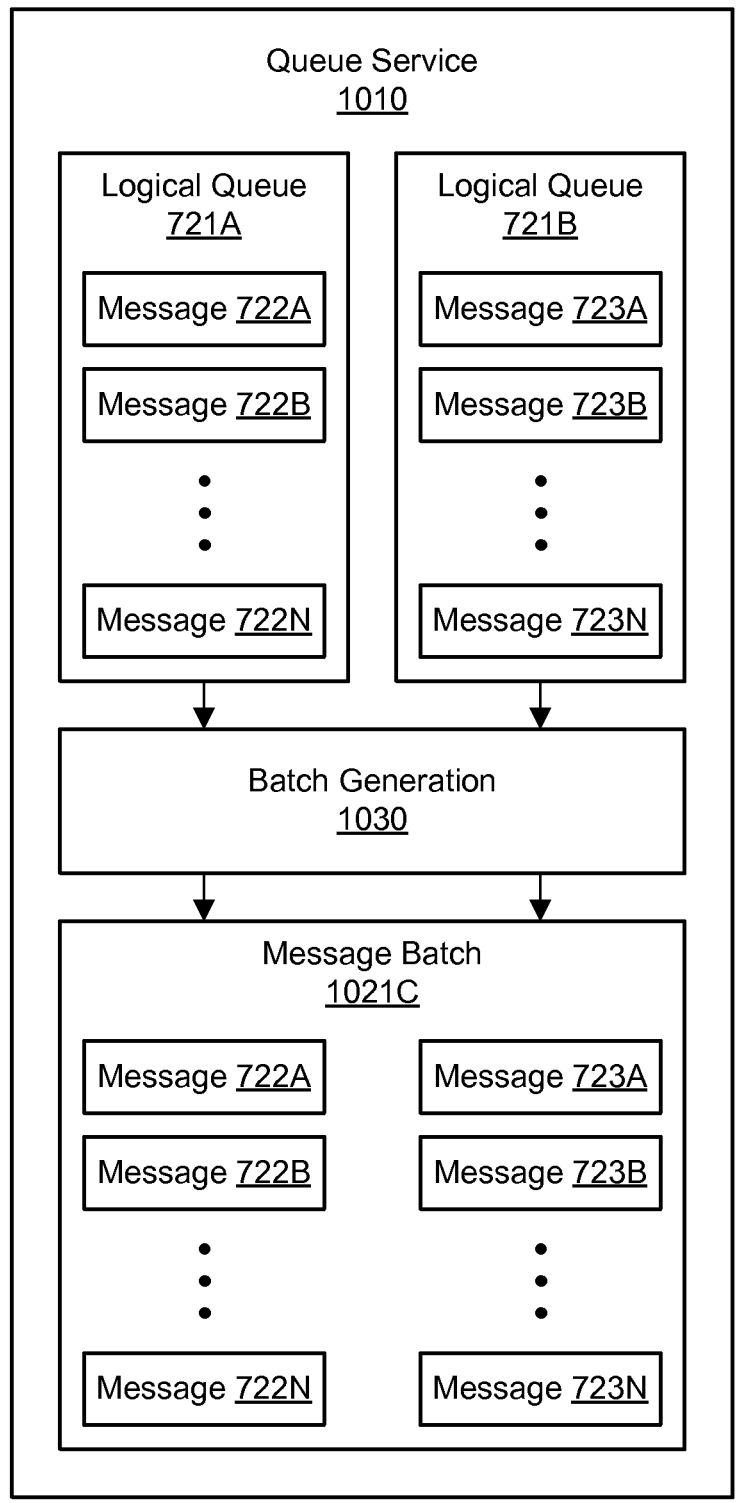
FIG. 10B illustrates an example system environment for message batching in a distributed strict queue, including generating a batch with multiple values for the strict order parameter, according to one embodiment.

FIG. 10B illustrates an example system environment for message batching in a distributed strict queue, including generating a batch with multiple values for the strict order parameter, according to one embodiment. The batch generation functionality 1030 may generate a batch that includes messages for different values for the strict order parameter. For example, as shown in FIG. 10B, the batch generation functionality 1030 may generate a message batch 1021C. The batch 1021C may include a plurality of messages (such as messages 722A and 722B through 722N) taken from the logical queue 721A and having one value for the strict order parameter. The batch 1021C may also include a plurality of messages (such as messages 723A and 723B through 723N) taken from the logical queue 721B and having another value for the strict order parameter. The batch generation functionality 1030 may generate the batch 1021C such that the strictness guarantee is met for particular values for the strict order parameter. Accordingly, messages within the batch 1021C that share a particular value for the strict order parameter may be strictly ordered, e.g., based on the time of receipt at the queue server, as discussed above with respect to FIGS. 1-6.

Figure 10C:
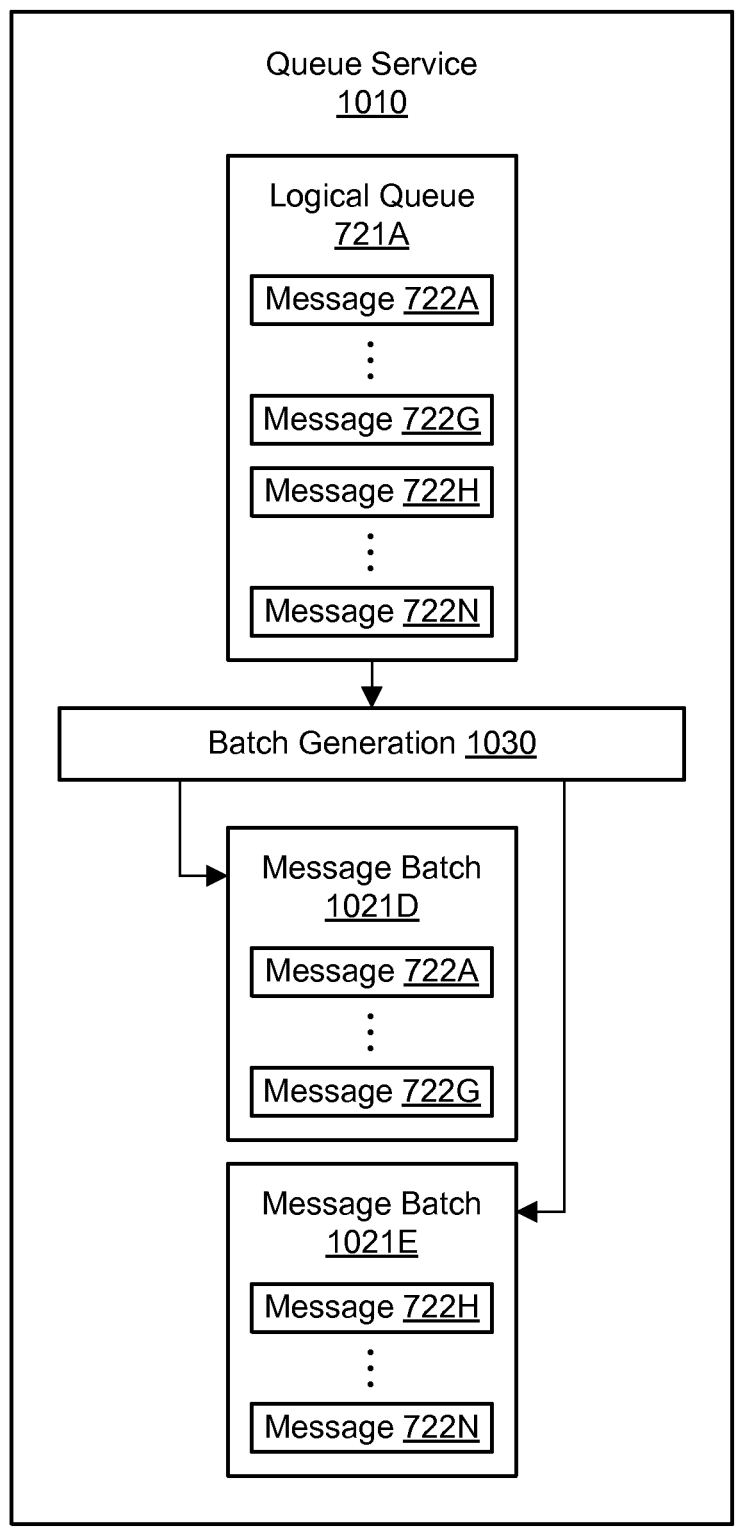
FIG. 10C illustrates an example system environment for message batching in a distributed strict queue, including generating multiple batches for a single value of the strict order parameter, according to one embodiment.

FIG. 10C illustrates an example system environment for message batching in a distributed strict queue, including generating multiple batches for a single value of the strict order parameter, according to one embodiment. The batch generation functionality 1030 may generate multiple batches that include messages for the same value for the strict order parameter. For example, as shown in FIG. 10C, the batch generation functionality 1030 may generate a message batch 1021D and a message batch 1021E. The batch 1021D may include a plurality of messages (such as messages 722A through 722G) taken from the logical queue 721A and having one value for the strict order parameter. The batch 1021E may also include a plurality of messages (such as messages 723H through 723N) taken from the same logical queue 721A and having the same value for the strict order parameter. The batch generation functionality 1030 may generate the batches 1021D and 1021E such that the strictness guarantee is met for particular values for the strict order parameter. Accordingly, messages within the batch 1021D that share a particular value for the strict order parameter may be strictly ordered, e.g., based on the time of receipt at the queue server, as discussed above with respect to FIGS. 1-6. Similarly, messages within the batch 1021E that share a particular value for the strict order parameter may be strictly ordered. Additionally, the strictness guarantee may be met across the batches 1021D and 1021E, such that all the messages in the earlier-ordered batch 1021D may be provided to a queue client before any of the messages in the later-ordered batch 1021E. In various embodiments, the message batches 1021D and 1021E may be generated at substantially the same time or at different times (e.g., with the batch 1021D generated before the batch 1021E. However, to meet the strictness guarantee, the batch 1021D may be delivered to a queue client before the batch 1021E is delivered.

Figure 11A:
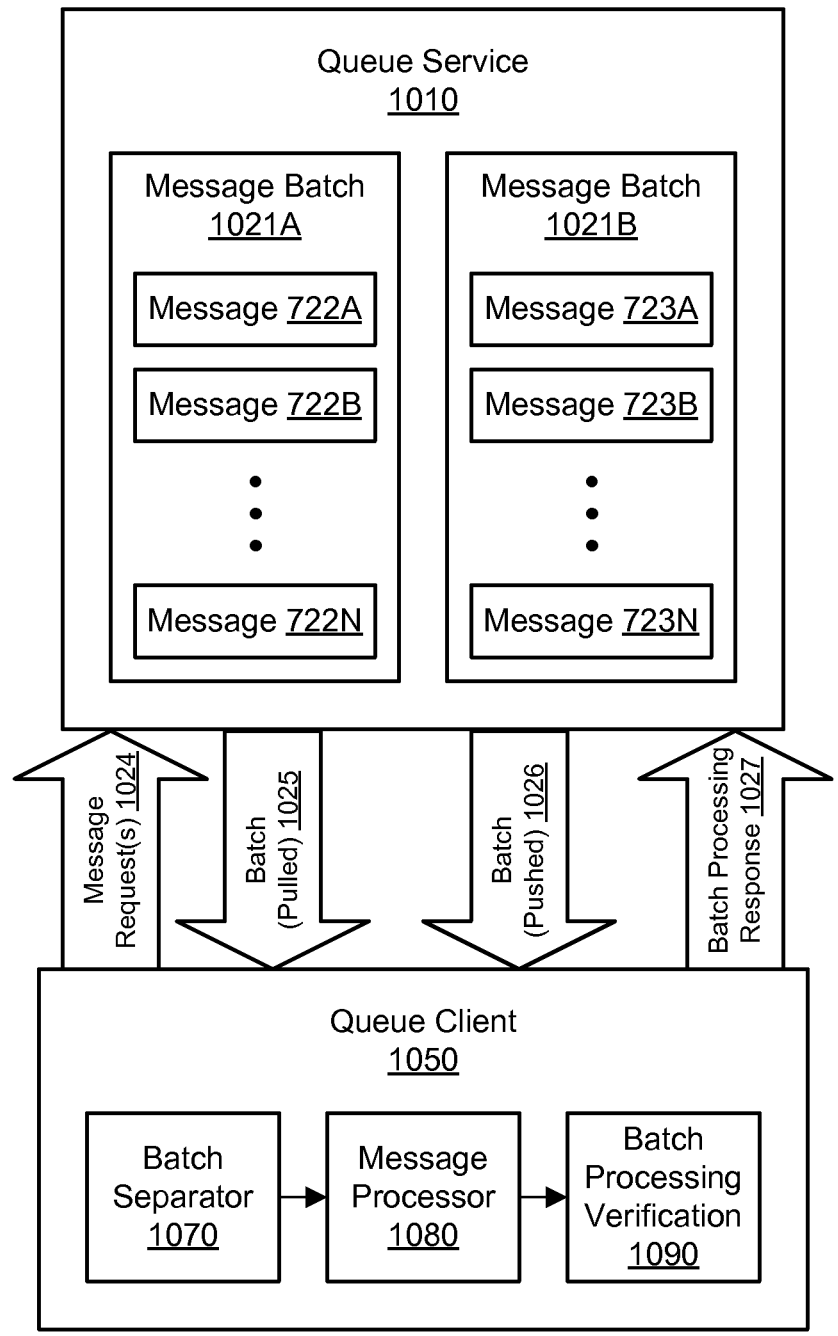
FIG. 11A illustrates an example system environment for delivering a message batch to a queue client in a distributed strict queue, according to one embodiment.

FIG. 11A illustrates an example system environment for delivering a message batch to a queue client in a distributed strict queue, according to one embodiment. After the batches 1021A and 1021B are generated as discussed above with respect to FIG. 10A, the batches may be delivered to one or more queue clients such as queue client 1050. By ordering the messages within each batch according to the strict order guarantee for a particular value for the strict order parameter, the strict order guarantee may be met. Additionally, each message may be delivered to a queue client once and only once (unless retry is necessary on message processing failure). Accordingly, each message may be limited to one and only one batch (unless retry is necessary on message processing failure).

In one embodiment, the queue client 1050 may pull messages from the queue service 1010. The client may pull messages from the queue service 1010 by sending one or more requests 1024 for one or more additional messages to the queue service 1010 or by otherwise initiating the pulling of messages 1025 from the queue service. In one embodiment, the queue service 1010 may push messages 1026 to a queue client. The messages 1025 and/or 1026 may be included as part of a batch. The queue client 1050 may send to the queue service 1010 an indication of the client's health at appropriate points in time. In one embodiment, messages (either single or batched) may be pushed to the queue client periodically based on an analysis of the queue client's health by the queue service 1010.

The queue client 1050 may receive the messages from the queue service 1010 (in their intended order for each value of the strict order parameter) and execute instructions in the messages or otherwise implement the messages. In one embodiment, the queue service 1010 may deliver each message only once. The queue client 1050 may include a message processor 1080 that implements the instructions in the messages, potentially by invoking the functionality of one or more backend systems. The queue client 1050 may also include a batch separator functionality 1070 that is configured to separate a batch into its constituent messages. In one embodiment, the batch separator 1070 may provide the individual messages to the message processor 1080 in an order that meets the strict order guarantee.

As discussed above with respect to FIGS. 1-6, the queue client 1050 may send status updates for the processing of individual messages. In one embodiment, the queue client 1050 may also include a functionality for batch processing verification 1090. The batch processing verification functionality 1090 may send a batch processing response 1027 to the queue service 1010. The response 1027 may indicate that the entire batch succeeded, that the entire batch failed, or that the batch partially succeeded and partially failed. In one embodiment, the queue client 1050 may generate the response 1027 with the number of batched messages that were processed successfully and/or the number of batched messages that were processed unsuccessfully. In one embodiment, the queue client 1050 may generate the response 1027 with the number of batched messages that were processed successfully for particular values for the strict order parameter and/or the number of batched messages that were processed unsuccessfully for particular values for the strict order parameter. The queue service 1010 may remove the successfully processed messages from one or more logical queues and mark the unsuccessfully processed messages for reprocessing. In one embodiment, if the queue service 1010 does not receive the response 1027 or any intermediate results, e.g., if the queue client 1050 dies or times out, then the queue service may determine that the entire batch was processed unsuccessfully and mark the individual messages in the batch for reprocessing.

In one embodiment, the queue service 1010 may attempt to retry the message processing for one or more messages in a batch, potentially using log results for the failed message processing to recover from a partial failure. In one embodiment, a message retry workflow may dictate how batch processing failures are handled by the queue service 1010. For example, the message retry workflow may pause the delivery of messages to queue clients for particular values for the strict order parameter. The message retry workflow may be specified by a user for failures in the processing of batched messages. The message retry workflow may vary for different values for the strict order parameter. Additional aspects of the message retry workflow are discussed below with respect to FIG. 20 and FIG. 25.

The queue client 1050 may be implemented using any combination of the features described herein with respect to queue consumers and/or queue clients, such as the queue consumers 160A-160N. It is contemplated that the queue client 1050 may include additional components not shown, fewer components than shown, or different combinations, configurations, or quantities of the components shown. Although one queue client 1050 is shown for purposes of example and illustration, it is contemplated that different quantities and combinations of queue clients may be used. The queue client 1050 may be implemented using one or more computing devices, any of which may be implemented by the example computing device 5000 illustrated in FIG. 36. In some embodiments, the queue client 1050 may be implemented as one or more virtual compute instances and/or physical compute instances. In various embodiments, portions of the functionality shown in FIG. 11A may be provided by the same computing device or by any suitable number of different computing devices. If any of the components shown in FIG. 11A are implemented using different computing devices, then the components and their respective computing devices may be communicatively coupled, e.g., via a network. Each of the illustrated components may represent any combination of software and hardware usable to perform their respective functions.

In one embodiment, a control operation involving the queue client 1050 may be delayed until the processing of a batch is complete by the queue client. In general, the control operation may include any operation involving the queue client 1050 that is prompted by a control message sent by the queue service to the queue client. Control messages are discussed below with respect to FIGS. 16-18. The control operation may include, for example, a deprovisioning of the queue client 1050, a rebalancing of the range of values for the strict order parameter, etc. A batch sent to one queue client may include a particular value for the strict order parameter that the queue service 1010 seeks to rebalance, e.g., by assigning the value to a different queue client. In such circumstances, the queue service 1010 may wait until the first queue client has either successfully processed the entire batch or encountered a failure that causes the queue client to stop processing the remainder of the batch. Only after the attempted processing is complete may the queue service 1010 transfer the value for the strict order parameter to a different queue client.

Figure 11B:
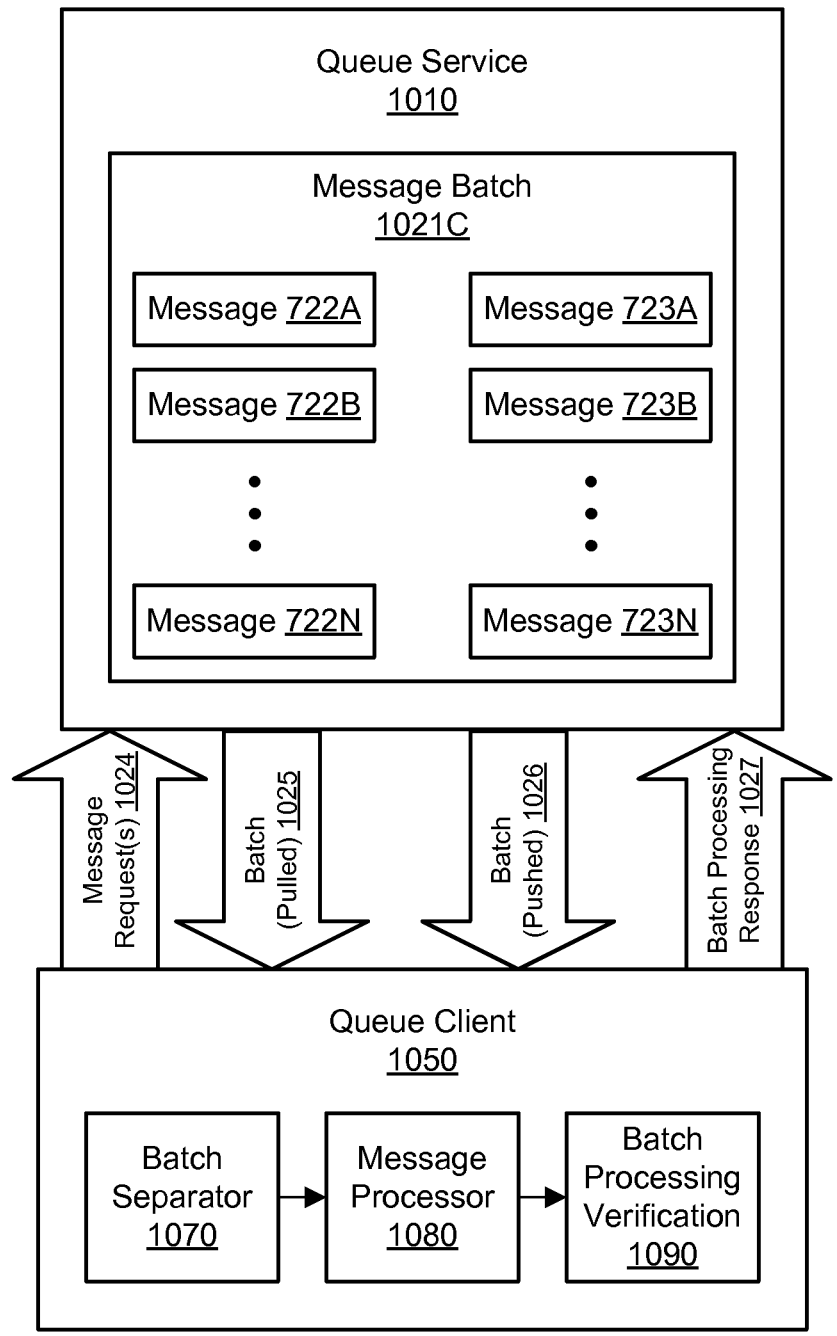
FIG. 11B illustrates an example system environment for delivering a message batch to a queue client in a distributed strict queue, where the batch represents multiple values for the strict order parameter, according to one embodiment.

FIG. 11B illustrates an example system environment for delivering a message batch to a queue client in a distributed strict queue, where the batch represents multiple values for the strict order parameter, according to one embodiment. After the batch 1021C is generated as discussed above with respect to FIG. 10B, the batches may be delivered to one or more queue clients such as queue client 1050. By ordering the messages within the batch 1021C according to the strict order guarantee for individual values for the strict order parameter, the strict order guarantee may be met. Additionally, each message may be delivered to a queue client once and only once (unless retry is necessary on message processing failure). Accordingly, each message may be limited to one and only one batch (unless retry is necessary on message processing failure).

Figure 11C:
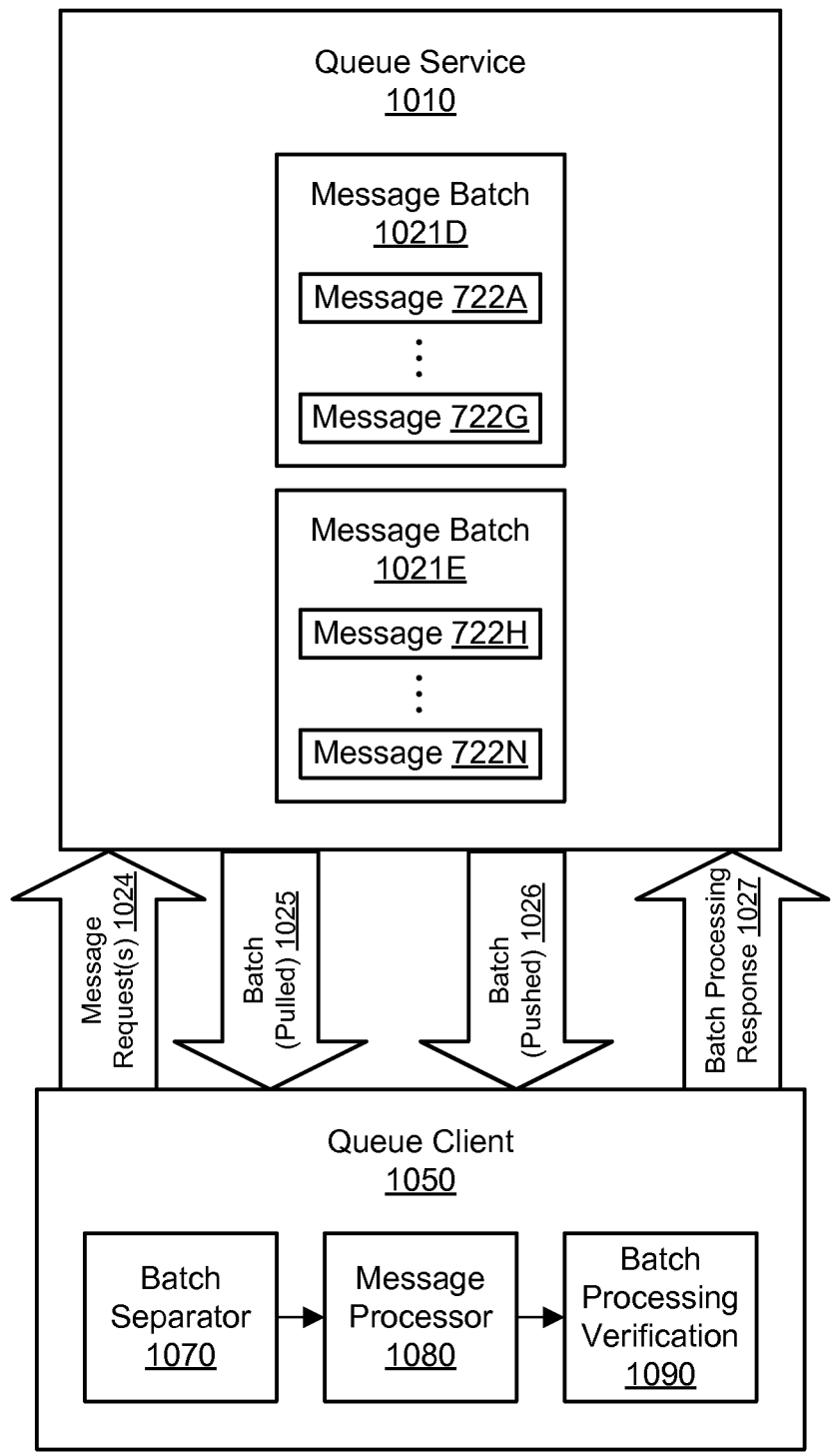
FIG. 11C illustrates an example system environment for delivering multiple message batches to a queue client in a distributed strict queue, according to one embodiment.

FIG. 11C illustrates an example system environment for delivering multiple message batches to a queue client in a distributed strict queue, according to one embodiment. After the batches 1021D and 1021E are generated as discussed above with respect to FIG. 10C, the batches may be delivered to one or more queue clients such as queue client 1050. By ordering the messages within the batches 1021D and 1021E according to the strict order guarantee for a particular value for the strict order parameter, and by also ordering the batches 1021D and 1021E themselves according to the strict order guarantee for a particular value for the strict order parameter, the strict order guarantee may be met. Additionally, each message may be delivered to a queue client once and only once (unless retry is necessary on message processing failure). Accordingly, each message may be limited to one and only one batch (unless retry is necessary on message processing failure).

Figure 12:
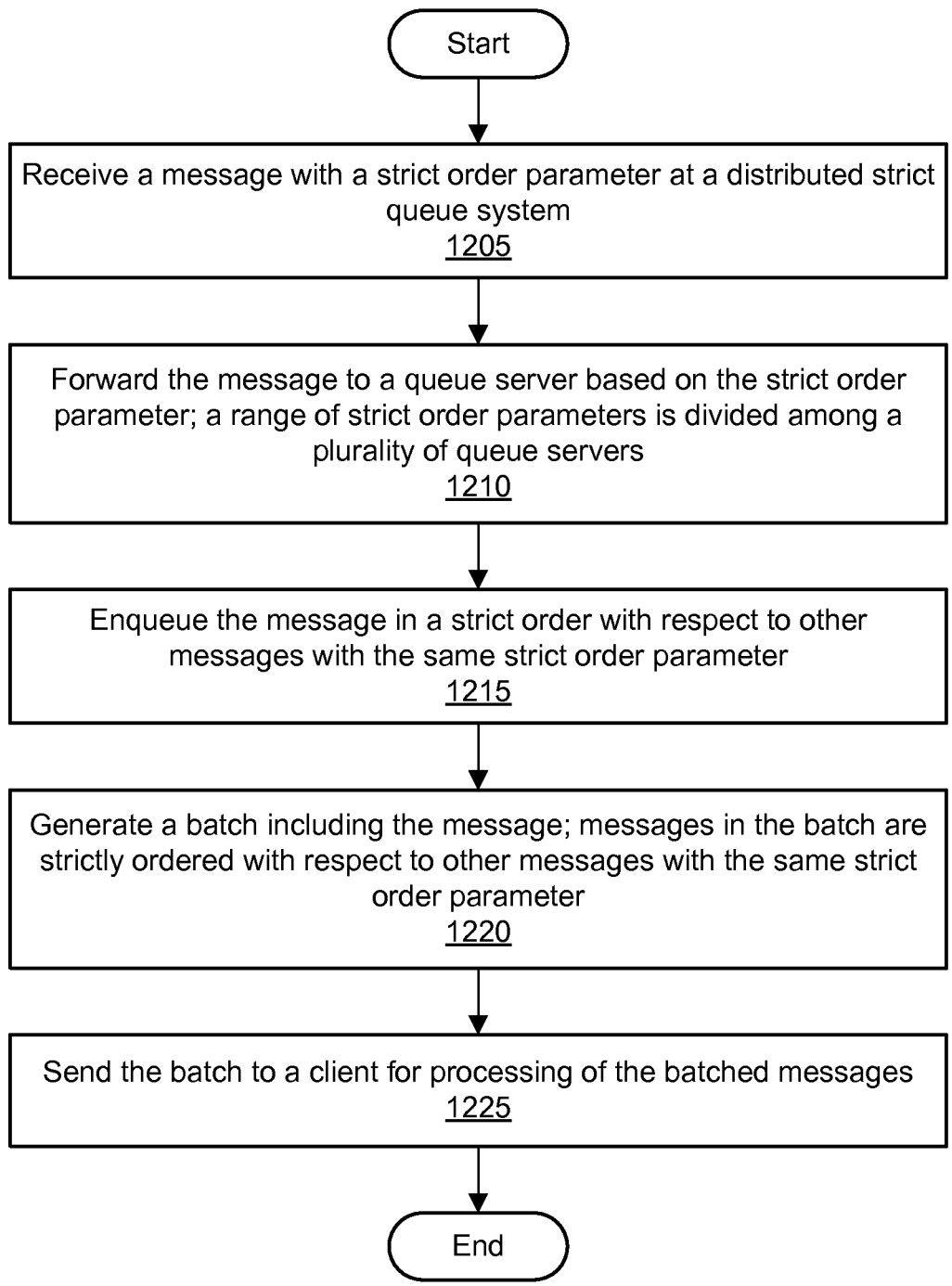
FIG. 12 is a flowchart illustrating a method for implementing message batching in a distributed strict queue, according to one embodiment.

FIG. 12 is a flowchart illustrating a method for implementing message batching in a distributed strict queue, according to one embodiment. As shown in 1205, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 1210, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 1215, the message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. One or more queue clients may be configured to dequeue and process the messages.

As shown in 1220, a batch may be generated to include the message and one or more additional messages. Messages within the batch may be strictly ordered based on the strict order parameter. In other words, messages with a first value for the strict order parameter may be ordered correctly within the batch, and messages with a second value for the strict order parameter may be ordered correctly within the batch. The batch may be generated either before a queue client requests messages or after (e.g., in response to) a request for messages from the queue client. The batch may be generated to optimize a use of network resources, e.g., network bandwidth and/or a quantity of calls made over the network.

As shown in 1225, the batch may be sent to a queue client. As discussed above, for each value for the strict order parameter in the batch, the messages for that value may be batched in the correct order. In other words, messages with a first value for the strict order parameter may be ordered correctly within the batch, and messages with a second value for the strict order parameter may be ordered correctly within the batch. The batch may be processed as a unit, such that the processing of the entire batch may be considered to fail if the processing of any of the individual messages fails. In one embodiment, the individual messages in the batch may be compressed to further optimize the use of network resources. In one embodiment, the batch may be compressed based on data derived from messages having one or more values for the strict order parameter for the messages in the batch.

Client Selection

Figure 13A:
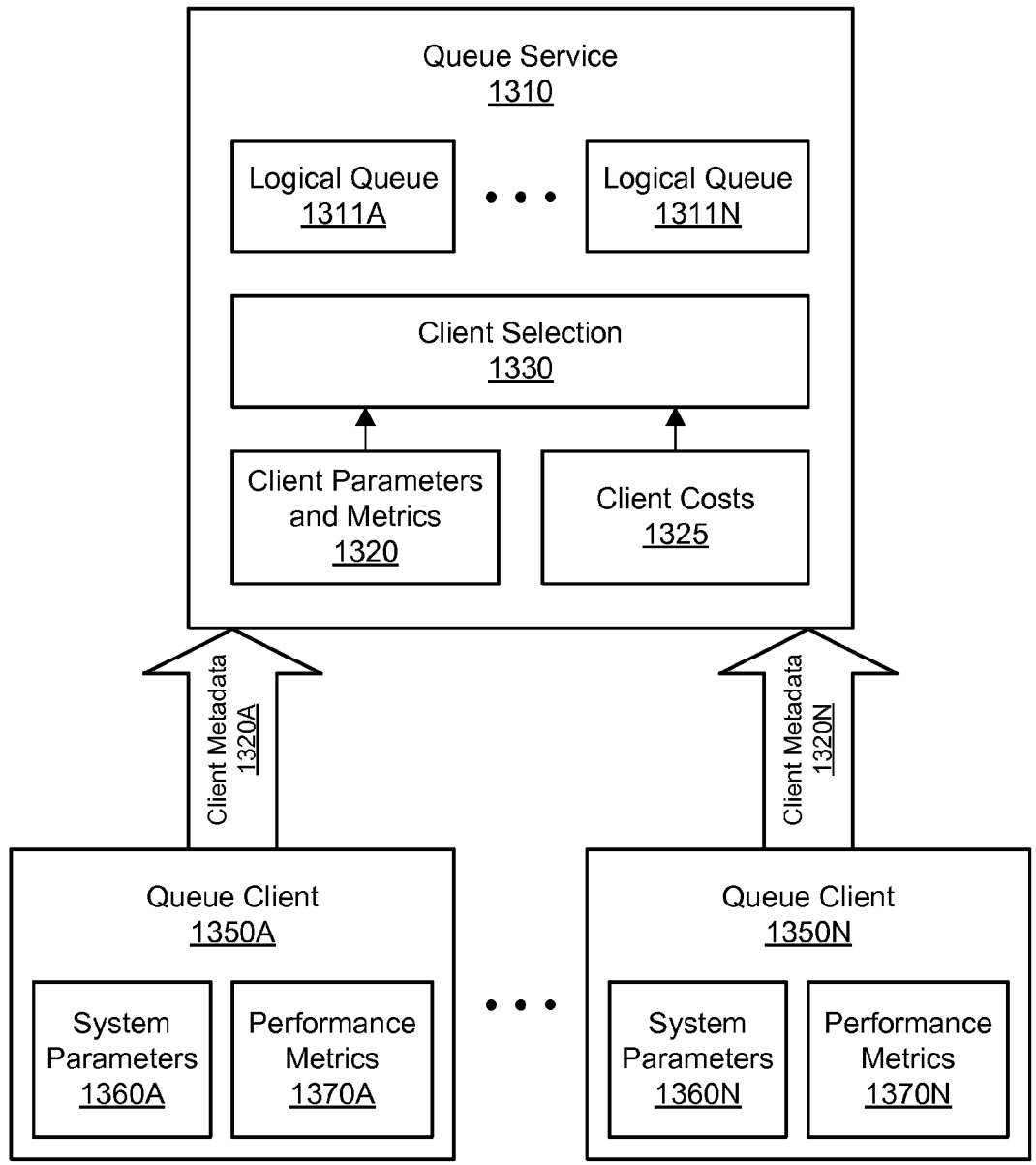
FIG. 13A illustrates an example system environment for client selection in a distributed strict queue, according to one embodiment.

FIG. 13A illustrates an example system environment for client selection in a distributed strict queue, according to one embodiment. A queue service 1310 may be implemented as part of a distributed strict queue system, such as the distributed strict queue system 100. Additionally, the queue service 1310 may be implemented using any combination of the features described herein with respect to queue services, such as the queue service 110. For example, the queue service 1310 may be implemented using one or more queue servers, such as queue servers 115A-115N shown in FIG. 1. As discussed above with respect to the queue service 110, the queue service 1310 may implement one or more logical queues (such as logical queues 1311A-1311N) in which messages with the same value for a strict order parameter are presented in their intended order. Queue clients 1350A-1350N may be implemented using any combination of the features described herein with respect to queue consumers and/or queue clients, such as the queue consumers 160A-

160N. The queue clients 1350A-1350N may receive the messages from the logical queue(s) (in their intended order for each value of the strict order parameter) and execute instructions in the messages or otherwise implement the messages. In one embodiment, the queue service 1310 may deliver each message only once.

It is contemplated that the queue service 1310 and queue clients 1350A-1350N may include additional components not shown, fewer components than shown, or different combinations, configurations, or quantities of the components shown. For example, although two queue clients 1350A and 1350N are shown for purposes of example and illustration, it is contemplated that different quantities and combinations of queue clients may be used. The queue service 1310 and queue clients 1350A-1350N may be implemented using one or more computing devices, any of which may be implemented by the example computing device 5000 illustrated in FIG. 36. In some embodiments, the queue service 1310 and/or queue clients 1350A-1350N may be implemented as one or more virtual compute instances and/or physical compute instances. In various embodiments, portions of the functionality shown in FIG. 13A may be provided by the same computing device or by any suitable number of different computing devices. If any of the components shown in FIG. 13A are implemented using different computing devices, then the components and their respective computing devices may be communicatively coupled, e.g., via a network. Each of the illustrated components may represent any combination of software and hardware usable to perform their respective functions.

The queue service 1310 may maintain one or more logical queues, such as logical queue 1311A and logical queue 1311N. Although two logical queues 1311A and 1311N are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 1311A may store a series of ordered messages having one value for the strict order parameter, and the logical queue 1311N may store another series of ordered messages having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. Accordingly, each of the queue clients 1350A-1350N may include a message processor that implements the instructions in the messages, potentially by invoking the functionality of one or more backend systems.

In one embodiment, a queue client may pull messages from the queue service 1310. The client may pull messages from one or more of the logical queues 1311A-1311N sending one or more requests for one or more additional messages to the queue service 1310 or by otherwise initiating the pulling of messages from the queue service. In one embodiment, the queue service 1310 may push messages to a queue client. The queue client may send to the queue service 1310 an indication of the client's health at appropriate points in time. In one embodiment, messages may be pushed to the queue client periodically based on an analysis of the queue client's health by the queue service 1310.

In one embodiment, the queue service 1310 may include a functionality for client selection 1330. The client selection functionality 1330 may select, from a pool of potential queue clients, one or more queue clients to process messages from one or more of the logical queue 1311A-1311N. The client selection functionality 1330 may use any suitable basis for selecting the queue client(s). In various embodiments, the client selection functionality 1330 may select a queue client based on performance optimization (e.g., using system parameters and/or performance metrics for clients), cost optimization, or any combination thereof. The client selection functionality 1330 may select a queue client to process a particular value or range of values for the strict order parameter. In one embodiment, the queue client may be selected to process messages (e.g., having a particular value or range of values for the strict order parameter) if the message processing throughput for the messages would not exceed the available message processing throughput at the queue client. The message processing throughput may be determined based on the number of messages, the average size of the messages (e.g., based on the message size parameter), the average time to process one of the messages, and/or any other suitable basis.

In one embodiment, the queue clients may be selected based (at least in part) on system parameters of the clients. The system parameters may describe aspects of the hardware configuration and/or software configuration of the corresponding client. For example, the system parameters may describe any suitable aspect(s) of hardware and/or software on the queue clients 1350A-1350N, including processor resources, memory (including cache) resources, persistent storage resources, network resources, system software resources, application software resources, etc. In general, the system parameters may describe the message processing capability of a computing instance on which a queue client is implemented. In various embodiments, the system parameters may be used for client selection either before or after potential clients have been provisioned or begun processing messages.

In one embodiment, the queue clients may be selected based (at least in part) on performance metrics for the clients. The performance metrics may describe aspects of the performance of the corresponding client. For example, the performance metrics may describe any suitable aspect(s) of hardware and/or software on the queue clients 1350A-1350N, including processor metrics, memory (including cache) metrics, storage metrics, network metrics, etc. The performance may include real-time metrics and/or aggregated metrics. In general, the performance metrics may describe the message processing capability of a queue client. In one embodiment, the performance metrics may indicate a message processing performance, e.g., as determined in processing one or more messages on the corresponding client. In one embodiment, metrics may be associated with a value for the strict order parameter for the processed message. In one embodiment, metrics may be associated with timestamps. In one embodiment, metrics may be sent to the queue service 1310 at multiple stages, such as preprocessing, processing, and completion of processing for a single message. Using the metrics provided for message processing (including pre-processing and completion of processing), the queue service 1310 may build a profile of the capabilities of an individual queue client. Accordingly, the performance metrics may be used for client selection after one or more clients have already begun processing messages and generating performance metrics for the message processing. In some circumstances, the performance metrics may be used for client selection after one or more clients have already processed messages but been terminated or quiesced; the performance metrics may indicate the performance of message processing prior to the termination.

In one embodiment, any of the queue clients 1350A-1350N may supply the system parameters and/or performance metrics to the queue service 1310. As shown in FIG. 13A, for example, queue client 1350A may determine and send system parameters 1360A and performance metrics 1370A as client metadata 1320A. Similarly, queue client 1350N may determine and send system parameters 1360N and performance metrics 1370N as client metadata 1320N. Alternatively, the queue service 1310 may ascertain aspects of the client metadata, such as the system parameters, from a table or registry describing potential clients. The queue service may store the system parameters 1360A-1360N and performance metrics 1370A-1370N as the client parameters and metrics 1320.

A particular queue client may be selected to process either an individual message or a particular value or range of values for the strict order parameter. The queue client may be matched to suitable message(s) based on the message processing capability of the client along with any data or metadata of the message(s). In one embodiment, a queue producer may provide, along with one or more message, data or metadata indicative of a minimum configuration for a queue client. In one embodiment, the queue clients may be selected based (at least in part) on a message size parameter for individual messages. In one embodiment, a message size parameter may be supplied by the queue producer on a message-by-message basis. The message size parameter may be an integer for which smaller values tend to indicate a shorter processing time and for which larger values tend to indicate a longer processing time. The queue service 1310 may determine a correlation between particular performance metrics for a queue client and the message size of messages provided to that queue client. Clients with greater computational resources may be assigned larger messages, while clients with lesser computational resources may be assigned smaller messages. For values of the strict order parameter that tend to have large message sizes, the queue service 1310 may assign those values to queue clients with sufficient resources to process the largest messages. If large messages occur only rarely for a particular value for the strict order parameter, then the queue service 1310 may temporarily transfer responsibility for the corresponding value for the strict order parameter away from a less capable client and toward a more capable queue client when a large message is encountered.

In one embodiment, the queue clients may be selected based (at least in part) on cost optimization. For example, the software licensing costs for particular queue clients may be considered. Accordingly, the queue service may maintain data describing client costs 1325. The client costs 1325 may include costs of provisioning and/or operating queue clients, e.g., energy costs for particular classes of hosts. The client costs 1325 may include the costs of software licenses, e.g., for software used in processing messages as well as system software and other support software. By optimizing for cost, including software licensing cost, the queue service 1310 may prefer to run fewer queue clients if each queue client requires a separate license. In such circumstances, the queue service 1310 may select a fewer number of queue clients that have greater computational resources in order to provide sufficient processing power while minimizing the licensing cost. In other circumstances, e.g., where one license covers multiple host machines, the queue service 1310 may select a greater number of queue clients that have lesser computational resources. The queue service 1310 may also optimize the selection of queue clients based on the license requirements and/or purchasing model. For example, if a software license costs a particular amount over a particular interval of time, then the queue service 1310 may have a preference for running clients in blocks of time that do not exceed the particular interval of time. In one embodiment, the queue service 1310 may be aware of the cost of software licenses, the number of available licenses, the licensing scheme for particular licenses (e.g., per time interval, per host, per core, per site, etc.), and other preferences for licensing (e.g., the queue service 1310 may prefer to revoke a license from a queue client on a temporary basis without terminating the queue client for the sake of faster reprovisioning). In one embodiment, any number of computing instances for queue servers may be selected for use with the distributed strict queue system on a similar basis as described above with respect to selecting queue clients. In one embodiment, any number of computing instances for network proxies may be selected for use with the distributed strict queue system on a similar basis as described above with respect to selecting queue clients.

Figure 13B:
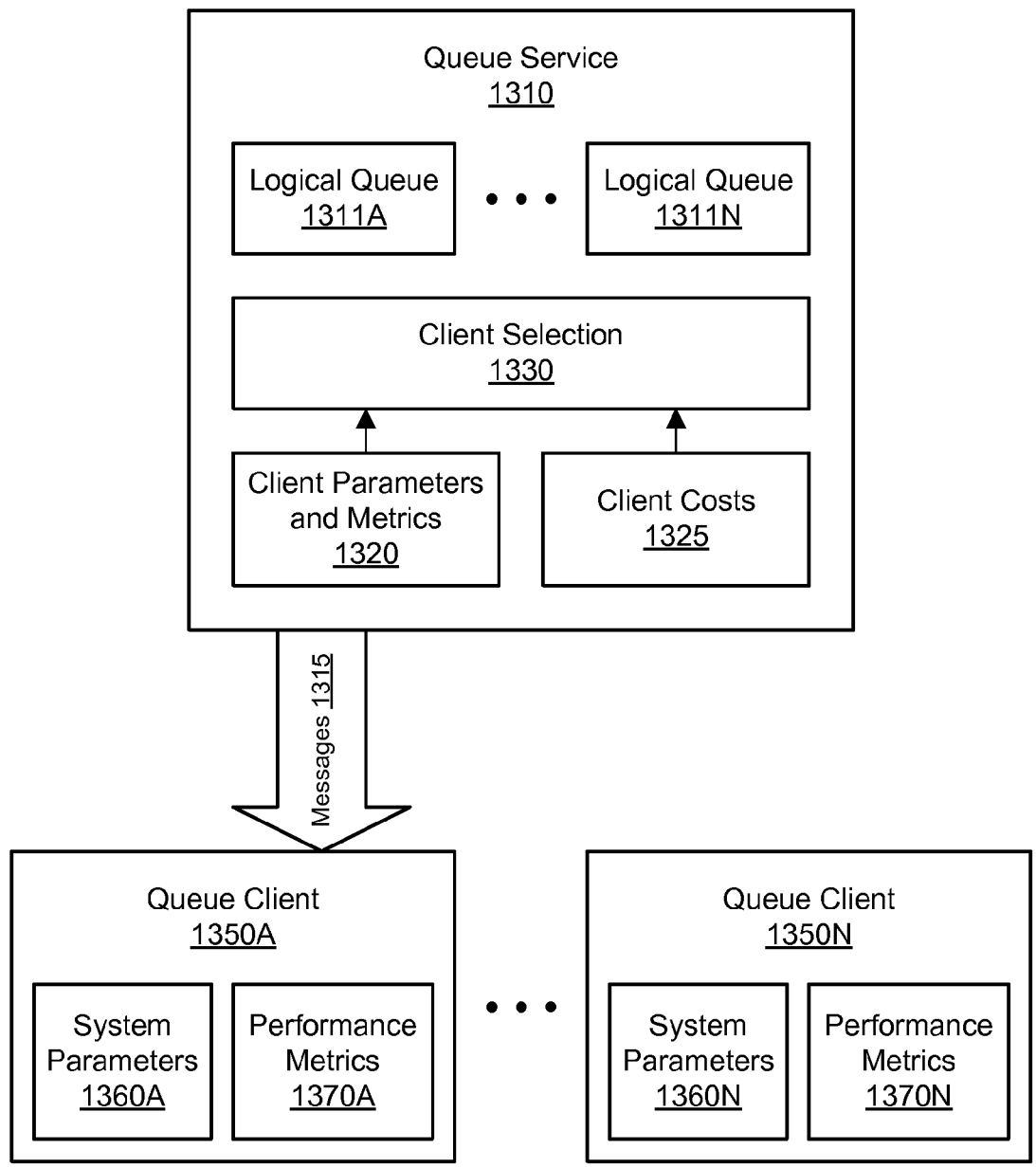
FIG. 13B illustrates further aspects of an example system environment for client selection in a distributed strict queue, according to one embodiment.

FIG. 13B illustrates further aspects of an example system environment for client selection in a distributed strict queue, according to one embodiment. Based on any combination of suitable criteria as discussed above, one or more queue clients may be selected to process messages. For example, the queue client 1350A may be selected from a pool of potential clients 1350A-1350N to process messages 1325. The messages 1325 may represent one or more values (or a range of values) for the strict order parameter and may be provided to the selected client 1350A from one or more queues such as logical queues 1311A-1311N. In one embodiment, the queue client 1350A may be selected specifically to process messages 1325 having a particular one or more values (or a range of values) for the strict order parameter.

In one embodiment, the performance metrics 1370A may be collected and/or updated during the processing of the messages 1325 by the queue client 1350A. The updated performance metrics 1370A may be sent to the queue service 1310 for analysis, e.g., by the client selection functionality 1330. If the updated performance metrics 1370A indicate that the queue client 1350A does not have sufficient resources (e.g., computational resources, memory resources, storage resources, network resources, etc.) to process the messages 1325 efficiently, then the client selection functionality 1330 may reduce the workload for the queue client 1350A or terminate the queue client 1350A. For example, the queue service 1310 may rebalance the range of values for the strict order parameter to reduce the workload for the queue client 1350A and increase the workload for one or more other queue clients. On the other hand, if the updated performance metrics 1370A indicate that the queue client 1350A has more than sufficient resources (e.g., computational resources, memory resources, storage resources, network resources, etc.) to process the messages 1325 efficiently, then the client selection functionality 1330 may increase the workload for the queue client 1350A. For example, the queue service 1310 may rebalance the range of values for the strict order parameter to increase the workload for the queue client 1350A and terminate or decrease the workload for one or more other queue clients.

Figure 14A:
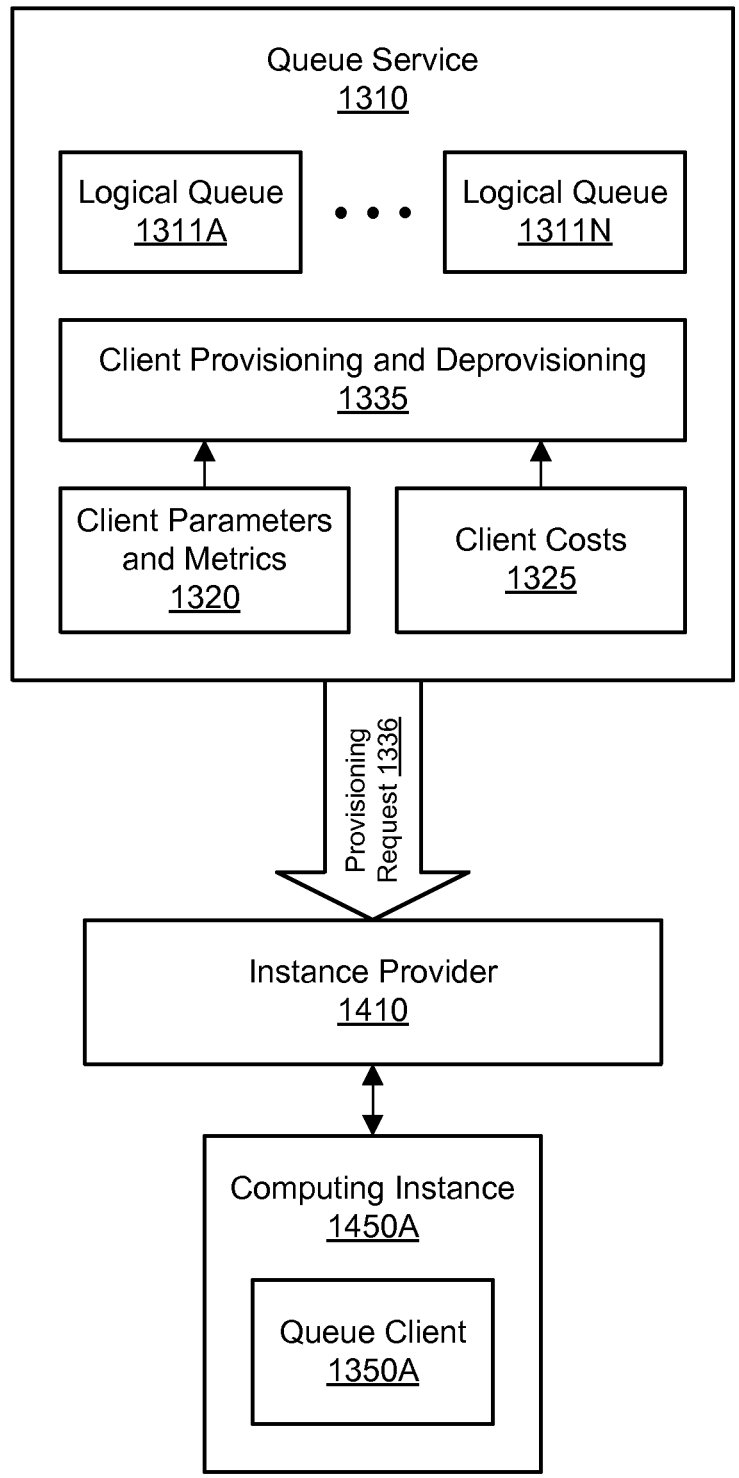
FIG. 14A illustrates an example system environment for client selection in a distributed strict queue, including client provisioning, according to one embodiment.
Figure 14B:
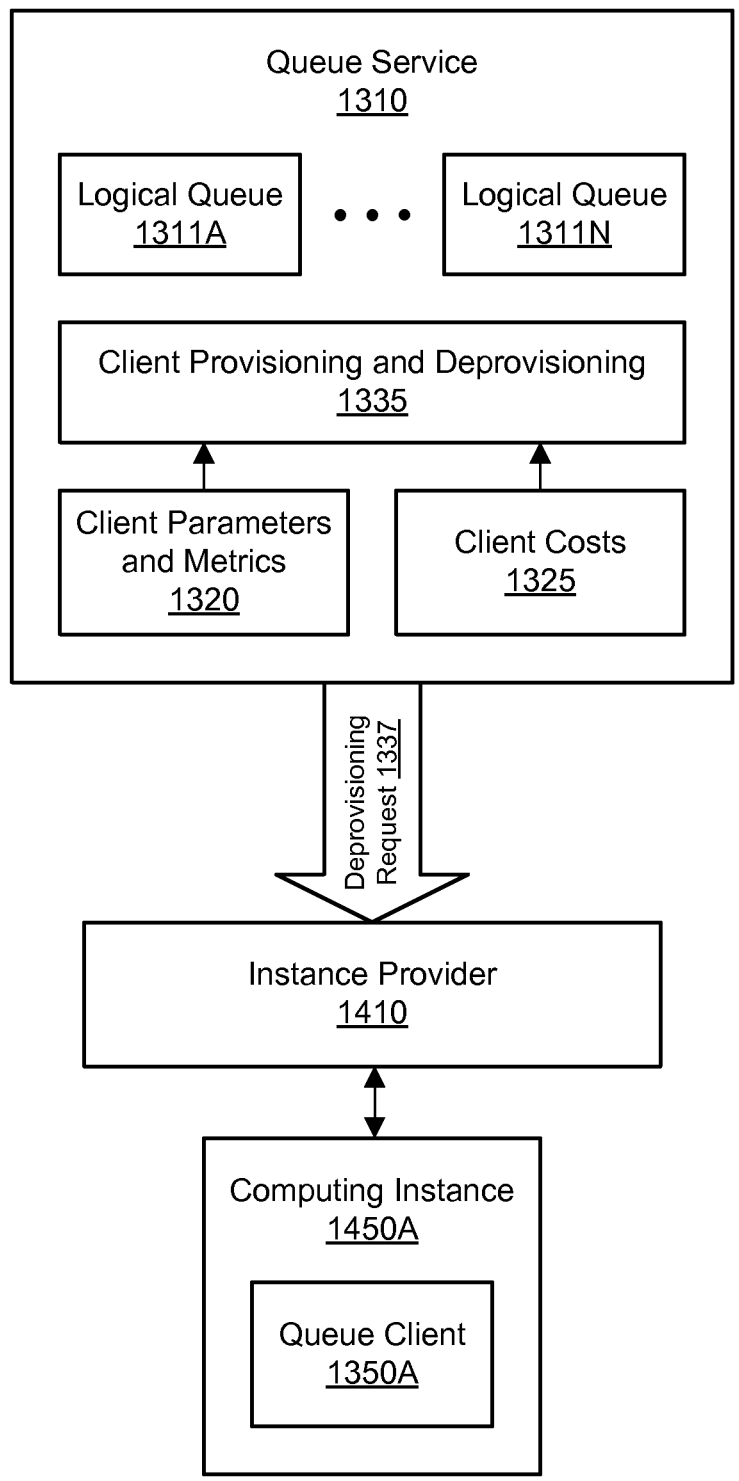
FIG. 14B illustrates an example system environment for client selection in a distributed strict queue, including client deprovisioning, according to one embodiment.

FIG. 14A illustrates an example system environment for client selection in a distributed strict queue, including client provisioning, according to one embodiment. FIG. 14B illustrates an example system environment for client selection in a distributed strict queue, including client deprovisioning, according to one embodiment. In one embodiment, the queue service 1310 may include a functionality for client provisioning and deprovisioning 1335. Using the client provisioning and deprovisioning functionality 1335, the queue service 1310 may provision one or more host machines for queue clients. In one embodiment, the queue service 1310 may provision the host machines by reserving them from a pool of available host machines (e.g., by reserving host machines whose host class has particular system parameters) and installing and/or configuring the client software of the host machines. The pool of available host machines may include physical compute instances and/or virtual compute instances. In one embodiment, one or more software licenses may be reserved for particular queue clients when the clients are provisioned. In one embodiment, a newly provisioned queue client may be tested using a dummy message; dummy messages are discussed in greater detail below with respect to FIGS. 21A and 21B. Similarly, using the client provisioning and deprovisioning functionality 1335, the queue service 1310 may deprovision one or more host machines for queue clients. In one embodiment, the queue service 1310 may deprovision the host machines by terminating the processing of messages at the particular queue clients and returning the host machines to the pool of available host machines.

In a similar manner as the client selection 1330 discussed above, the client provisioning and deprovisioning functionality 1335 may select, from a pool of potential host machines, one or more host machines to process messages from one or more of the logical queue 1311A-1311N. The client provisioning and deprovisioning functionality 1335 may use any suitable basis for selecting the queue client(s). In various embodiments, the client provisioning and deprovisioning functionality 1335 may select a queue client based on performance optimization (e.g., using system parameters and/or performance metrics for clients), cost optimization, or any combination thereof. In various embodiments, the client provisioning and deprovisioning functionality 1335 may utilize the client selection functionality 1330 or implement a similar functionality. Typically, queue clients may be provisioned to scale up the collective computational resources for processing messages, and queue clients may be deprovisioned to scale down the collective computational resources for processing messages.

As shown in FIG. 14A, the queue service 1310 may provision a queue client 1350A. In one embodiment, the queue service 1310 may send one or more provisioning requests 1336 to an instance provider 1410. In one embodiment, the instance provider 1410 may select a computing instance 1450A for use in implementing the queue client 1350A. The instance provider 1410 may select the instance 1450A from a pool of available instances based on information received from the queue service 1310, e.g., information generated using the client provisioning and deprovisioning functionality 1335. In one embodiment, the instance provider 1410 may select the instance 1450A based on the hardware parameters of its host class, its location with respect to one or more geographic or logical zones, its cost of provisioning and/or operation, and any other suitable criteria. The selected instance 1450A may be a physical computing instance or a virtual computing instance. The instance provider 1410 may also prepare the queue client 1350A for processing queue messages by installing appropriate client software or otherwise configuring the queue client 1350A. The provisioning request 1336 may include information usable by the client 1350A to configure itself. In one embodiment, the instance provider 1410 may obtain a state of the instance 1450A (including a health of the instance and/or any relevant performance metrics) at any suitable time, e.g., after the selection and provisioning of the instance.

As shown in FIG. 14B, the queue service 1310 may deprovision a queue client 1350A. In one embodiment, the queue service 1310 may send one or more deprovisioning requests 1337 to an instance provider 1410. In one embodiment, the instance provider 1410 may perform any steps needed to deprovision or disable the computing instance 1450A and/or software of the queue client 1350A. For example, the instance provider 1410 may prepare the queue client 1350A to discontinue processing queue messages, terminate the queue client 1350A, or otherwise configure the queue client 1350A. Additionally, the instance provider 1410 may return the computing instance 1450A used to implement the queue client 1350A to a pool of available instances In one embodiment, one or more queue clients may be provisioned in anticipation of a need for additional computational resources. For example, an atypically large quantity of messages (or a quantity of messages having a larger size) may be anticipated at a particular time based on past history. Accordingly, the queue service 1310 or another component may track spikes in queue size and apply machine learning techniques to predict when additional queue clients may be needed in the future. At or before the time when the spike is expected to occur, the queue service may provision one or more additional queue clients to handle the heavier load. In other words, the additional queue client(s) may be provisioned prior to the actual receipt by the queue service 1310 of at least some of the spike in messages.

In one embodiment, one or more queue clients may be deprovisioned to minimize software licensing costs for the queue clients. While the queue client(s) are deprovisioned, the software licensing costs may be reduced or eliminated for the particular clients. For example, the software licensing costs may be payable per interval of time, e.g., per hour. While the queue client(s) are deprovisioned, the queue service 1310 may accumulate messages in the one or more logical queues 1311A-1311N. Once a sufficient quantity of messages (or messages of sufficient size) have accumulated to warrant paying the software licensing cost for an interval of time, the queue service 1310 may provision one or more queue clients to handle the accumulated load of messages.

Figure 15:
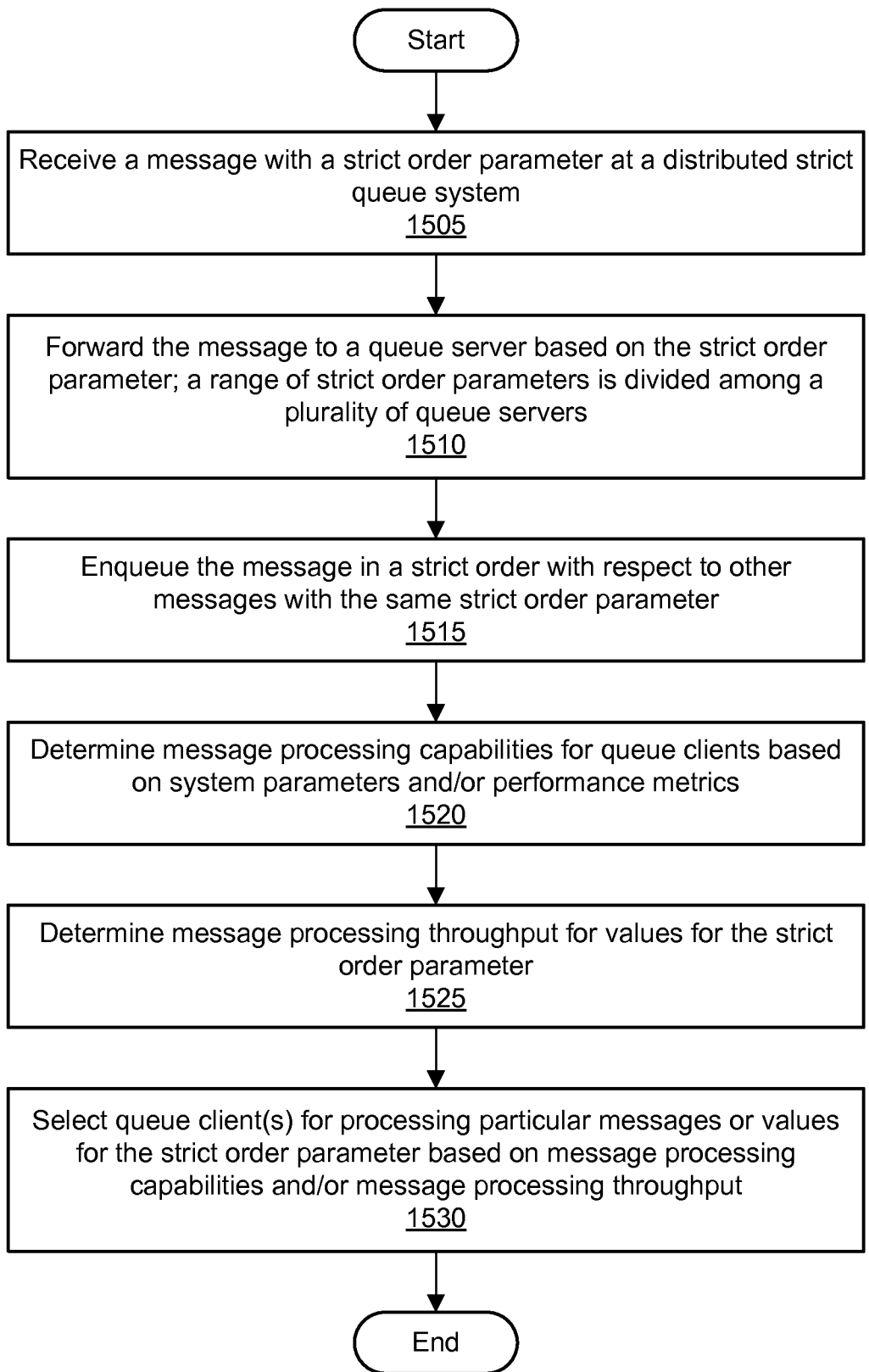
FIG. 15 is a flowchart illustrating a method for implementing client selection in a distributed strict queue, according to one embodiment.

FIG. 15 is a flowchart illustrating a method for implementing client selection in a distributed strict queue, according to one embodiment. As shown in 1505, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 1510, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 1515, the message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. Queue clients may be configured to dequeue and process the messages.

As shown in 1520, the message processing capabilities of queue clients may be determined. The message processing capabilities may be based on one or more system parameters and/or one or more performance metrics. The system parameters may describe aspects of the hardware configuration and/or software configuration of the corresponding client. The performance metrics may describe aspects of the performance of the corresponding client. The performance metrics may indicate a message processing performance, e.g., as determined in processing one or more messages on the corresponding client.

As shown in 1525, the message processing throughput may be determined for individual values for the strict order parameter. In one embodiment, the message processing throughput may be based (at least in part) on the average number of messages produced over a period of time for a particular value for the strict order parameter. In one embodiment, the message processing throughput may be based (at least in part) on the average processing time for messages having a particular value for the strict order parameter. In one embodiment, the message processing throughput may be based (at least in part) on the average size of messages for a particular value for the strict order parameter.

As shown in 1530, one or more queue clients may be selected to process individual messages in the queue(s) or to process particular values or ranges of values for the strict order parameter. In one embodiment, the queue clients may be selected based (at least in part) on the message processing capabilities, e.g., the system parameters and/or performance metrics. When a client is selected to process particular values or ranges of values for the strict order parameter, the message processing throughput of the values or ranges may not exceed an available throughput at the selected client. In one embodiment, the queue clients may be selected to process particular messages based (at least in part) on any data or metadata in one or more messages, such as a message size parameter for individual messages. For example, clients with greater computational resources may be assigned larger messages, while clients with lesser computational resources may be assigned smaller messages. In one embodiment, the queue clients may be selected based (at least in part) on cost optimization. For example, the software licensing cost for particular queue clients may be considered. In one embodiment, one or more software licenses may be reserved for particular queue clients, e.g., when the clients are provisioned.

Client Control

Figure 16A:
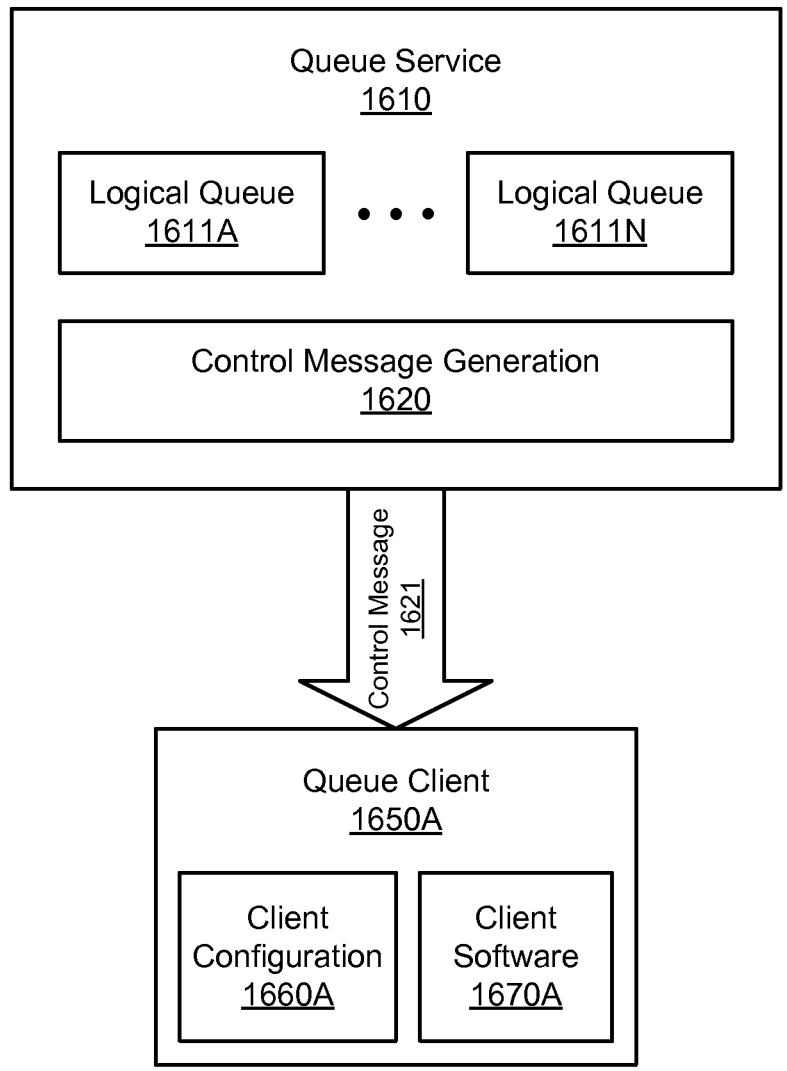
FIG. 16A illustrates an example system environment for client control in a distributed strict queue, according to one embodiment.

FIG. 16A illustrates an example system environment for client control in a distributed strict queue, according to one embodiment. A queue service 1610 may be implemented as part of a distributed strict queue system, such as the distributed strict queue system 100. Additionally, the queue service 1610 may be implemented using any combination of the features described herein with respect to queue services, such as the queue service 110. For example, the queue service 1610 may be implemented using one or more queue servers, such as queue servers 115A-115N shown in FIG. 1. As discussed above with respect to the queue service 110, the queue service 1610 may implement one or more logical queues (such as logical queues 1611A-1611N) in which messages with the same value for a strict order parameter are presented in their intended order. A queue client 1650A (along with other queue clients) may be implemented using any combination of the features described herein with respect to queue consumers and/or queue clients, such as the queue consumers 160A-160N. The queue client 1650A may receive the messages from the logical queue(s) (in their intended order for each value of the strict order parameter) and execute instructions in the messages or otherwise implement the messages. In one embodiment, the queue service 1610 may deliver each message only once.

It is contemplated that the queue service 1610 and queue client 1650A may include additional components not shown, fewer components than shown, or different combinations, configurations, or quantities of the components shown. For example, although one queue client 1650A is shown for purposes of example and illustration, it is contemplated that different quantities and combinations of queue clients may be used. The queue service 1610 and queue client 1650A may be implemented using one or more computing devices, any of which may be implemented by the example computing device 5000 illustrated in FIG. 36. In some embodiments, the queue service 1610 and/or queue client 1650A may be implemented as one or more virtual compute instances and/or physical compute instances. In various embodiments, portions of the functionality shown in FIG. 16A may be provided by the same computing device or by any suitable number of different computing devices. If any of the components shown in FIG. 16A are implemented using different computing devices, then the components and their respective computing devices may be communicatively coupled, e.g., via a network. Each of the illustrated components may represent any combination of software and hardware usable to perform their respective functions.

The queue service 1610 may maintain one or more logical queues, such as logical queue 1611A and logical queue 1611N. Although two logical queues 1611A and 1611N are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 1611A may store a series of ordered messages having one value for the strict order parameter, and the logical queue 1611N may store another series of ordered messages having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. Accordingly, each of the queue clients may include client software configured to process messages, such as client software 1670A for queue client 1650A. The client software 1670A may implement the instructions in the messages, potentially by invoking the functionality of one or more backend systems.

In one embodiment, a queue client may pull messages from the queue service 1610. The client may pull messages from one or more of the logical queues 1611A-1611N sending one or more requests for one or more additional messages to the queue service 1610 or by otherwise initiating the pulling of messages from the queue service. In one embodiment, the queue service 1610 may push messages to a queue client. The queue client may send to the queue service 1610 an indication of the client's health at appropriate points in time. In one embodiment, messages may be pushed to the queue client periodically based on an analysis of the queue client's health by the queue service 1610.

Each of the queue clients may include a configuration that may impact the processing of messages, such as client configuration 1660A for queue client 1650A. The client configuration 1660A may include a configuration of system software on the queue client 1650A, including one or more tunable parameters of the system software. For example, the client configuration 1660A may indicate a heap size for a virtual machine; the client software 1670A may run within the virtual machine. In one embodiment, the client configuration 1660A may include a hardware configuration. In general, the client configuration 1660A may control any suitable aspect(s) of hardware and/or software on the queue client 1650A, including processor usage, cache usage, transient memory usage, persistent storage usage, network usage, system software usage, application software usage, etc. Additionally, the client software 1670A may have its own configuration, including one or more tunable parameters. For example, the parameters of the client software 1670A may affect the way in which the client software 1670A processes messages, emits metrics, emits logs, communicates with the queue service 1610, etc.

In one embodiment, the queue service 1610 may include a functionality for control message generation 1620. The control message generation functionality 1620 may generate one or more control messages; a control message, when executed or implemented by a queue client, may modify the client configuration and/or configuration of the client software. As shown in FIG. 16A, the queue service 1610 may generate and send a control message 1621 to the queue client 1650A. The control message 1621 may be sent once to any set of one or more queue clients selected by the queue service 1610. The control message 1621 may include one or more commands to be executed or implemented by the queue client 1650A, e.g., terminal-level commands or other system-level commands. The execution of such commands may result in a change in one or more system parameters or any other change in the client configuration 1660A at the queue client 1650A. Alternatively, the control message 1621 may include one or more commands to be executed or implemented by the client software 1650A. The execution of such commands may result in a change in one or more parameters of the client software 1670A at the queue client 1650A. The control message 1621 may trigger the queue client 1650A to download executable program code from another component. For example, the control message 1621 may trigger the queue client 1650A to update the client software 1670A by downloading a new version of the software or an update to the software from another component. In one embodiment, the control message 1621 may cause a modification in how messages are processed by the queue client 1650A. The control messages may be sent using the same data channel as the regular queue messages or using out-of-band communications techniques.

Figure 16B:
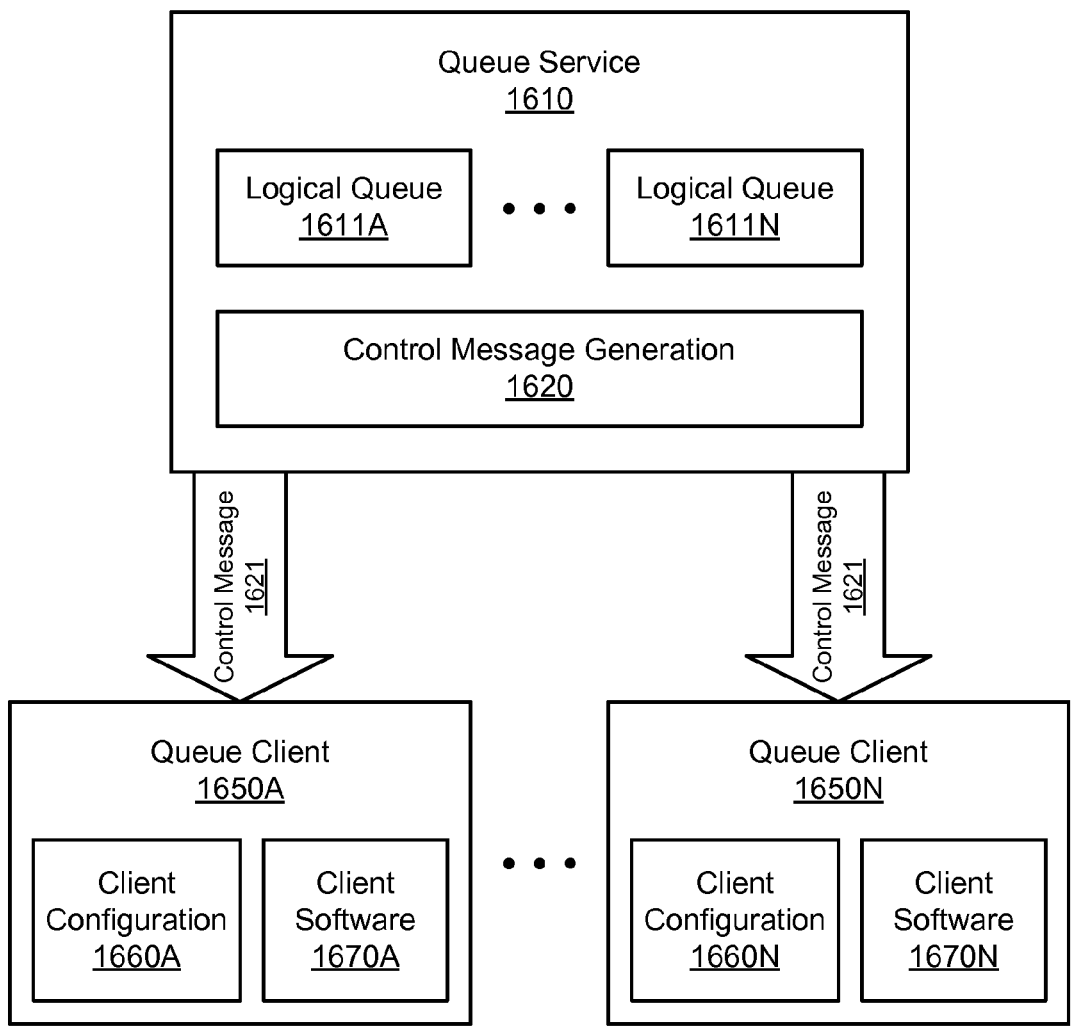
FIG. 16B illustrates an example system environment for client control in a distributed strict queue, including control of multiple clients using a broadcasted control message, according to one embodiment.

FIG. 16B illustrates an example system environment for client control in a distributed strict queue, including control of multiple clients using a broadcasted control message, according to one embodiment. In one embodiment, the queue service 1610 may control the operation of multiple clients, such as queue clients 1650A-1650N. The queue service 1610 may broadcast the same control message 1621 (or substantially identical copies of the control message 1621) to a set of the queue clients. As shown in FIG. 16B, for example, the queue service 1610 may broadcast the same control message 1621 to queue client 1650A, queue client 1650N, and optionally one or more other queue clients (not shown). As a result, the same or similar modifications may be made by all the queue clients 1650A-1650N that receive and implement the control message 1621. For example, the control message 1621 may cause a similar change to the client configurations 1660A and 1660N and/or a similar change to the configurations of client software 1670A and 1670N. In one embodiment, a particular client state may be rolled out to different portions of a client fleet over time or to an entire fleet over time. The queue service 1610 may send one or more different control messages to other queue clients. In this manner, the queue service 1610 may selectively modify the configurations of different queue clients in different ways.

In one embodiment, client configurations may be modified differently for different value or ranges of values for the strict order parameter. In one embodiment, client configurations may be modified based on a user preference or user specification. In one embodiment, any suitable information in a queue message, as specified by a user, may be used to modify one or more client configurations. For example, messages with a message size parameter lower than a particular threshold may be assigned to "lightweight" clients. Similarly, messages with a message size parameter exceeding a particular threshold may be assigned to clients having sufficient resources to process such messages; the assignment of the strict order parameter may be transferred from one machine to another on a temporary basis to process a larger message. As another example, if values or ranges of values for the strict order parameter are assigned to particular clients due to heavier processing requirements for the values, then the configurations of those clients may vary from the configurations of other clients in order to permit efficient processing of messages.

Figure 17A:
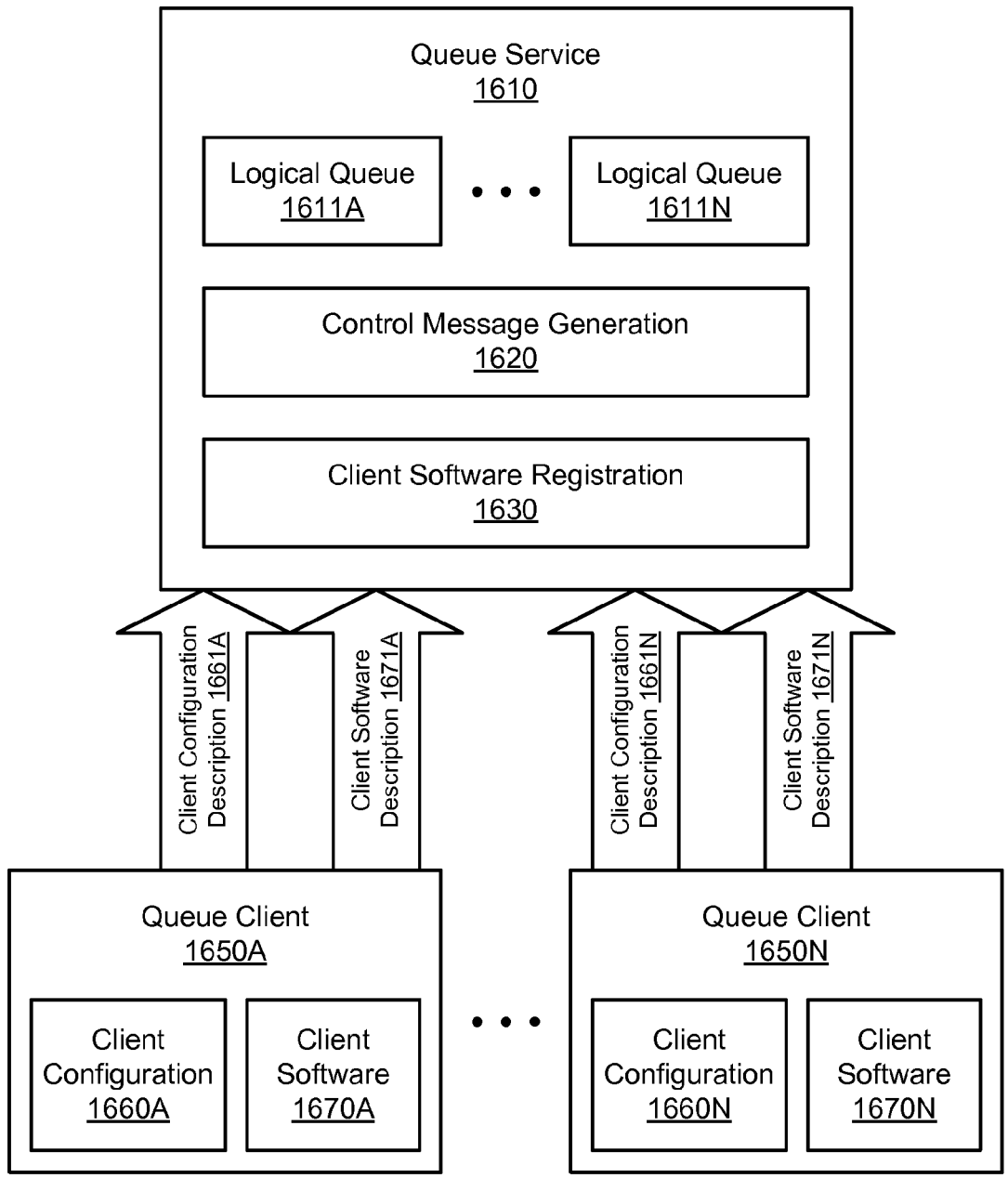
FIG. 17A illustrates an example system environment for client control in a distributed strict queue, including client software registration, according to one embodiment.

FIG. 17A illustrates an example system environment for client control in a distributed strict queue, including client software registration, according to one embodiment. In one embodiment, the queue service 1610 may include a functionality for client software registration 1630. Using the client software registration functionality 1630, the queue service may maintain and/or update a registry that identifies client software at one or more of the queue clients 1650A-1650N. The client software registry may indicate the name of the client software at one or more of the queue clients 1650A-1650N, the version of the client software at one or more of the queue clients 1650A-1650N, the update history for client software at one or more of the queue clients 1650A-1650N, and/or the type of functionality implemented by the client software installed on one or more of the queue clients 1650A-1650N.

In one embodiment, the client software registry may be updated using information sent from the one or more queue clients 1650A-1650N. For example, as shown in FIG. 17A, queue client 1650A may send a client software description 1671A to the queue service 1610, and queue client 1650N may send a client software description 1671N to the queue service 1610. The client software descriptions 1671A and 1671N may identify any relevant aspect of the client software installed on the corresponding queue client, such as the name, version, and/or other indication of functionality of the client software. Based on the client software descriptions 1671A and 1671N, the client software registration functionality 1630 may update the client software registry for the queue clients 1650A-1650N. Additionally, the client software registration functionality 1630 may update the client software registry for particular queue clients based on a standard configuration that the queue clients are known to have, e.g., when the queue clients are provisioned from a hardware pool based on known characteristics of the provisioned machines.

In one embodiment, the queue clients 1650A-1650N may also send data describing their respective configurations 1660A-1660N to the queue service 1610. For example, queue client 1650A may send a client configuration description 1661A to the queue service 1610, and queue client 1650N may send a client configuration description 1661N to the queue service 1610. The queue service 1610 may store aspects of the client configuration descriptions 1661A-1661N, e.g., using the client software registration functionality 1630 or an equivalent functionality. Based on the client software descriptions 1671A-1671N and/or the client configuration descriptions 1661A-1661N, the queue service 1610 may determine how to maintain or modify the client software 1670A-1670N and/or client configurations 1660A-1660N.

Figure 17B:
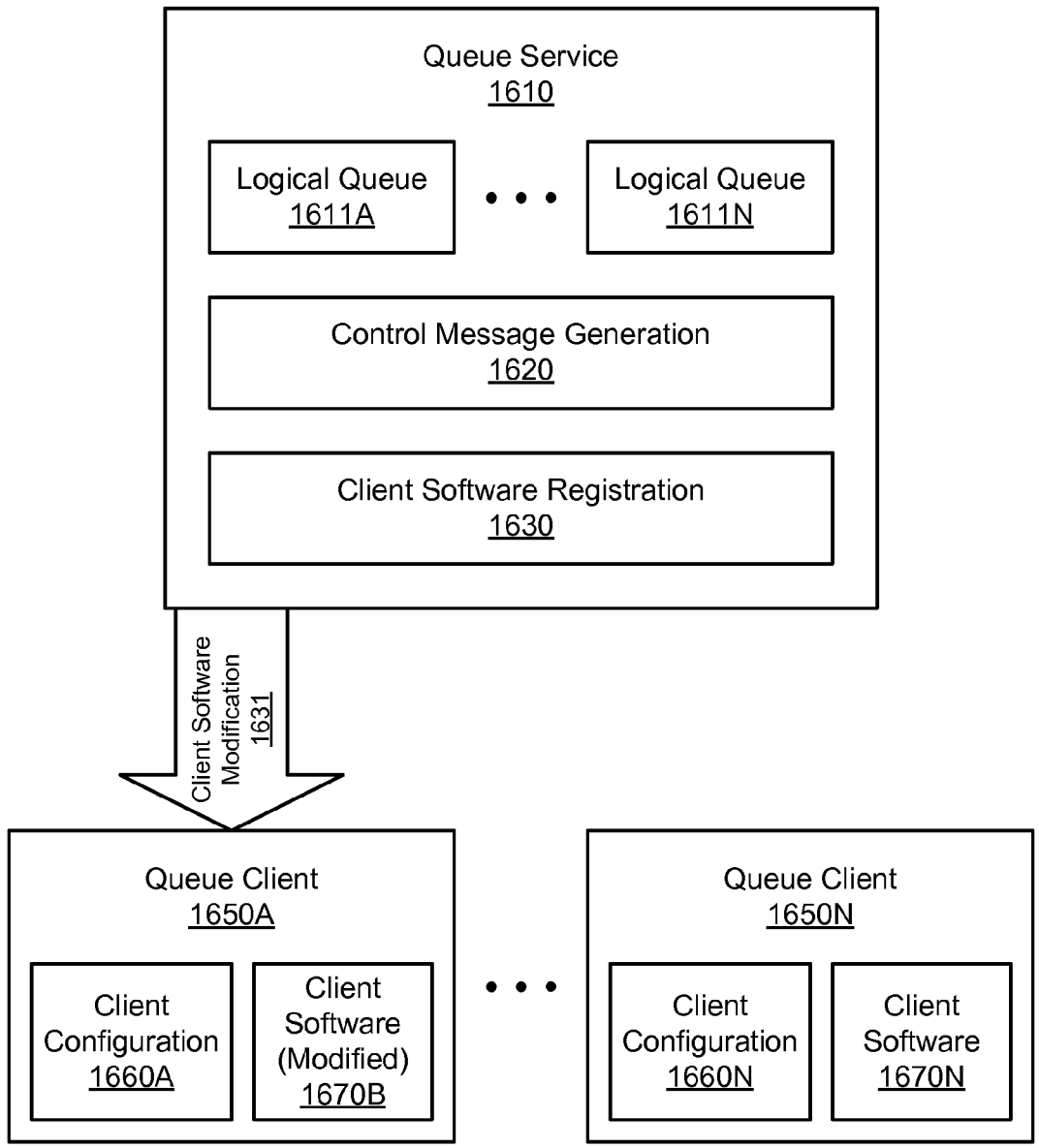
FIG. 17B illustrates an example system environment for client control in a distributed strict queue, including client software modification, according to one embodiment.

FIG. 17B illustrates an example system environment for client control in a distributed strict queue, including client software modification, according to one embodiment. In one embodiment, control messages may be used to modify the client software at one or more queue clients 1650A-1650N. In other words, a control message may cause a queue client to install or enable new client software, install or enable a new version of client software, install or enable one or more modules to existing client software, uninstall or disable existing client software, and/or uninstall or disable one or more modules in existing client software. For example, to cause such a change to the client software on queue client 1650A, the control message generation functionality 1620 may generate and send a control message with a client software update 1631. The client 1650A may then install or enable the modified client software 1670B (and potentially uninstall or disable all or part of the existing client software 1670A) based on the control message 1631. The client software modification 1631 may be generated using the information maintained by the client software registration functionality 1630. In one embodiment, the queue client 1650A may confirm the implementation of the requested modification, and the client software registry 1630 may be updated accordingly.

The queue service 1610 may send one or more control messages to other queue clients, such as queue client 1650N, to modify the client software on the other queue client(s) to a different version. In this manner, the queue service 1610 may selectively modify the client software of different queue clients in different ways. For example, the queue service 1610 may perform rolling deployments of client software to different queue clients. In one embodiment, queue clients that are responsible for different ranges of values for the strict order parameter may have their client software updated in a different manner, e.g., with different versions of client software or different types of client software.

Figure 17C:
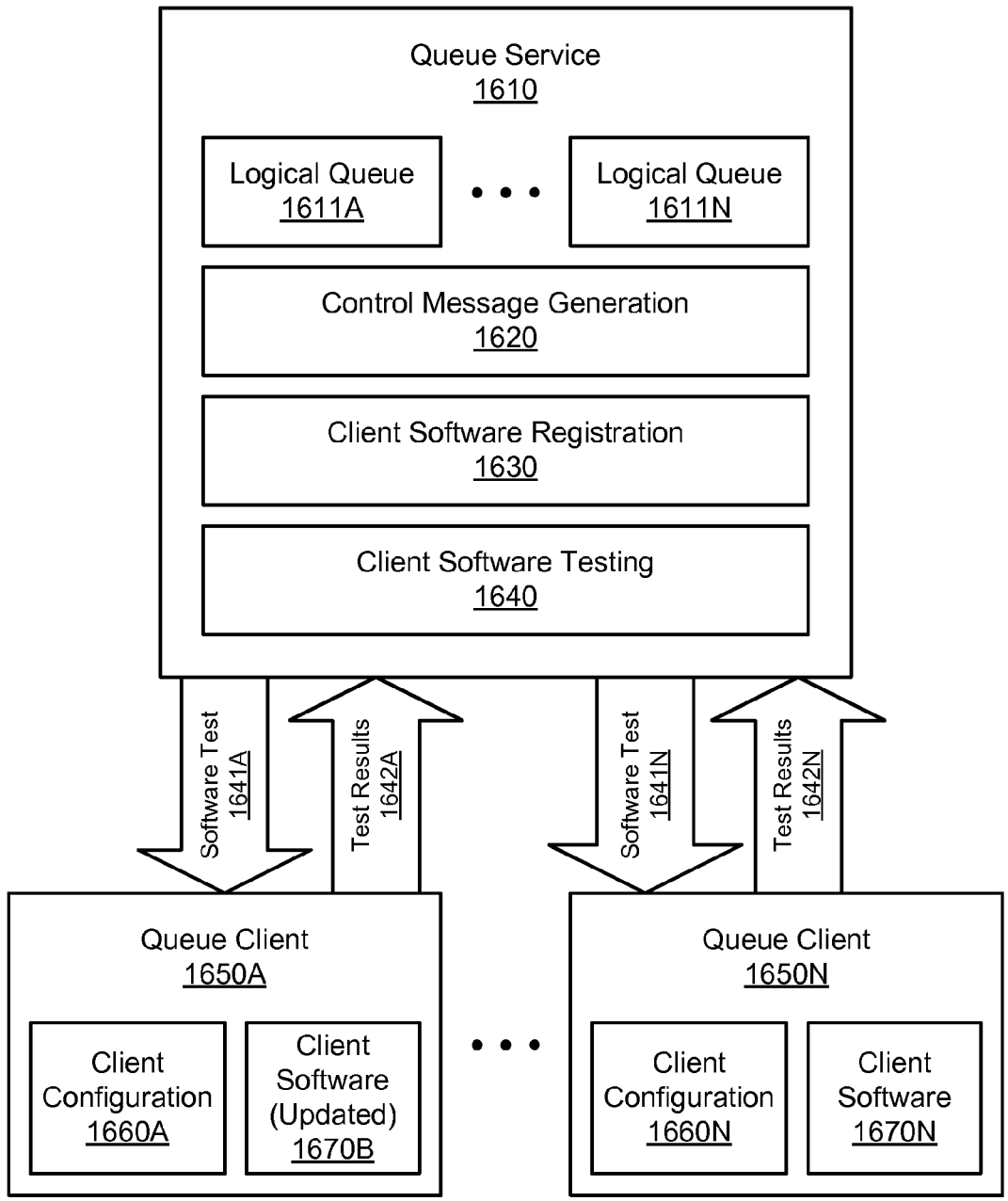
FIG. 17C illustrates an example system environment for client control in a distributed strict queue, including client software testing, according to one embodiment.

FIG. 17C illustrates an example system environment for client control in a distributed strict queue, including client software testing, according to one embodiment. As discussed above, different queue clients may be modified with control messages to have different versions or types of client software. The queue clients with the different versions or types of client software may be tested to determine any differences in functionality, performance, and/or results of the different versions or types of client software. Accordingly, the queue service 1610 may include a functionality for client software testing 1640. In some embodiments, the client software testing functionality 1640 may generate messages to test client software on one or more queue clients, initiate the tests on one or more clients, receive metrics and/or logs relating to the client software testing, receive results of the tests, analyze the metrics and/or logs, and/or analyze the results.

In one embodiment, the queue service 1610 may send one or more messages, potentially including control messages, to initiate the software testing on one or more clients. As shown in FIG. 17C, for example, the queue service 1610 may send one or more messages 1641A to initiate the testing of the updated client software 1670B on the queue client 1650A. Similarly, the queue service 1610 may send one or more messages 1641N to initiate the testing of the other client software 1670N on the queue client 1650N. The tests may be conducted by the corresponding queue clients by executing or implementing queue messages to perform various tasks. In one embodiment, each of the tested queue clients may send metrics, logs, and/or other results, such as test results 1642A and 1642N, to the queue service 1610. Using the test results 1642A and 1642N, the client software testing functionality 1640 may determine any differences between the client software 1670B and the client software 1650N with respect to their functionality, performance, and/or results.

In one embodiment, the same or similar messages may be provided to two or more versions or types of client software in order to determine the differences. In one embodiment, any of the tested clients may be isolated from a network during the testing, e.g., using the I/O fencing techniques discussed below with respect to FIG. 24. In one embodiment, dummy messages may be provided to the tested client software. A dummy message may include one or more steps, tasks, or operations to be performed, potentially by the queue client invoking one or more backend systems. Dummy messages are discussed in greater detail below with respect to FIGS. 21A and 21B.

In one embodiment, an I/O fenced client processing real messages may be compared to another client with a different version or type of client software. A message may be processed using a first client running a first version or type of client software. Traffic between one or more external components and the first client may be captured in the processing of the message. The same message may be processed using a second client running a second version or type of client software. To simulate interactions with the external component(s), I/O fencing with I/O mimicry may be implemented for the second client, e.g., using a network proxy layer. Accordingly, the captured traffic from the first client (e.g., any responses from the external component(s)) may be replayed for the second client so that the second client can process the message properly. Results and/or metrics may be compared for the first client and the second client to evaluate the modified client software.

In one embodiment, real (i.e., not dummy) messages may be sent to a queue client for processing using modified client software. The attempted processing of the messages may be evaluated using any suitable metrics and/or logs. In one embodiment, the queue client 1650A may be responsible for a particular range of values for the strict order parameter, and its client software 1670B may be configured and/or updated based on that range. Similarly, the queue client 1650N may be responsible for a different range of values for the strict order parameter, and its client software 1670N may be configured and/or updated differently based on that range. In one embodiment, a particular range of values for the strict order parameter may be assigned to a queue client as part of the software testing, e.g., to test the operation of a particular version and/or type of client software as it processes messages within the assigned range of values for the strict order parameter. In one embodiment, if the tested client software performs in a satisfactory manner, it may be deployed to other queue clients that are collectively responsible for a larger range of values for the strict order parameter. Accordingly, the queue service 1610 may modify the client software for a limited set of queue clients, test the client software for the limited set of clients, and roll out the modified software for additional clients (potentially for additional tests) if the tests succeed.

In one embodiment, the client software testing functionality 1640 may perform different actions for software testing in various circumstances. For example, the queue service 1610 may update client software to a new version and test the updated software with dummy messages. If the dummy message testing succeeds, the queue service 1610 may perform additional tests to compare the updated software with another version of the software (e.g., an earlier version) on one or more other clients for a particular percentage (e.g., 1%) of calls. If the additional testing succeeds for a particular interval of time (e.g., 24 hours), then the queue service 1610 may perform further tests for a particular percentage (e.g., 2%) of calls for a particular interval of time (e.g., 12 hours). The queue service 1610 may then gradually shift traffic to the updated software.

Various actions may be taken by the queue service 1610 if the testing fails for one or more queue clients. For example, software testing for all or part of a fleet may be suspended if a failure threshold is exceeded. As another example, the queue service 1610 may send a control message to revert software modifications, e.g., to restore a previously installed version of client software on one or more clients. As yet another example, the queue service 1610 may stop the rollout of a configuration or of client software. In one embodiment, the queue service 1610 may inform a user (e.g., an administrator of the queue service 1610 and/or a customer of the queue service 1610) of failed software tests, including relevant details of the failure(s) and/or summaries of multiple failures. Elements of the failure report may be based on logs collected during the software testing.

Figure 18:
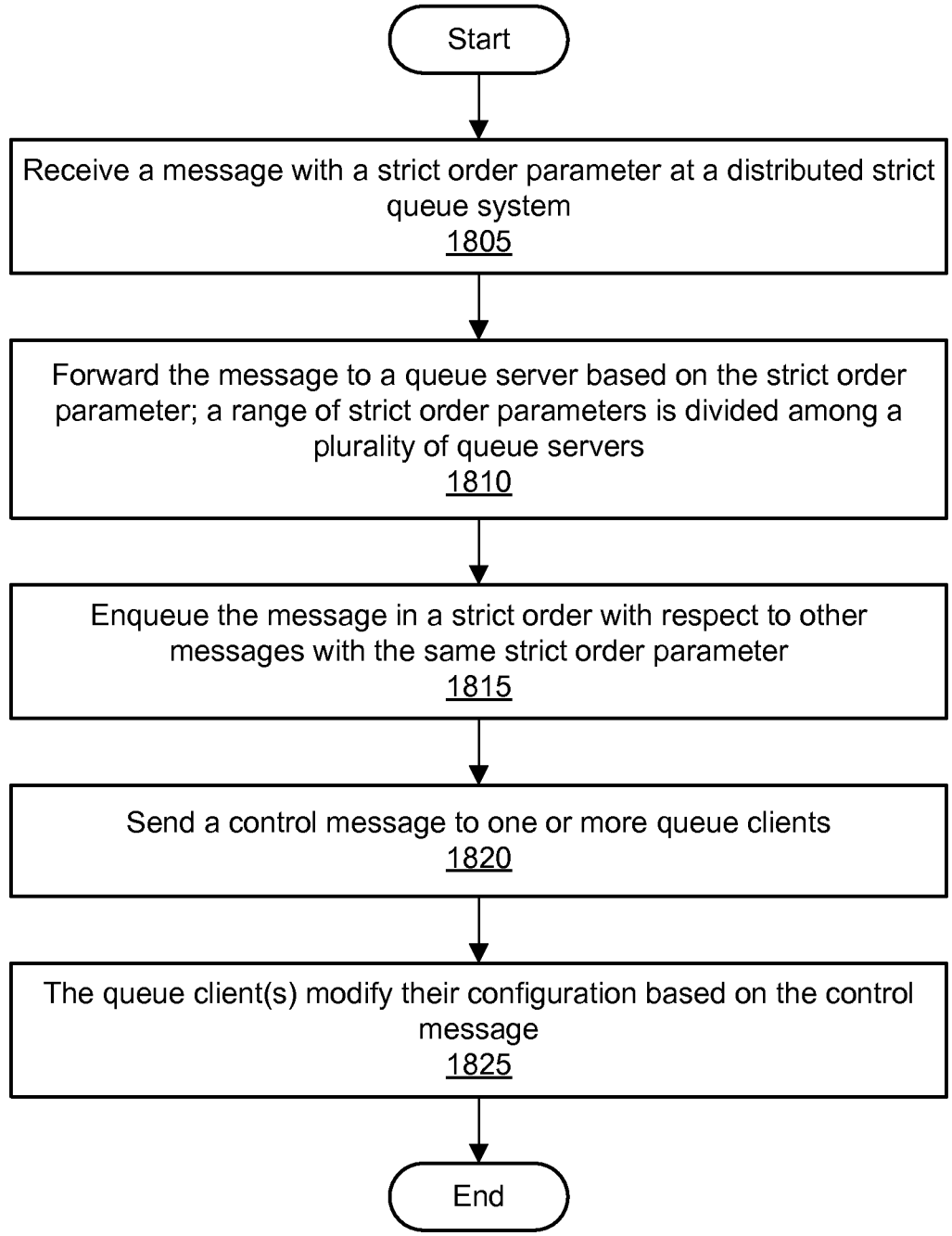
FIG. 18 is a flowchart illustrating a method for implementing client control in a distributed strict queue, according to one embodiment.

FIG. 18 is a flowchart illustrating a method for implementing client control in a distributed strict queue, according to one embodiment. As shown in 1805, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 1810, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 1815, the message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. One or more queue clients may be configured to dequeue and process the messages.

As shown in 1820, a control message may be sent from the queue server(s) to one or more queue clients. When executed or otherwise implemented at a queue client, the control message may cause modification of a configuration at the queue client. Accordingly, as shown in 1825, the queue client(s) may modify their configuration(s) based on the control messages. In one embodiment, the modification may include a change in one or more parameters of client software at the queue client(s). In one embodiment, the modification may include a change in one or more system parameters of at the queue client(s). The queue client(s) may be configured to process the messages based on the modified configuration(s).

Failure Management

Figure 19:
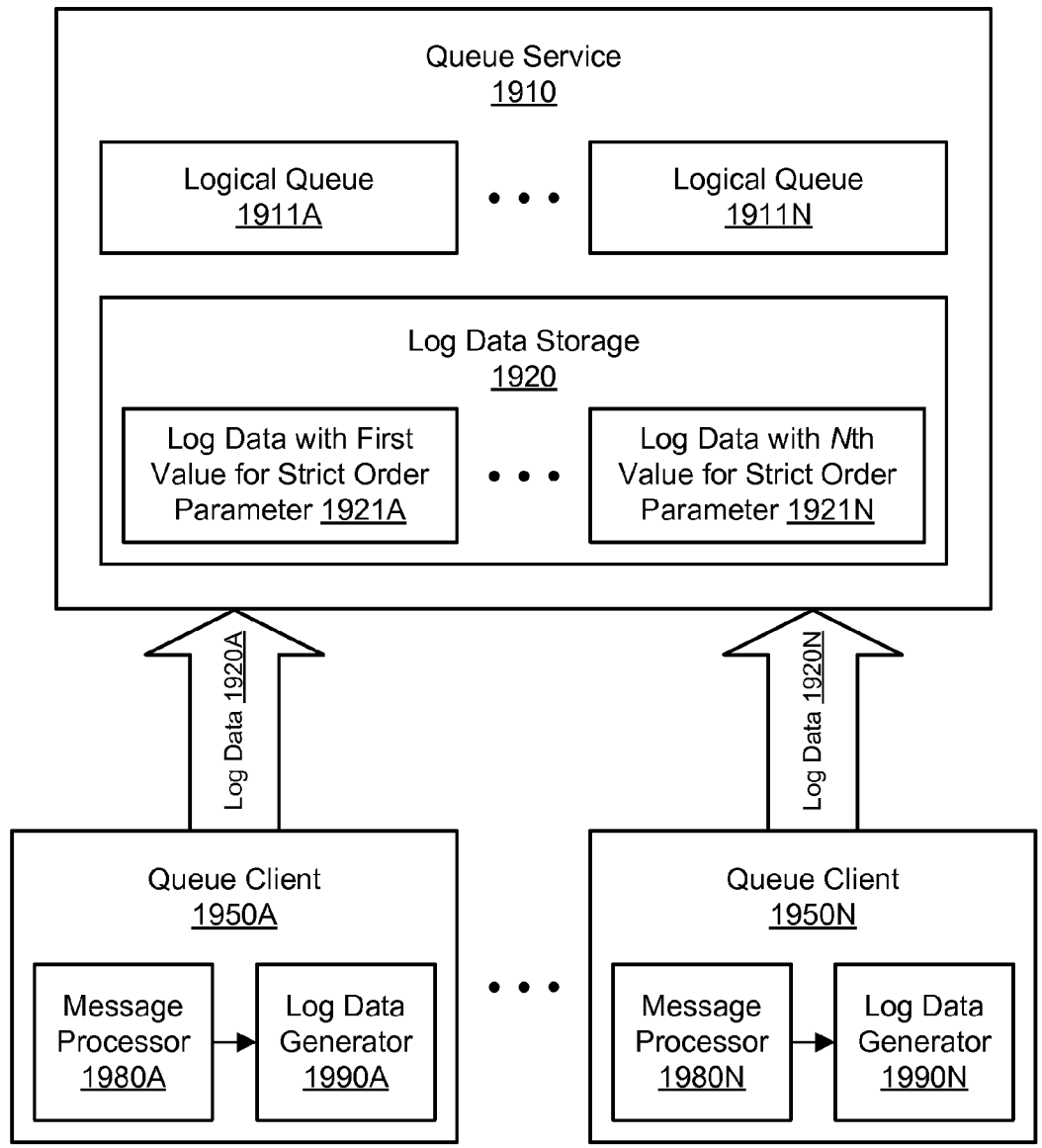
FIG. 19 illustrates an example system environment for failure management in a distributed strict queue, including the generation of log data, according to one embodiment.

FIG. 19 illustrates an example system environment for failure management in a distributed strict queue, including the generation of log data, according to one embodiment. A queue service 1910 may be implemented as part of a distributed strict queue system, such as the distributed strict queue system 100. Additionally, the queue service 1910 may be implemented using any combination of the features described herein with respect to queue services, such as the queue service 110. For example, the queue service 1910 may be implemented using one or more queue servers, such as queue servers 115A-115N shown in FIG. 1. As discussed above with respect to the queue service 110, the queue service 1910 may implement one or more logical queues (such as logical queues 1911A-1911N) in which messages with the same value for a strict order parameter are presented in their intended order. Queue clients 1950A-1950N may be implemented using any combination of the features described herein with respect to queue consumers and/or queue clients, such as the queue consumers 160A-160N. The queue clients 1950A-1950N may receive the messages from the logical queue(s) (in their intended order for each value of the strict order parameter) and execute instructions in the messages or otherwise implement the messages. In one embodiment, the queue service 1910 may deliver each message only once.

It is contemplated that the queue service 1910 and queue clients 1950A-1950N may include additional components not shown, fewer components than shown, or different combinations, configurations, or quantities of the components shown. For example, although two queue clients 1950A and 1950N are shown for purposes of example and illustration, it is contemplated that different quantities and combinations of queue clients may be used. The queue service 1910 and queue clients 1950A-1950N may be implemented using one or more computing devices, any of which may be implemented by the example computing device 5000 illustrated in FIG. 36. In some embodiments, the queue service 1910 and/or queue clients 1950A-1950N may be implemented as one or more virtual compute instances and/or physical compute instances. In various embodiments, portions of the functionality shown in FIG. 19 may be provided by the same computing device or by any suitable number of different computing devices. If any of the components shown in FIG. 19 are implemented using different computing devices, then the components and their respective computing devices may be communicatively coupled, e.g., via a network. Each of the illustrated components may represent any combination of software and hardware usable to perform their respective functions.

The queue service 1910 may maintain one or more logical queues, such as logical queue 1911A and logical queue 1911N. Although two logical queues 1911A and 1911N are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 1911A may store a series of ordered messages having one value for the strict order parameter, and the logical queue 1911N may store another series of ordered messages having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. Accordingly, each of the queue clients 1950A-1950N may include a message processor, such as message processor 1980A for queue client 1950A and message processor 1980N for queue client 1950N. The message processors 1980A-1980N may implement the instructions in the messages, potentially by invoking the functionality of one or more backend systems.

In one embodiment, a queue client may pull messages from the queue service 1910. The client may pull messages from one or more of the logical queues 1911A-1911N sending one or more requests for one or more additional messages to the queue service 1910 or by otherwise initiating the pulling of messages from the queue service. In one embodiment, the queue service 1910 may push messages to a queue client. The queue client may send to the queue service 1910 an indication of the client's health at appropriate points in time. In one embodiment, messages may be pushed to the queue client periodically based on an analysis of the queue client's health by the queue service 1910.

In one embodiment, each of the queue clients 1950A-1950N may include a log data generation functionality, such as log data generator 1990A for queue client 1950A and log data generator 1990N for queue client 1950N. The log data generator 1990A may generate log data 1920A, and the log data generator 1990N may generate log data 1920N. Each log data generator may generate log data that describes aspects of the message processing on the local queue client. For example, the log data may indicate the success or failure of the attempted processing of each individual message, along with one or more identifiers of the message, including a message identifier and optionally the value of the strict order parameter for the message. In one embodiment, the log data may indicate a response such as "message processing completed—but failed" for a particular message. In one embodiment, the log data may include status updates for the processing of a particular message. In some embodiments, the log data may also include an indication of any operations taken to execute a message, an indication of inputs or other parameters used in such operations, and/or an indication of the output or results of such operations, etc. Each queue client 1950A-1950N may send its log data 1920A-1920N to the queue service 1910. Elements of the log data may be sent at any suitable time. For example, individual elements of the log data may be sent shortly after they are generated by the log data generator.

The queue service 1910 may include a functionality for log data storage 1920. In various embodiments, the log data storage 1920 may be implemented using any suitable combination of persistent storage resources and transient storage resources, and the storage resources may be located either on-host or off-host with respect to any of the queue servers in the queue service 1910. The log data storage 1920 may use any suitable techniques and data structures for organizing and storing the elements of log data. In one embodiment, elements of log data related to the processing of a particular message may be associated with the value for the strict order parameter for that message. Accordingly, the log data storage 1920 may store log data with various values for the strict order parameter, such as log data 1921A with a first value for the strict order parameter to log data 1921N with an Nth value for the strict order parameter. In various embodiments, the log data for a particular value for the strict order parameter may be stored separately from or mixed with the log data for other values for the strict order parameter. As will be discussed below, the log data 1921A-1921N may be used by the queue service 1910 to implement various failure management tasks.

In some embodiments, the log data 1921A-1921N may be compressed. The log data may be compressed across multiple messages using one or more compression dictionaries specific to one or more values for the strict order parameter, one or more queue clients, one or more queue servers, or any other suitable dimension. In some embodiments, the log data 1921A-1921N may be searchable, e.g., to find patterns for common types of failure. The search may present such incidents as "known error cases." A user may view the known error cases in a manner independent of any particular message. In one embodiment, the user may also view a message that is exemplary of a type of known error case. In one embodiment, a user may be alerted when specific types of error cases are found in the log data (e.g., with automated searching or pattern-matching). In one embodiment, user input may be solicited for failure management when specific types of error cases are found in the log data (e.g., with automated searching or pattern-matching).

The queue service 1910 may analyze one or more message processing failures and take appropriate action to mitigate future message processing failures. In one embodiment, the queue service 1910 may analyze the failed message processing at one or more queue clients and determine that a particular type of message is responsible for the failures. In one embodiment, the queue service 1910 may analyze multiple message processing failures occurring over a period of time and decide to suspend operations (e.g., at one or more queue clients) for a particular message type or a particular range of values for the strict order parameter. In one embodiment, the queue service 1910 may cancel the processing of particular messages and/or pull particular messages from their queue(s) upon detecting a failure of those messages and/or a failure of messages with the same value for the strict order parameter.

Figure 20:
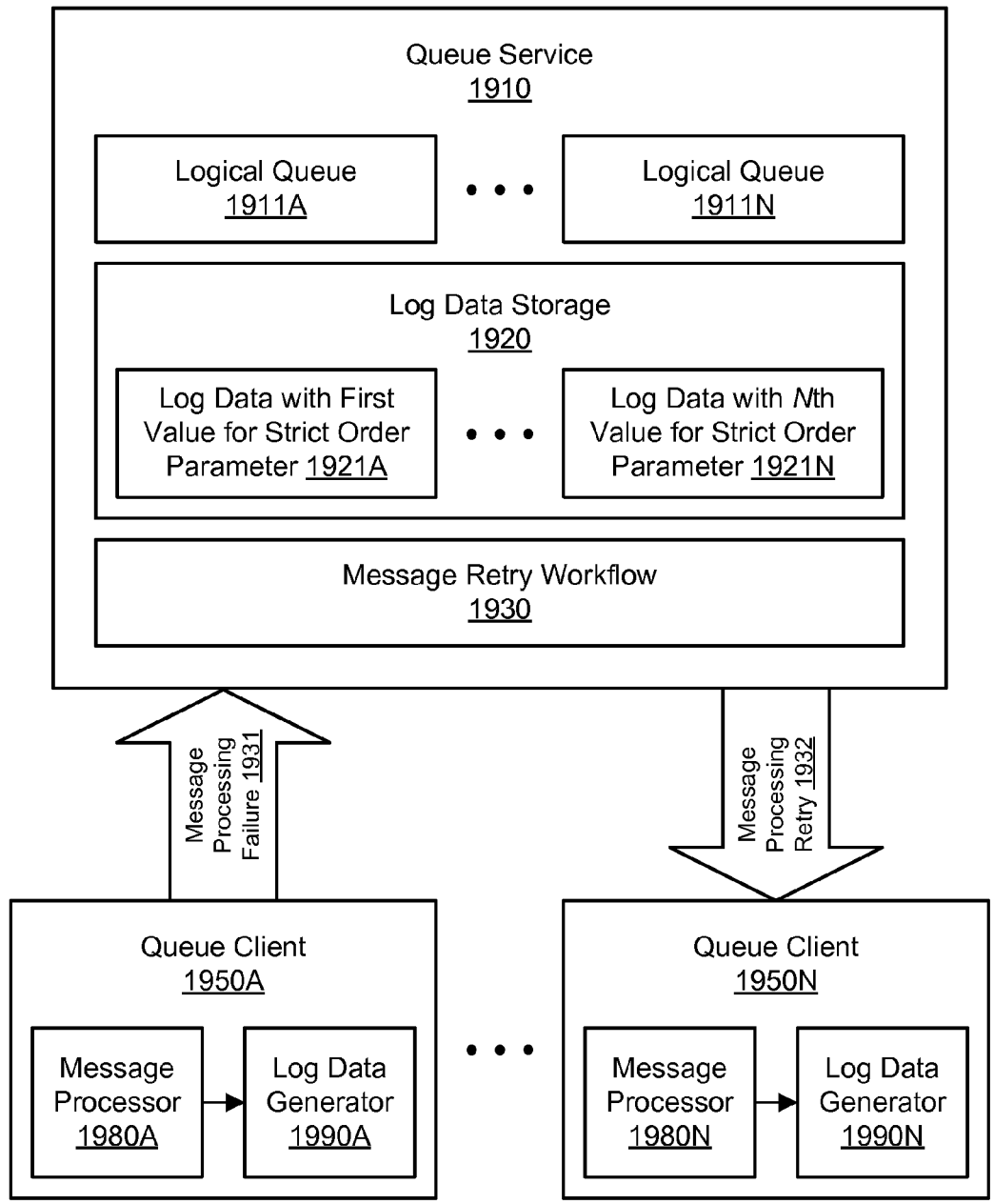
FIG. 20 illustrates an example system environment for failure management in a distributed strict queue, including message retry based on log data, according to one embodiment.

FIG. 20 illustrates an example system environment for failure management in a distributed strict queue, including message retry based on log data, according to one embodiment. In one embodiment, the queue service 1910 may include a message retry workflow 1930. The message retry workflow 1930 may indicate one or more steps, tasks, or other operations to be performed if the attempted message processing fails for one or more messages at one or more queue clients. In one embodiment, the message retry workflow 1930 may indicate a variety of different workflows to be performed in different circumstances or for different queue clients or for different values of the strict order parameter. For example, the message retry workflow 1930 may indicate a different retry strategy if a single message fails at a single client than if many messages fail at many clients. Similarly, the message retry workflow 1930 may indicate a different retry strategy for one value for the strict order parameter than for another value for the strict order parameter. In one embodiment, the message retry workflow 1930 may be defined (at least in part) by a user, e.g., using any suitable user interface. In general, the steps, tasks, or other operations implemented by the message retry workflow 1930 may be performed automatically (e.g., without being directly prompted by user input) and/or programmatically (e.g., according to program instructions). However, certain of the steps, tasks, or other operations in the message retry workflow 1930 may solicit user input.

If the attempted processing of a message fails at one of the queue clients, the queue service may determine the failure. In some circumstances, the queue service may determine the failure by determining that the queue client has timed out or otherwise failed. In some circumstances, the queue client may send log data or another indication of the failure. For example, as shown in FIG. 20, the queue client 1950A may send log data 1931 indicating a message processing failure. The log data 1931 may indicate, among other data, the message identifier and/or the value for the strict order parameter for each message for which the attempted message processing failed. The log data 1931 may be stored using the log data storage 1920. The message retry workflow 1930 may attempt to recover from the failure of the message processing. For example, the message retry workflow 1930 may attempt to retry the failed processing of the message a particular number of times using one or more queue clients, potentially including the same client that previously failed. As another example, the message retry workflow 1930 may attempt to retry the failed processing of the message using one or more other queue clients. Accordingly, the message retry workflow 1930 may implement a message processing retry 1932 by providing to the queue client 1950N one or more messages whose processing previously failed with the queue client 1950A. In one embodiment, the message processing retry 1932 may involve transferring responsibility for one or more values for the strict order parameter from the queue client 1950A to the queue client 1950N, at least temporarily. Using the message processor 1980N, the queue client 1950N may then attempt to process the one or more messages whose processing previously failed with the queue client 1950A.

The message processing retry 1932 may include sending all or part of the log data for the failed message(s) to the queue client 1950N. The log data sent to the retry client 1950N may associate each message to be retried with a message identifier and/or the value for the strict order parameter for the message. In one embodiment, the log data or other metadata sent to the retry client 1950N may indicate that processing has previously failed for a particular message. In one embodiment, the log data or other metadata sent to the retry client 1950N may include the number of times that the attempted processing has failed for a particular message. In one embodiment, the log data sent to the retry client 1950N may include an estimated reason that the attempted processing failed for a particular message. In one embodiment, the log data or other metadata sent to the retry client 1950N may include the partial results of the attempted processing for a particular message is the processing failed before it was complete. In one embodiment, the log data sent to the retry client 1950N may include an indication of processing steps that were performed successfully before the message processing failed. Accordingly, the retry client 1950N may verify that such steps were indeed successfully completed before continuing the processing of a message with one or more additional steps. In this manner, the log data may be used for efficient and automated recovery from message processing failure.

Figure 21A:
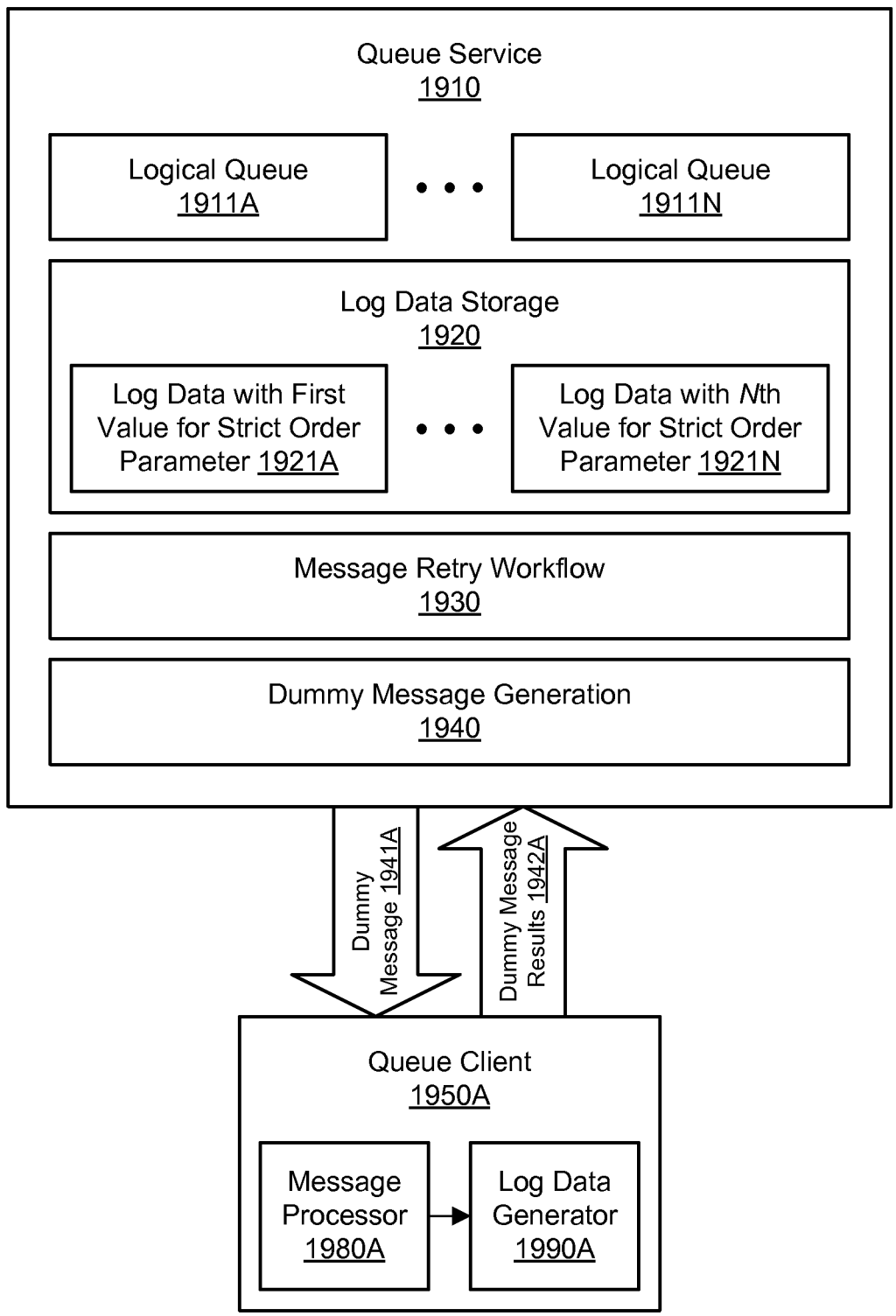
FIG. 21A illustrates an example system environment for failure management in a distributed strict queue, including dummy message processing, according to one embodiment.

FIG. 21A illustrates an example system environment for failure management in a distributed strict queue, including dummy message processing, according to one embodiment. In one embodiment, the queue service 1910 may include a functionality for dummy message generation 1940. A dummy message 1941A generated by the dummy message generation functionality 1940 may take the form of a regular message to be processed by a queue client 1950A. Accordingly, the dummy message 1941A may include one or more steps, tasks, or operations to be performed, potentially by the queue client invoking one or more backend systems. In one embodiment, the dummy message 1941A may be generated such that its processing causes no significant side effects, e.g., no persistent change to any other system. In one embodiment, the dummy message 1941A may affect one or more test accounts and/or test systems. In one embodiment, one or more dummy messages may be generated using one or more dummy message templates. The dummy messages generated using a particular template may vary in the values associated with particular operations, e.g., by inserting random values (potentially within some predefined range) into locations in the template to generate a particular dummy message.

The dummy message 1941A may be provided to a queue client (such as queue client 1950A) by the queue service 1910 in order to verify the health of the recipient queue client, i.e., the expected functioning of the recipient queue client for message processing. The dummy message 1941A may be provided to the client 1950A in the same manner or a similar manner as normal messages are provided to the client, e.g., by permitting the client to dequeue the dummy message from a logical queue. In one embodiment, the dummy message may be provided to the queue client 1950A in response to the queue client 1950A failing to process one or more messages successfully. The queue client 1950A may attempt to process the dummy message 1941A and generate results 1942A of the attempted processing. The queue client may send the dummy message results 1942A to the queue service 1910. The results 1942A may typically indicate the success or failure of the attempted processing of the dummy message 1941A. The queue service 1910 may take any suitable steps in response to the dummy message results 1942A. For example, if queue service 1910 suspends the queue client's ability to access one or more logical queue after a message processing failure, the queue service 1910 may restore the client's access to the logical queue(s) after the client successfully processes the dummy message 1941A. As another example, if the queue client 1950A fails to successfully process one or more dummy messages in a particular number of attempts, the queue service 1910 may blacklist the queue client 1950A, e.g., restrict the client from receiving any additional messages from one or more logical queues. A user may be informed of the blacklist and potentially of the reasons for the blacklist. The blacklist may be temporary.

Figure 21B:
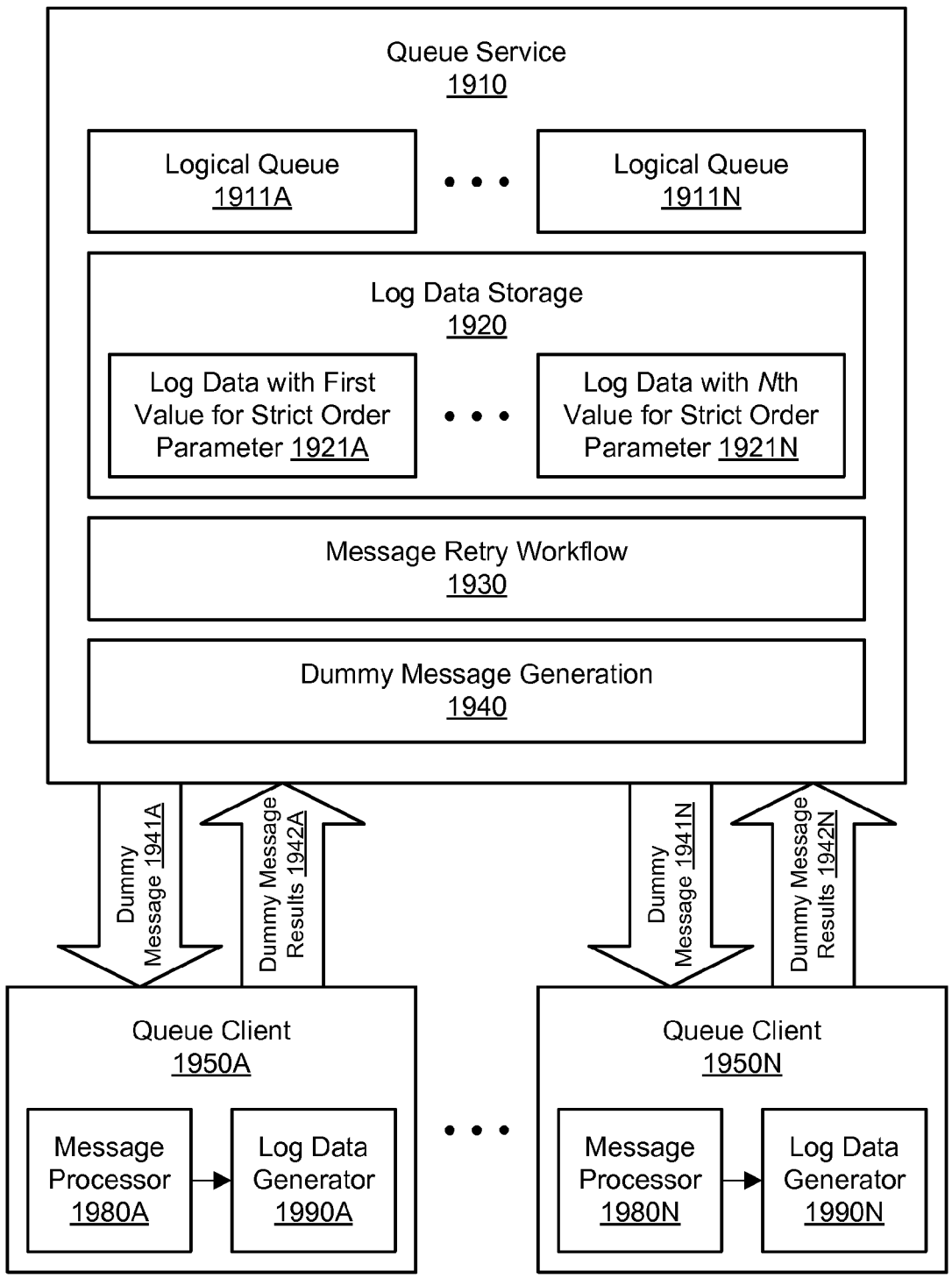
FIG. 21B illustrates an example system environment for failure management in a distributed strict queue, including dummy message processing for multiple clients, according to one embodiment.

FIG. 21B illustrates an example system environment for failure management in a distributed strict queue, including dummy message processing for multiple clients, according to one embodiment. In one embodiment, the queue service 1910 may provide multiple dummy messages or multiple copies of a dummy message to multiple queue clients over an interval of time. In this manner, the queue service 1910 may attempt to verify the expected functioning of multiple clients, such as clients 1950A-1950N. Accordingly, the queue service 1910 may provide dummy message 1941A to the queue client 1950A and receive dummy message processing results 1942A from the client. Similarly, the queue service 1910 may provide dummy message 1941N to the queue client 1950N and receive dummy message processing results 1942N from the client. The dummy messages 1941A and 1941N may be copies of the same message, different messages generated using the same template, or entirely different messages. In one embodiment, the queue client 1950A and the queue client 1950N may run different types or versions of queue software for processing the dummy messages.

In one embodiment, the dummy messages 1941A-1941N may be sent to the queue clients 1950A-1950N if the queue service 1910 has determined that multiple queue clients have recently failed. If the attempted processing fails for multiple dummy messages at multiple clients (e.g., meeting or surpassing some predefined failure threshold), the queue service 1910 may take any suitable actions. For example, the queue service 1910 may determine that a "large scale event" is occurring, such as a network outage or failure of a backend system, and suspend at least some operations (such as providing messages to queue clients) until the large scale event appears to be over. In one embodiment, the queue service 1910 may suspend operations on a subset of queue clients. In one embodiment, the queue service 1910 may terminate and/or restart one or more queue clients after the large scale event has ended.

Figure 22:
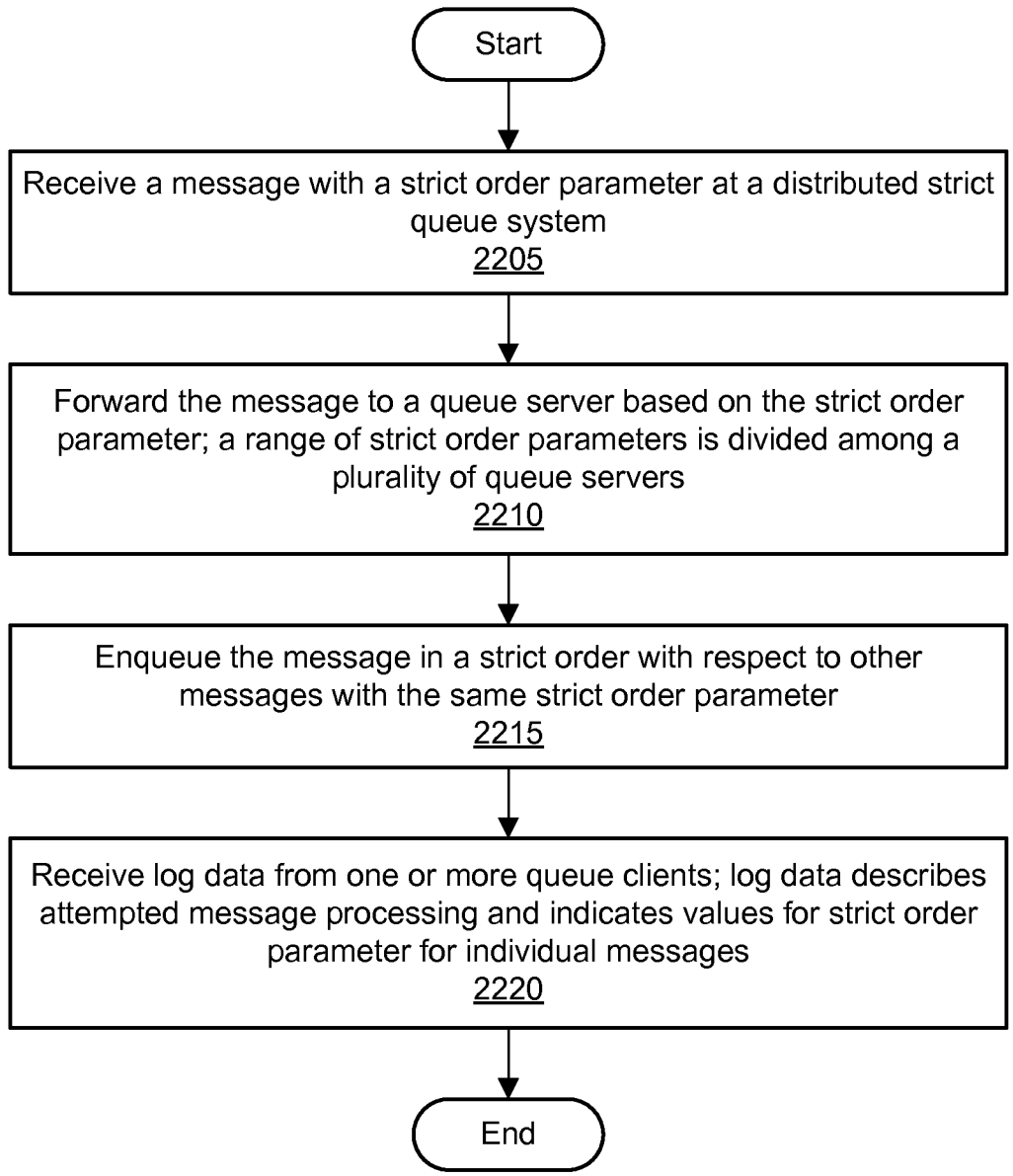
FIG. 22 is a flowchart illustrating a method for implementing failure management in a distributed strict queue, according to one embodiment.

FIG. 22 is a flowchart illustrating a method for implementing failure management in a distributed strict queue, according to one embodiment. As shown in 2205, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 2210, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 2215, the message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. One or more queue clients may be configured to dequeue and process the messages.

As shown in 2220, log data may be received from the one or more queue clients at individual ones of the queue servers. The log data may be descriptive of the attempted message processing. In one embodiment, the log data may indicate the message identifiers and/or respective values for the strict order parameter for the messages for which message processing was attempted. Various steps may be taken for failure management if the queue system determines that the attempted message processing failed for one or more messages. In one embodiment, the failure management may be based on a specification for an automated workflow as received from a user. For example, a message and log data for the message may be resent to an additional queue client; the additional queue client may retry the message processing for the message based (at least in part) on the log data for the message. If the queue system determines that the attempted message processing failed at a particular queue client for a number of messages exceeding a failure threshold, the queue system may discontinue sending additional ones of the messages to the particular queue client based on the log data.

If the queue system determines that the attempted message processing failed one or more times at a particular queue client, the queue system may send a dummy message to the queue client. The queue client may attempt message processing for the dummy message, where a successful message processing for the dummy message verifies a proper functioning of the queue client. If the queue system determines that the attempted message processing failed one or more times at a particular queue client, the queue system may send a dummy message to the queue client, determine that the attempted message processing for the dummy message failed at the queue client, and discontinue sending additional messages to the queue client based on the additional log data. In one embodiment, the queue system may send a dummy message to multiple queue clients that are configured to attempt message processing for the dummy message. If the queue system determines that the attempted message processing for the dummy message failed for at least some the queue client, the queue system may determine that a large scale event is affecting proper functioning of the queue clients based on the additional log data.

Input/Output Management

Figure 23:
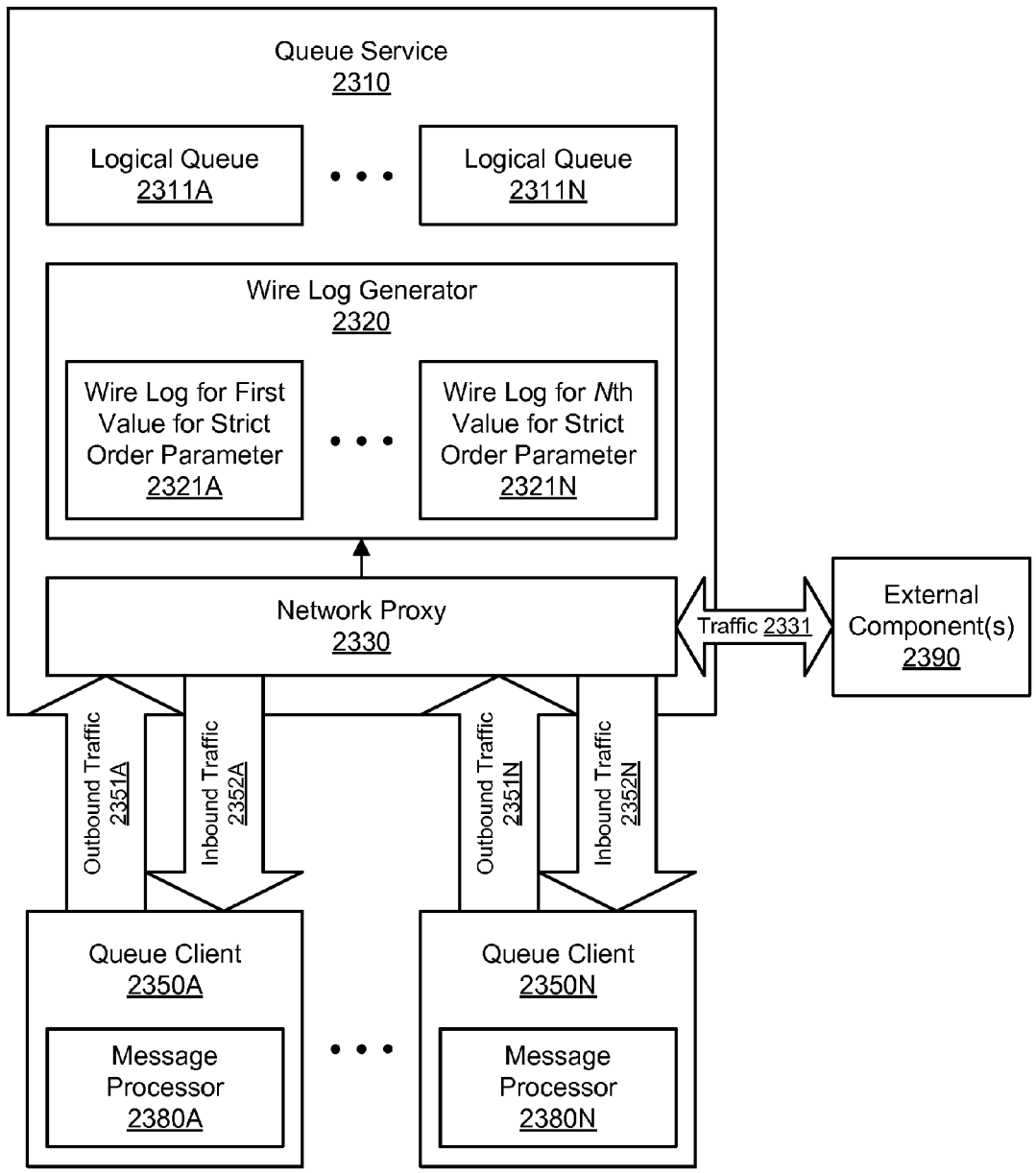
FIG. 23 illustrates an example system environment for input/output management in a distributed strict queue, according to one embodiment.

FIG. 23 illustrates an example system environment for input/output management in a distributed strict queue, according to one embodiment. A queue service 2310 may be implemented as part of a distributed strict queue system, such as the distributed strict queue system 100. Additionally, the queue service 2310 may be implemented using any combination of the features described herein with respect to queue services, such as the queue service 110. For example, the queue service 2310 may be implemented using one or more queue servers, such as queue servers 115A-115N shown in FIG. 1. As discussed above with respect to the queue service 110, the queue service 2310 may implement one or more logical queues (such as logical queues 2311A-2311N) in which messages with the same value for a strict order parameter are presented in their intended order. Queue clients 2350A-2350N may be implemented using any combination of the features described herein with respect to queue consumers and/or queue clients, such as the queue consumers 160A-160N. The queue clients 2350A-2350N may receive the messages from the logical queue(s) (in their intended order for each value of the strict order parameter) and execute instructions in the messages or otherwise implement the messages. In one embodiment, the queue service 2310 may deliver each message only once.

It is contemplated that the queue service 2310 and queue clients 2350A-2350N may include additional components not shown, fewer components than shown, or different combinations, configurations, or quantities of the components shown. For example, although two queue clients 2350A and 2350N are shown for purposes of example and illustration, it is contemplated that different quantities and combinations of queue clients may be used. The queue service 2310 and queue clients 2350A-2350N may be implemented using one or more computing devices, any of which may be implemented by the example computing device 5000 illustrated in FIG. 36. In some embodiments, the queue service 2310 and/or queue clients 2350A-2350N may be implemented as one or more virtual compute instances and/or physical compute instances. In various embodiments, portions of the functionality shown in FIG. 23 may be provided by the same computing device or by any suitable number of different computing devices. If any of the components shown in FIG. 23 are implemented using different computing devices, then the components and their respective computing devices may be communicatively coupled, e.g., via a network. Each of the illustrated components may represent any combination of software and hardware usable to perform their respective functions.

The queue service 2310 may maintain one or more logical queues, such as logical queue 2311A and logical queue 2311N. Although two logical queues 2311A and 2311N are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 2311A may store a series of ordered messages having one value for the strict order parameter, and the logical queue 2311N may store another series of ordered messages having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. Accordingly, each of the queue clients 2350A-2350N may include a message processor, such as message processor 2380A for queue client 2350A and message processor 2380N for queue client 2350N. The message processors 2380A-2380N may implement the instructions in the messages, potentially by invoking the functionality of one or more backend systems.

In one embodiment, a queue client may pull messages from the queue service 2310. The client may pull messages from one or more of the logical queues 2311A-2311N sending one or more requests for one or more additional messages to the queue service 2310 or by otherwise initiating the pulling of messages from the queue service. In one embodiment, the queue service 2310 may push messages to a queue client. The queue client may send to the queue service 2310 an indication of the client's health at appropriate points in time. In one embodiment, messages may be pushed to the queue client periodically based on an analysis of the queue client's health by the queue service 2310.

In one embodiment, the queue service 2310 may implement one or more network proxies, such as network proxy 2330. The network proxy 2330 may act as an intermediary for requests from some components seeking to contact other components over a network. In one embodiment, the network proxy 2330 may act as an intermediary for network interactions between one or more of the queue clients 2350A-2350N and one or more external components 2390. The external components generally include servers and/or services other than the queue servers and queue clients. The external components 2390 may include, for example, one or more backend systems or services that are invoked by the queue clients 2350A-2350N to process messages from one or more logical queues 2311A-2311N. The network proxy 2330 may be implemented using any suitable software and/or hardware resources. In one embodiment, the network proxy 2330 may be implemented using one or more queue servers and/or any other suitable component(s) of the queue service 2310 running appropriate software. In one embodiment, the network proxy 2330 may be implemented using one or more hardware components that are external to the queue servers.

In one embodiment, input/output for a set of queue clients 2350A-2350N may be managed by the queue service 2310 using the network proxy 2330. Accordingly, outbound traffic 2351A and inbound traffic 2352A for the queue client 2350A may be routed through the network proxy 2330, and outbound traffic 2351N and inbound traffic 2352N for the queue client 2350N may be routed through the network proxy 2330. The network proxy 2330 may contact one or more external components 2390 on behalf of the clients 2350A-2350N by sending and/or receiving traffic 2331. The traffic 2331 may thus include elements of the outbound traffic 2351A, inbound traffic 2352A, outbound traffic 2351N, and/or inbound traffic 2352N. In one embodiment, the network proxy 2330 may provide SSL (Secure Sockets Layer) termination. In providing SSL termination, the network proxy 2330 may handle incoming SSL connections, e.g., by decrypting an incoming request and passing the unencrypted request to one or more queue servers and/or queue clients.

By funneling the outbound traffic 2351A, inbound traffic 2352A, outbound traffic 2351N, and/or inbound traffic 2352N through the network proxy 2330, the queue service may generate and store a wire log describing aspects of the traffic. The wire log may be persisted independently of any of the queue clients. Accordingly, the queue service 2310 may include a functionality 2320 for wire log generation. The wire log generator 2320 may generate log data that describes aspects of the network traffic 2331, including aspects of outbound traffic 2351A, inbound traffic 2352A, outbound traffic 2351N, and/or inbound traffic 2352N. The wire log data may indicate the sender, recipient, and timestamp for each network interaction. In some embodiments, the wire log data may include an indication of any functions invoked in the external component(s) 2390, parameters or responses passed from queue clients 2350A-2350N to the external component(s) 2390, parameters or responses passed from the external component(s) 2390 to the queue clients 2350A-2350N, and/or any other data that describes aspects of message processing.

In one embodiment, elements of the network traffic may be deliberately omitted from the wire log, e.g., as configured by a user. For example, the wire log may keep HTTP bodies but omit HTTP headers for HTTP traffic. The omitted data may be represented in the wire log by a byte count and/or hash of the omitted data in a manner that may be parsed by the queue service 2310. In one embodiment, a level of logging may be configured, e.g., by a user and/or customer. The level of logging may be based (at least in part) on suitable parameters such as the external component endpoint, the size of the data, and wire log persistence only in cases of failure. In one embodiment, data fields in the wire log may be "blacklisted" or otherwise obscured, e.g., by a user and/or customer. For example, sensitive data in the network traffic may be stripped from the wire log by parsing the traffic to identify the sensitive data in specific locations.

In one embodiment, the queue service 2310 may parse network interactions between the queue clients and the external component(s) to determine a message identifier and/or value for the strict order parameter associated with a particular interaction. Accordingly, the queue service 2310 may have a sufficient understanding of application protocols to determine the message identifiers and/or values for the strict order parameter in the network traffic. In one embodiment, the queue clients may be configured to include the message identifiers and/or values for the strict order parameter in elements of outbound traffic. The wire log may associate the message identifiers and/or values for the strict order parameter with particular interactions.

In various embodiments, the wire log generator 2320 may store wire log data using any suitable combination of persistent storage resources and transient storage resources, and the storage resources may be located either on-host or off-host with respect to any of the queue servers in the queue service 2310. The wire log data storage may use any suitable techniques and data structures for organizing and storing the elements of log data. In one embodiment, elements of wire log data related to the processing of a particular message may indicate the message identifier and/or value for the strict order parameter for that message. Accordingly, the wire log generator 2320 may store log data with various values for the strict order parameter, such as wire log data 2321A with a first value for the strict order parameter to wire log data 2321N with an Nth value for the strict order parameter. In various embodiments, the wire log data for a particular value for the strict order parameter may be stored separately from or mixed with the wire log data for other values for the strict order parameter.

In some embodiments, the wire log data 2321A-2321N may be compressed. The wire log data may be compressed across multiple messages using data specific to one or more values for the strict order parameter, one or more queue clients, one or more queue servers, or any other suitable dimension. In some embodiments, the log data 2321A-2321N may be searchable, e.g., to find patterns for common types of failure. The search may present such incidents as "known error cases." A user may view the known error cases in a manner independent of any particular message. In one embodiment, the user may also view a message that is exemplary of a type of known error case. In one embodiment, a user may be alerted when specific types of error cases are found in the log data (e.g., with automated searching or pattern-matching). In one embodiment, user input may be solicited for failure management when specific types of error cases are found in the log data (e.g., with automated searching or pattern-matching).

Figure 24:
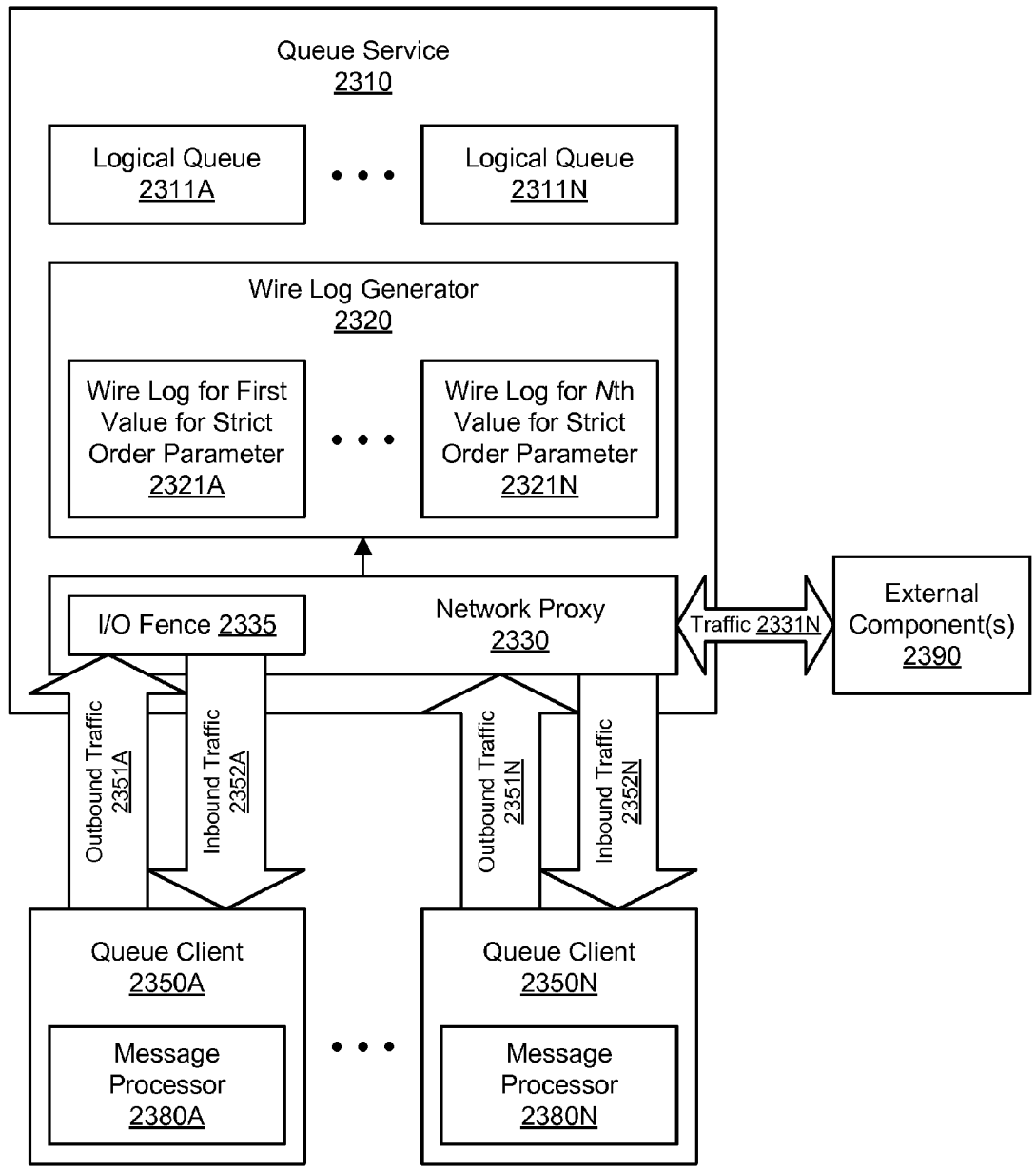
FIG. 24 illustrates an example system environment for input/output management in a distributed strict queue, including I/O fencing, according to one embodiment.

FIG. 24 illustrates an example system environment for input/output management in a distributed strict queue, including I/O fencing, according to one embodiment. In one embodiment, the queue service 2310 may isolate one or more of the queue clients (such as queue client 2350A) from the rest of the network. By establishing an I/O fence 2335 for the particular queue client(s), the queue service 2310 may prevent the isolated queue client(s) from interacting with the one or more external component(s) 2390 or with other components of the queue system. Accordingly, the outbound traffic 2351A from an I/O fenced queue client 2350A may be excluded from the traffic 2331N sent by the network proxy 2330 to the external component(s) 2390. Similarly, the inbound traffic 2352A for an I/O fenced queue client 2350A may represent only traffic from the queue service 2310 (e.g., one or more queue servers) and not traffic from the external component(s) 2390.

In one embodiment, a queue client may be I/O fenced in order to mitigate the effects of malfunctions at the client. In one embodiment, a queue client may be I/O fenced after its number of failed attempts at message processing exceeds some failure threshold. In one embodiment, a queue client may be I/O fenced in order to expedite the transfer of responsibility for one or more messages (and potentially one or more values for the strict order parameter) from the I/O fenced queue client to another queue client. To permit the client software on the I/O fenced queue client to function properly, the queue service 2310 may mimic interactions between the I/O fenced queue client and one or more external components 2390. For example, the queue service 2310 may provide responses to function calls initiated by the I/O fenced queue client to the one or more external components 2390.

Figure 25:
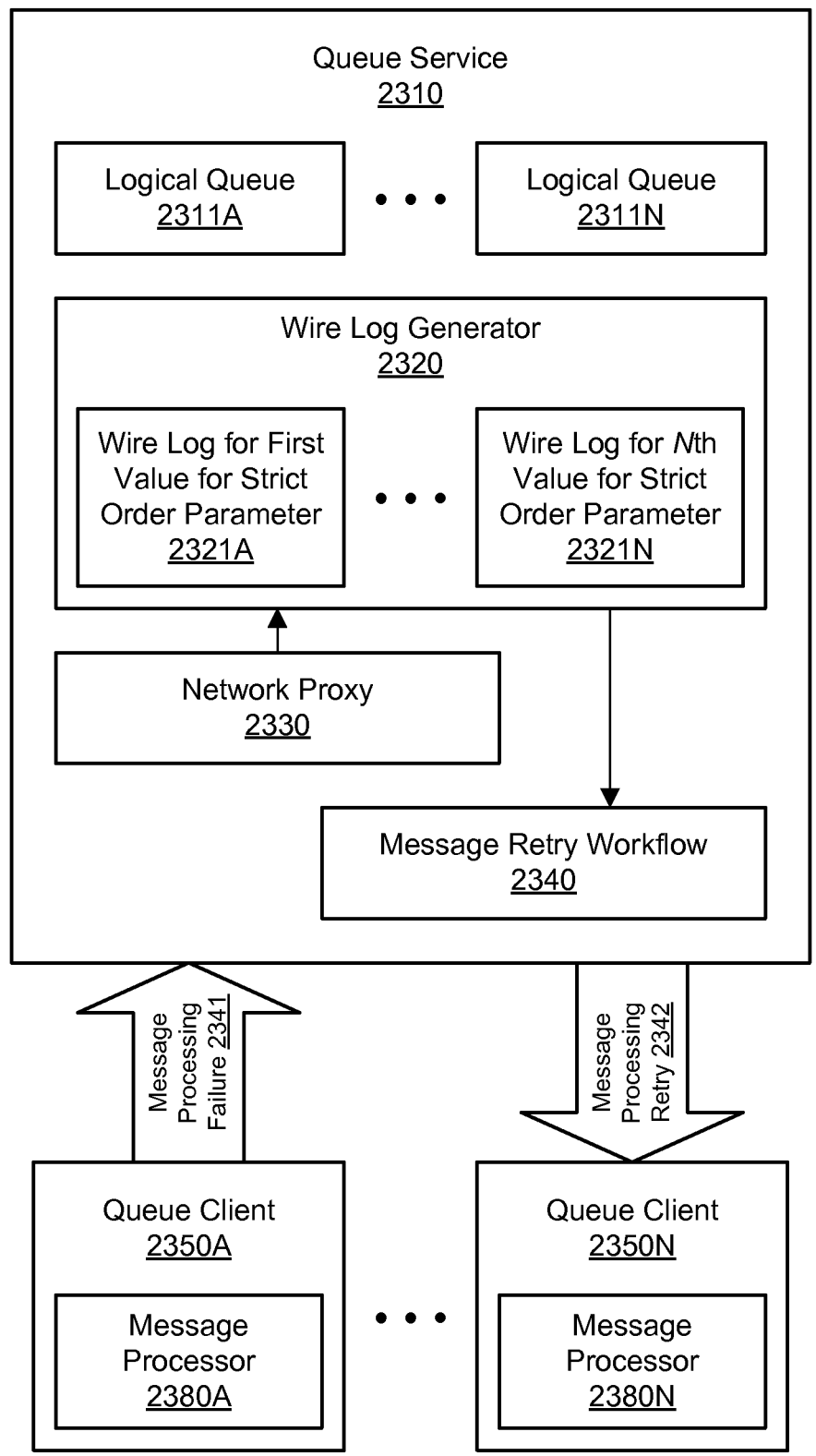
FIG. 25 illustrates an example system environment for input/output management in a distributed strict queue, including message retry based on a wire log, according to one embodiment.

FIG. 25 illustrates an example system environment for input/output management in a distributed strict queue, including message retry based on a wire log, according to one embodiment. In one embodiment, the queue service 2310 may include a message retry workflow 2340. The message retry workflow 2340 may indicate one or more steps, tasks, or other operations to be performed if the attempted message processing fails for one or more messages at one or more queue clients. In one embodiment, the message retry workflow 2340 may indicate a variety of different workflows to be performed in different circumstances or for different queue clients or for different values of the strict order parameter. For example, the message retry workflow 2340 may indicate a different retry strategy if a single message fails at a single client than if many messages fail at many clients. Similarly, the message retry workflow 2340 may indicate a different retry strategy for one value for the strict order parameter than for another value for the strict order parameter. In one embodiment, the message retry workflow 2340 may be defined (at least in part) by a user, e.g., using any suitable user interface. In general, the steps, tasks, or other operations implemented by the message retry workflow 2340 may be performed automatically (e.g., without being directly prompted by user input) and/or programmatically (e.g., according to program instructions). However, certain of the steps, tasks, or other operations in the message retry workflow 2340 may solicit user input.

If the attempted processing of a message fails at one of the queue clients, the failure may be indicated in the wire log data 2321A-2321N. For example, as shown in FIG. 25, the queue client 2350A may send one or more indications of message processing failure 2341 to the queue service 2310. The wire log data associated with the failed message(s) may indicate, among other data, the message identifier and/or value for the strict order parameter for each message for which the attempted message processing failed. Based on the wire log data 2321A-2321N, the message retry workflow 2340 may attempt to recover from the failure of the message processing. For example, the message retry workflow 2340 may attempt to retry the failed processing of the message a particular number of times using one or more queue clients, potentially including the same client that previously failed. As another example, the message retry workflow 2340 may attempt to retry the failed processing of the message using one or more other queue clients. Accordingly, the message retry workflow 2340 may implement a message processing retry 2342 by providing to the queue client 2350N one or more messages whose processing previously failed with the queue client 2350A. In one embodiment, the message processing retry 2342 may involve transferring responsibility for one or more values for the strict order parameter from the queue client 2350A to the queue client 2350N, at least temporarily. Using the message processor 2380N, the queue client 2350N may then attempt to process the one or more messages whose processing previously failed with the queue client 2350A.

The message processing retry 2342 may include sending all or part of the wire log data for the failed message(s) to the queue client 2350N. The wire log data sent to the retry client 2350N may associate each message to be retried with the message identifier and/or value for the strict order parameter for the message. In one embodiment, the wire log data or other metadata sent to the retry client 2350N may indicate that processing has previously failed for a particular message. In one embodiment, the wire log data or other metadata sent to the retry client 2350N may include the number of times that the attempted processing has failed for a particular message. In one embodiment, the wire log data sent to the retry client 2350N may include an estimated reason that the attempted processing failed for a particular message. In one embodiment, the wire log data or other metadata sent to the retry client 2350N may include the partial results of the attempted processing for a particular message is the processing failed before it was complete. In one embodiment, the wire log data sent to the retry client 2350N may include an indication of processing steps that were performed successfully before the message processing failed. Accordingly, the retry client 2350N may verify that such steps were indeed successfully completed before continuing the processing of a message with one or more additional steps. In this manner, the wire log data may be used for efficient and automated recovery from message processing failure.

Figure 26:
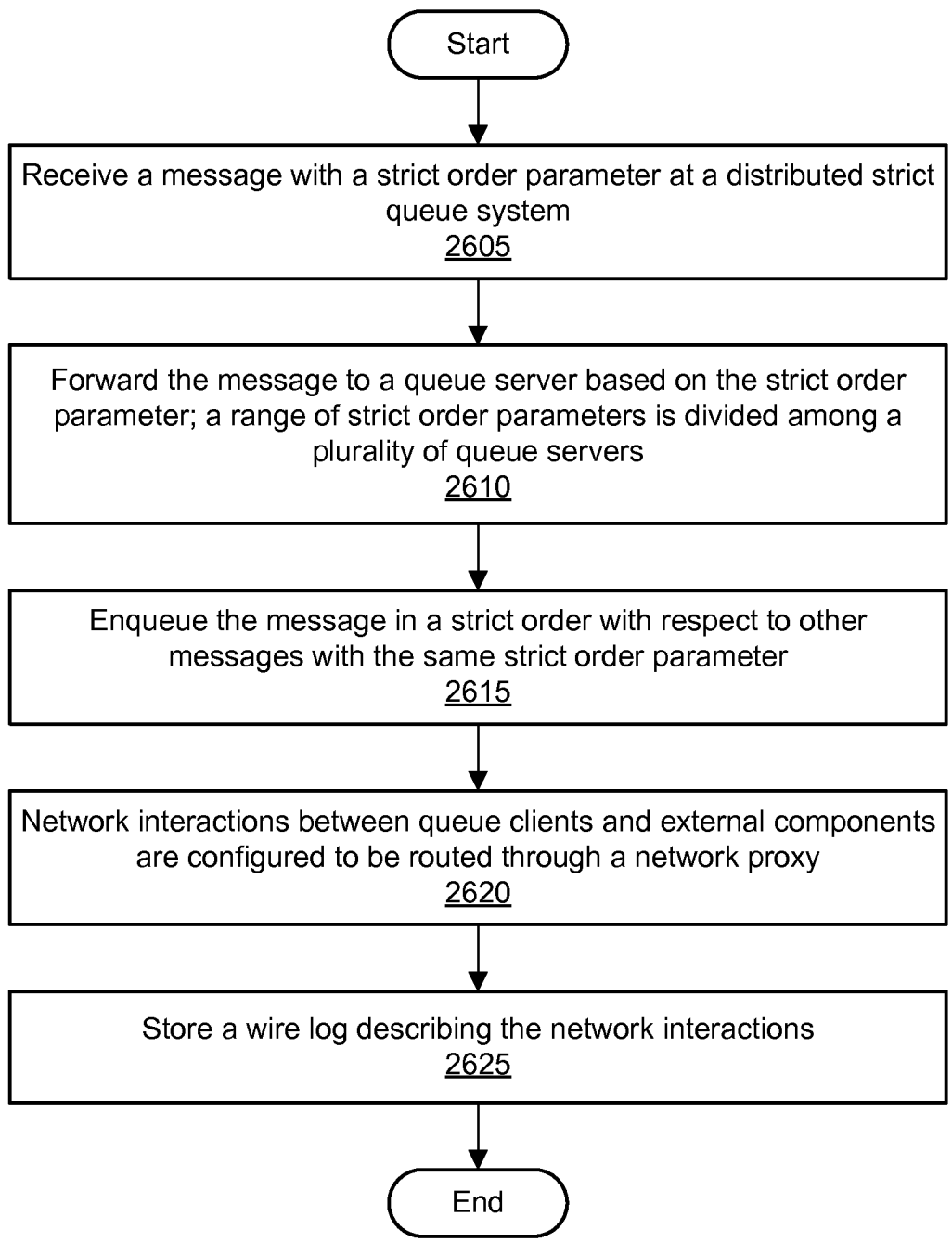
FIG. 26 is a flowchart illustrating a method for implementing input/output management in a distributed strict queue, according to one embodiment.

FIG. 26 is a flowchart illustrating a method for implementing input/output management in a distributed strict queue, according to one embodiment. As shown in 2605, a message may be received at a distributed strict queue system. The message may be received from a queue producer (e.g., a client, client account, process, instance, resource, etc.) and may have a strict order parameter assigned by the queue producer. The distributed strict queue system may receive the message using one or more interfaces and/or queue servers. In one embodiment, the distributed strict queue system may compute a stable hash of the strict order parameter upon receipt of the message.

A range of strict order parameters may be divided among a plurality of queue servers. Each strict order parameter may be assigned to one and only one of the queue servers. As shown in 2610, the message may be forwarded to the assigned queue server based on the value of the strict order parameter (or the hash thereof). The destination queue server may be determined using a functionality to determine the destination queue server based on the value of the strict order parameter for the message. The destination queue server may be a primary server for a range of values of the strict order parameter that includes the value in the current message. In one embodiment, the primary server may update one or more backup servers (e.g., a secondary server and a tertiary server) with the received message.

As shown in 2615, the message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. One or more queue clients may be configured to dequeue and process the messages.

As shown in 2620, network interactions between the one or more queue clients and one or more external components may be configured such that the interactions are routed through a network proxy. The network proxy may be implemented using one or more queue servers running appropriate software and/or one or more other hardware components. Under some circumstances, the network proxy may prevent one or more queue clients from sending network traffic. In one embodiment, the queue clients are prevented from sending the network traffic in response to failed message processing at the queue clients.

As shown in 2625, a wire log may be generated and stored; the wire log includes data descriptive of the network interactions. The wire log may indicate respective message identifiers and/or values for the strict order parameter for the messages for which the message processing was attempted. The wire log may include data descriptive of failed message processing for one or more messages. Message processing may be retried, using one or more additional queue clients, for failed message processing.

Geographic Awareness

Figure 27:
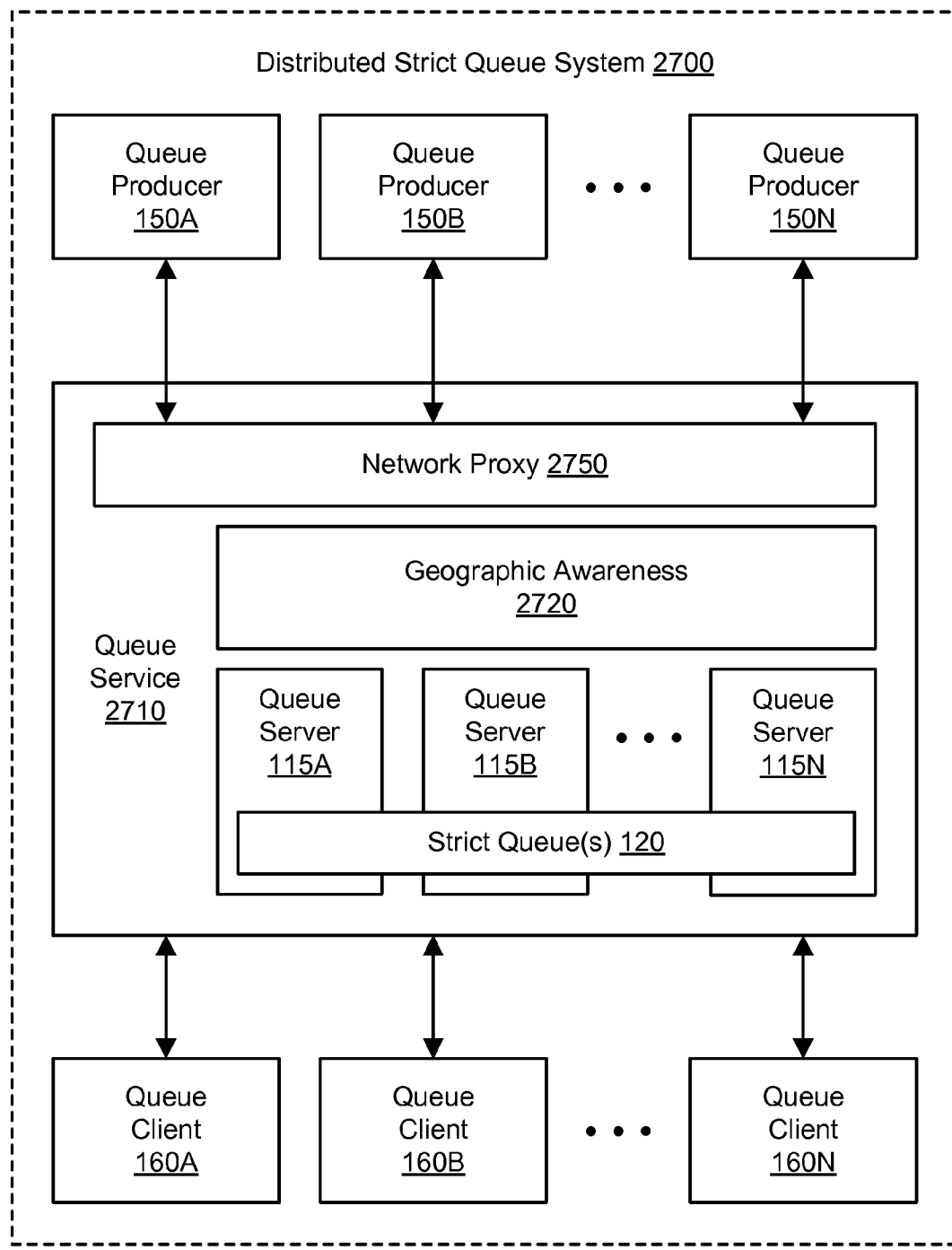
FIG. 27 illustrates an example system environment for geographic awareness in a distributed strict queue, according to one embodiment.

FIG. 27 illustrates an example system environment for geographic awareness in a distributed strict queue, according to one embodiment. A distributed strict queue system 2700 may include a plurality of queue producers (e.g., queue producers 150A and 150B through 150N), a queue service 2710 implemented using a plurality of queue servers (e.g., queue servers 115A and 115B through 115N), and a plurality of queue clients (e.g., queue clients 160A and 160B through 160N). The queue producers 150A-150N may represent various clients, client accounts, computing instances, resources, processes, or any suitable combinations thereof. Each of the queue producers 150A-150N may supply one or more messages to the queue service 110 to be enqueued. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. As will be described in greater detail below, the queue service 2710 may implement one or more strict queues 120 in which messages with the same value for a strict order parameter (also referred to as a strict order identifier) are presented in their intended order. The queue clients 160A-160N may pull the messages from the strict queue(s) 120 and execute or otherwise implement the messages. In one embodiment, the queue service 2710 may deliver each message only once.

In one embodiment, the strict queue(s) 120 may include messages associated with different values for a strict order parameter. Messages with the same value for the strict order parameter may be enqueued in the correct order relative to each other. However, for messages with different values for the strict order parameter, the queue service 2710 may use a "best effort" ordering technique that is not guaranteed to present messages with different values for the strict order parameter in the correct order. The best effort ordering may result in some messages with different values for the strict order parameter being processed by queue clients in a different order than the messages were received by the queue service 2710. Accordingly, the strict queue(s) 120 may be strict for messages with the same value for the strict order parameter and non-strict for messages with different values for the strict order parameter.

It is contemplated that the distributed strict queue system 2700 may include additional components not shown, fewer components than shown, or different combinations, configurations, or quantities of the components shown. For example, although three queue producers 150A, 150B, and 150N are shown for purposes of example and illustration, it is contemplated that different quantities and combinations of queue producers may be used. Additionally, although three queue servers 115A, 115B, and 115N are shown for purposes of example and illustration, it is contemplated that different quantities and combinations of queue servers may be used. Furthermore, although three queue clients 160A, 160B, and 160N are shown for purposes of example and illustration, it is contemplated that different quantities and combinations of queue consumers may be used.

The distributed strict queue system 2700 may comprise one or more computing devices, any of which may be implemented by the example computing device 5000 illustrated in FIG. 36. In various embodiments, portions of the functionality of the distributed strict queue system 2700, including the queue producers 150A-150N, queue servers 115A-115N, and/or queue clients 160A-160N, may be provided by the same computing device or by any suitable number of different computing devices. If any of the components of the distributed strict queue system 2700 are implemented using different computing devices, then the components and their respective computing devices may be communicatively coupled, e.g., via a network. Each of the illustrated components may represent any combination of software and hardware usable to perform their respective functions.

In some embodiments, the queue servers 115A-115N and queue clients 160A-160N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 5000 illustrated in FIG. 36.

In one embodiment, the queue service 2710 may include a functionality for geographic awareness 2720. Using the geographic awareness functionality 2720, the queue service may select the geographic location of one or more components (e.g., one or more queue servers 115A-115N and/or one or more queue clients 160A-160N) to optimize the performance of the distributed strict queue system 2700. As will be discussed in greater detail below, the distributed strict queue system 2700 may be optimized for any combination of performance (e.g., network latency), cost, risk mitigation, and/or any other suitable criteria. For example, the geographic awareness functionality 2720 may optimize the distributed strict queue system 2700 to improve latency with respect to particular interactions, e.g., interactions between queue producers and queue servers, interactions between queue servers and queue clients, and/or interactions between queue clients and external components. As used herein, the term "optimize" generally means "improve" rather than "make optimal." The geographic awareness functionality 2720 may be implemented using any suitable component(s), including one or more management components, one or more queue servers 115A-115N, and/or one or more network proxy components, etc.

In one embodiment, each of the queue servers 115A-115N and/or queue clients 160A-160N may determine its own geographical location. In one embodiment, the geographic awareness functionality 2720 may determine the geographical location for any the queue servers 115A-115N and/or queue clients 160A-160N, either independently or by receiving the locations from the corresponding server(s) and/or client(s). In one embodiment, the geographic awareness functionality 2720 may determine the geographical location for compute instances that potentially may be provisioned as queue servers 115A-115N and/or queue clients 160A-160N.

In one embodiment, the geographic awareness functionality 2720 may be implemented in connection with one or more proxy servers such as network proxy 2750. When the queue producers 150A-150N initiate interactions with the queue service 2710, such as by sending queue messages to the queue service 2710, the network proxy 2750 may intercept the interactions. In one embodiment, the network proxy 2750 may be situated in an edge location, e.g., for further optimization of latency. Using aspects of the geographic awareness functionality 2720, the network proxy 2750 may select a suitable queue server to receive a particular message from a queue producer. A particular queue server may be selected from a pool of available queue servers 115A-115N, e.g., to reduce latency between the queue service 2710 and the queue producer providing the message(s). In one embodiment, the network proxy 2750 may coordinate with an instance provider to provision any of the queue servers 115A-115N. The geographical location at which the queue server is provisioned may be selected to optimize for performance, cost, and/or risk. For example, the geographical location at which the queue server is provisioned may be selected to reduce latency between the queue service 2710 and the queue producer providing the message(s). Once the queue server has been selected (and optionally provisioned), the proxy server 2750 may forward the message(s) to the selected queue server.

Messages may be routed to selected queue servers using any suitable technique. In one embodiment, a dynamic routing system such as Amazon Route 53 may be used to route interactions (e.g., messages from queue producers to queue servers) by translating names to network addresses. In one embodiment, one or more values for the strict order parameter may be assigned to the selected queue server. The one or more values for the strict order parameter may be assigned to the selected queue server based on the geographical location of the queue server. If the order parameter space is location-sensitive, e.g., such that values for the strict order parameter vary according to the geographical location of queue producers, then queue servers may be assigned values for the strict order parameter and then selected based on those values.

Figure 28:
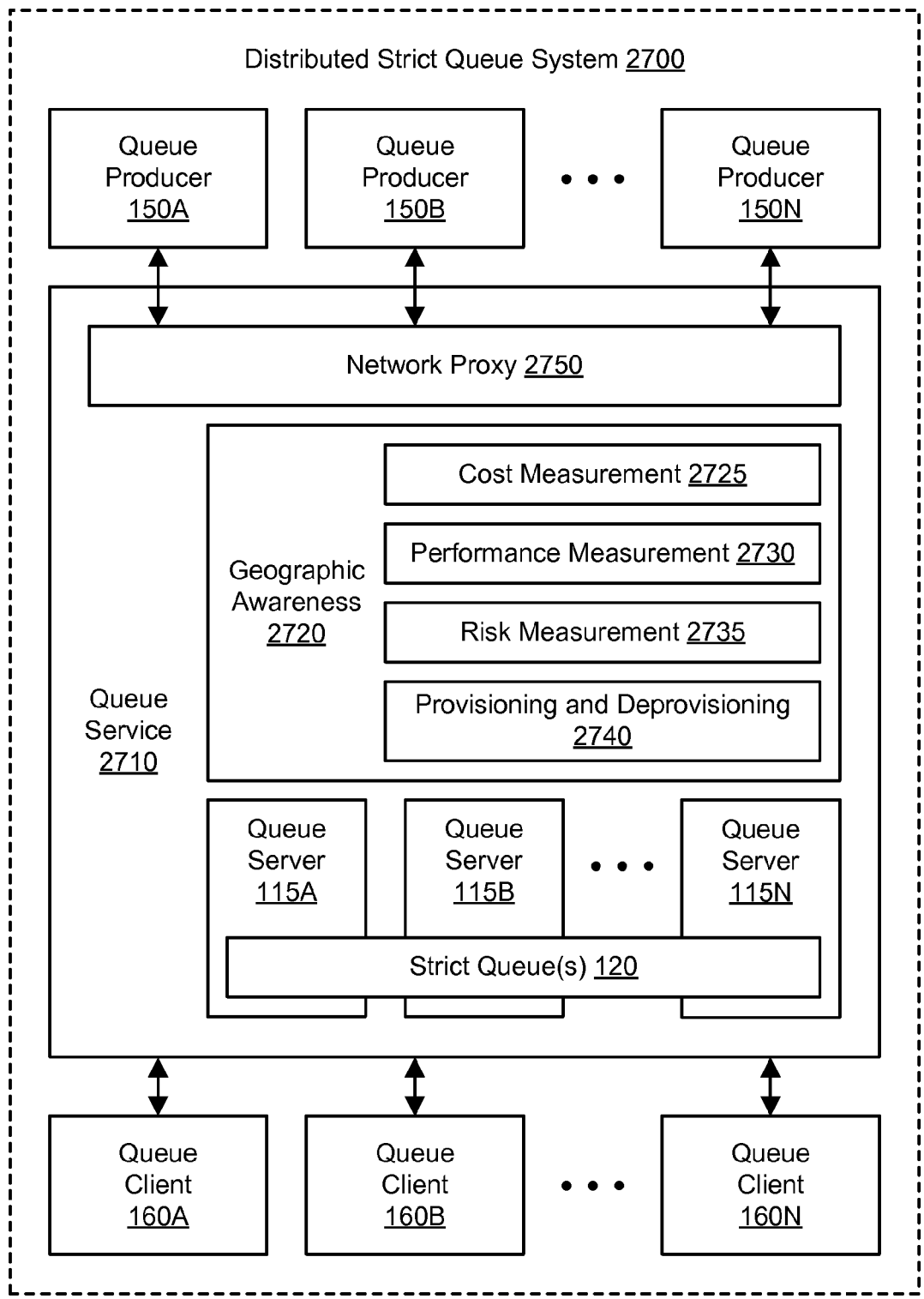
FIG. 28 illustrates further aspects of an example system environment for geographic awareness in a distributed strict queue, according to one embodiment.

FIG. 28 illustrates further aspects of an example system environment for geographic awareness in a distributed strict queue, according to one embodiment. In one embodiment, the queue servers 115A-115N and/or queue clients 160A-160N may be selected based (at least in part) on cost optimization. Accordingly, the geographic awareness functionality 2720 may include a functionality for cost measurement 2725. The cost measurement functionality 2725 may determine and maintain cost assessments for any of the components of the distributed strict queue system 2700, including the queue servers 115A-115N and queue clients 160A-160N. The costs may include costs of provisioning and/or operating queue servers and/or queue clients, e.g., energy costs for particular classes of hosts. The costs may include the costs of software licenses, e.g., for software used in processing messages as well as system software and other support software.

In one embodiment, the queue servers 115A-115N and/or queue clients 160A-160N may be selected based (at least in part) on performance optimization. Accordingly, the geographic awareness functionality 2720 may include a functionality for performance measurement 2730. Using the performance measurement functionality 2730, the queue service 2710 may determine any suitable metrics describing the performance of queue servers 115A-115N and/or queue clients 160A-160N, potentially including processor metrics, memory metrics, and/or network metrics. For example, the queue service 2710 may determine the network latency between various components in the distributed strict queue system 2710, between various geographical locations for potential components, and/or between components and geographical locations. Using the performance measurement functionality 2730, the queue service 2710 may determine the network latency between queue producers and the queue servers (or potential locations thereof), between queue servers (or potential locations thereof) and queue clients (or potential locations thereof), and/or between the queue clients (or potential locations thereof) and external components (e.g., components outside the distributed strict queue system 2700 that the queue clients may call to assist in the processing of messages). As another example, the queue service 2710 may determine the message processing latency for a set of messages and/or components. The message processing latency may be a difference between the time at which a message is sent by a queue producer and the time at which a result or response is received by the queue producer.

In one embodiment, the queue servers 115A-115N and/or queue clients 160A-160N may be selected based (at least in part) on risk optimization. Accordingly, the geographic awareness functionality 2720 may include a functionality for risk measurement 2735. The risk measurement functionality 273 may determine and maintain risk profiles for various components and configurations in the distributed strict queue system 2700. Risk optimization may include a preference for avoiding the concentration of resources. For example, to reduce risk, queue servers and/or queue clients may be selected so that all of the hosts are not located in the same data center or even in the same geographical zone. Additionally, the queue servers 115A-115N and/or queue clients 160A-160N may be selected based (at least in part) on a state of a network in the distributed strict queue system. For example, network congestion or other conditions that may affect performance (e.g., latency) may influence the selection of the servers and/or clients.

As will be described in greater detail below, components such as queue servers 115A-115N and/or queue clients 160A-160N may be provisioned or deprovisioned in order to optimize (e.g., improve) the performance, cost, and/or risk in the distributed strict queue system 2710. In one embodiment, the queue servers 115A-115N and/or queue clients 160A-160N may be provisioned or deprovisioned using the geographic awareness functionality 2720. Accordingly, the geographic awareness functionality 2720 or another suitable component may include a functionality for provisioning and deprovisioning 2740. The provisioning and deprovisioning functionality 2740 may select and/or provision any of the queue servers 115A-115N and/or queue clients 160A-160N. For example, the queue servers 115A-115N and/or queue clients 160A-160N may be provisioned from a suitable pool of available computing instances. In one embodiment, additional computing instances may be added to the queue servers 115A-115N and/or queue clients 160A-160N as needed. In one embodiment, computing instances may be returned to the pool of available computing instances from the queue servers 115A-115N and/or queue clients 160A-160N if the computing instances are not needed at a particular point in time. The queue service 2710 may provision queue servers 115A-115N and/or queue clients 160A-160N by reserving computing instances from a pool of available computing instances (e.g., by reserving computing instances whose host class has particular system parameters) and installing and/or configuring the software of the computing instances. The queue service 2710 may deprovision queue servers 115A-115N and/or queue clients 160A-160N by terminating the computing instance and returning it to the pool of available computing instances.

Figure 29:
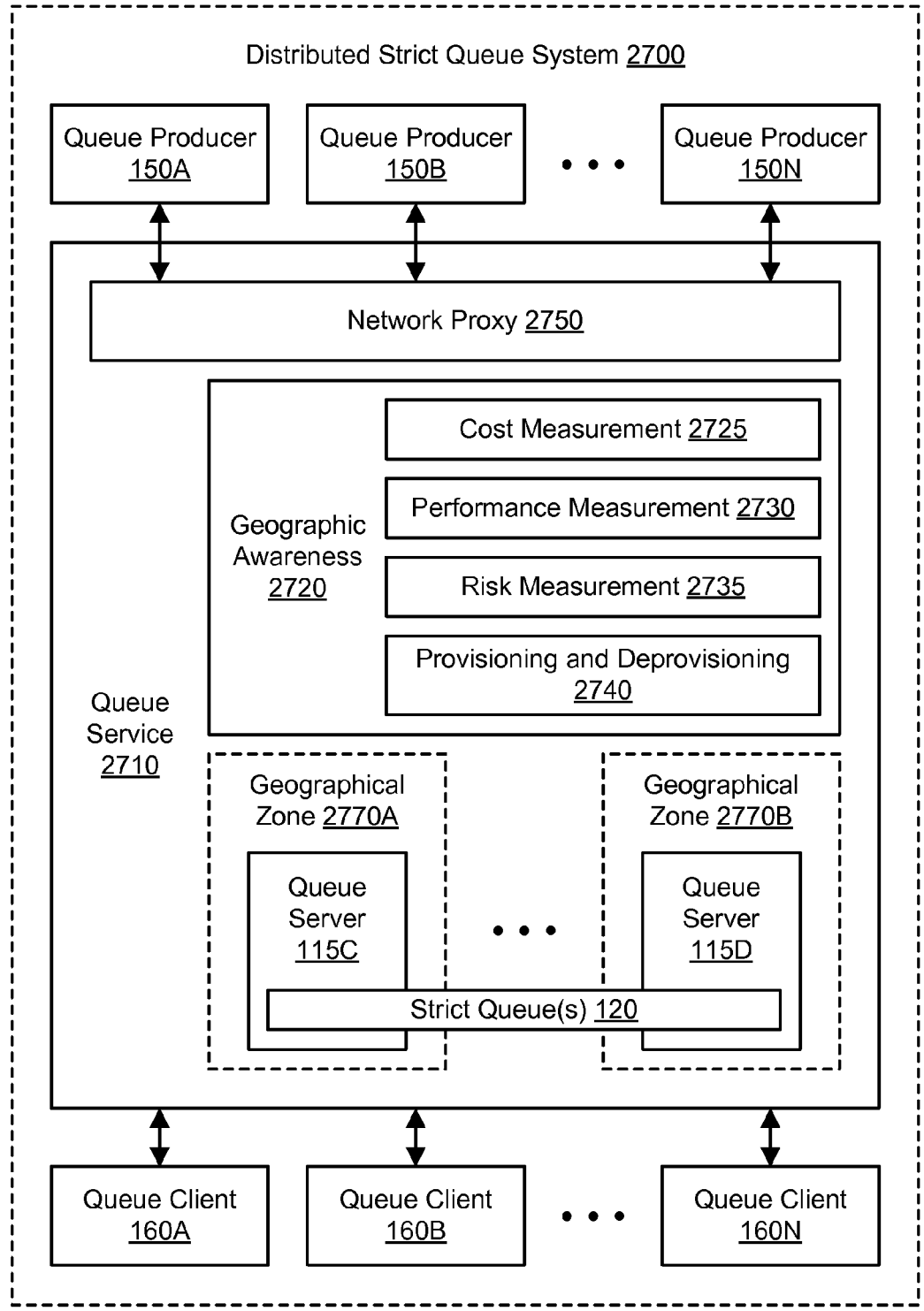
FIG. 29 illustrates an example system environment for geographic awareness in a distributed strict queue, including relocating the functionality of queue servers into different geographical locations, according to one embodiment.

FIG. 29 illustrates an example system environment for geographic awareness in a distributed strict queue, including relocating the functionality of queue servers into different geographical locations, according to one embodiment. In one embodiment, one or more queue servers may essentially be relocated to optimize the performance, cost, and/or risk of the distributed strict queue system 2710. Using the geographic awareness functionality 2720, the queue service may deprovision one or more queue servers and provision one or more other queue servers to replace the functionality of the deprovisioned server(s). The newly provisioned queue server(s) may be in a different geographical location than the deprovisioned server(s). By relocating the functionality of one or more queue servers from one geographical location to another geographical location, the distributed strict queue system 2710 may be optimized, e.g., for latency and/or other performance dimensions. In one embodiment, the newly provisioned queue server(s) may have lower latency than the deprovisioned queue server(s) with respect to one or more queue producers.

For example, as shown in FIG. 29, a queue server 115C may originally receive messages from one or more queue producers 150A-150N. The queue server 115C may be physically located in a first geographical zone 2770A. Using the geographic awareness functionality 2720, the queue service may deprovision the queue server 115C and provision a queue server 115D to replace the functionality of the deprovisioned server 115C. The queue server 115D may be physically located in a second geographical zone 2770B. The geographical zones 2770A and 2770B may represent any areas (including noncontiguous areas) defined by political or geographical boundaries, including hemispheres, continents, nations, states, administrative regions, metropolitan areas, etc. The geographical zones 2770A and 2770B may also represent any areas defined by technical boundaries, such as hosts, racks of hosts, or data centers. To relocate the functionality of the queue server 115C, one or more values for the strict order parameter may be transferred from the queue server 115C to the queue server 115D. After the relocation, the queue server 115D may receive the messages from the one or more queue producers 150A-150N that were originally directed to the queue server 115C, e.g., messages having values for the strict order parameter that were within the range of values transferred from queue server 115C to queue server 115D.

In one embodiment, the functionality of one or more queue servers may be moved from one geographical location to another geographical location based on the timing of message receipt. For example, messages having a particular value for the strict order parameter may be generated at a particular local time (e.g., noon) on a daily basis across a variety of time zones. As the spike in message generation migrates from time zone to time zone, queue producers in the various time zones may be directed to queue servers (newly provisioned or otherwise selected) in a nearby geographical location. Queue servers may be migrated again and again according to hourly cycles, daily cycles, weekly cycles, monthly cycles, etc. In this manner, the performance, cost, and/or risk of the distributed strict queue system 2700 may be optimized repeatedly and/or continuously.

In one embodiment, the queue server(s) may be relocated based on network latencies or other performance metrics that are currently being experienced. In one embodiment, the queue server(s) may be relocated based on network latencies or other performance metrics that are predicted to occur. Network latency or other performance metrics may be predicted using any suitable basis, such as the use of historical data and/or machine learning.

Figure 30:
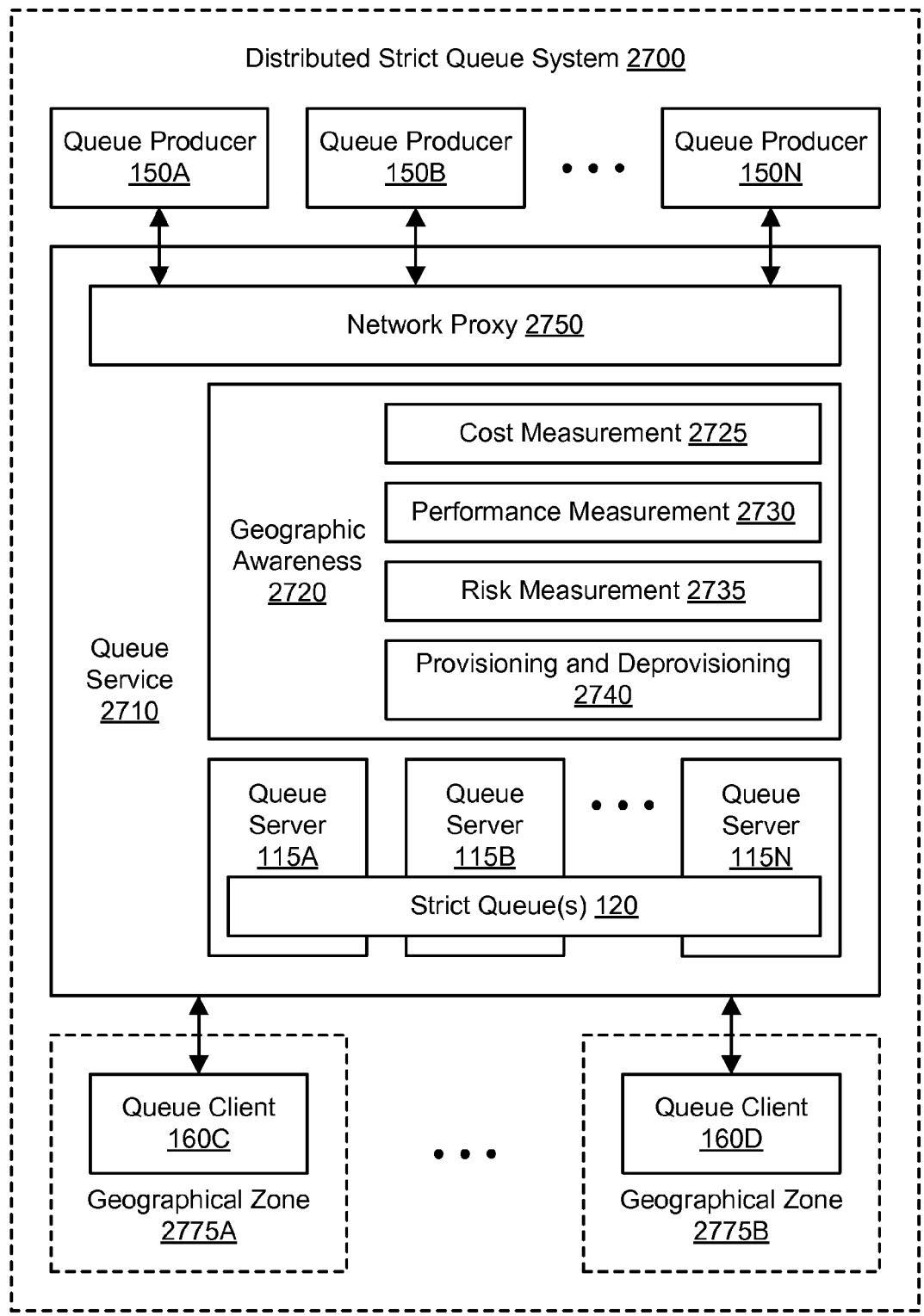
FIG. 30 illustrates an example system environment for geographic awareness in a distributed strict queue, including relocating the functionality of queue clients into different geographical locations, according to one embodiment.

FIG. 30 illustrates an example system environment for geographic awareness in a distributed strict queue, including relocating the functionality of queue clients into different geographical locations, according to one embodiment. In one embodiment, one or more queue clients may essentially be relocated to optimize the performance, cost, and/or risk of the distributed strict queue system 2710. Using the geographic awareness functionality 2720, the queue service may deprovision one or more queue clients and provision one or more other queue clients to replace the functionality of the deprovisioned client(s). The newly provisioned queue client(s) may be in a different geographical location than the deprovisioned client(s). By relocating the functionality of one or more queue clients from one geographical location to another geographical location, the distributed strict queue system 2710 may be optimized, e.g., for latency and/or other performance dimensions. In one embodiment, the newly provisioned queue client(s) may have lower latency than the deprovisioned queue client(s) with respect to one or more queue servers and/or one or more external components.

For example, as shown in FIG. 30, a queue client 160C may originally receive messages from one or more queue servers 115A-115N. The queue client 160C may be physically located in a first geographical zone 2775A. Using the geographic awareness functionality 2720, the queue service may deprovision the queue client 160C and provision a queue client 160D to replace the functionality of the deprovisioned client 160C. The queue client 160D may be physically located in a second geographical zone 2775B. The geographical zones 2775A and 2775B may represent any areas (including noncontiguous areas) defined by political or geographical boundaries, including hemispheres, continents, nations, states, administrative regions, metropolitan areas, etc. The geographical zones 2770A and 2770B may also represent any areas defined by technical boundaries, such as hosts, racks of hosts, or data centers. To relocate the functionality of the queue client 160C, one or more values for the strict order parameter may be transferred from the queue client 160C to the queue client 160D. After the relocation, the queue client 160D may receive the messages from the one or more queue servers 115A-115N that were originally directed to the queue client 160C, e.g., messages having values for the strict order parameter that were within the range of values transferred from queue client 160C to queue client 160D.

In one embodiment, the functionality of one or more queue clients may be moved from one geographical location to another geographical location based on the timing of message receipt. For example, messages having a particular value for the strict order parameter may be generated at a particular local time (e.g., noon) on a daily basis across a variety of time zones. As the spike in message generation migrates from time zone to time zone, queue servers in the various time zones may provide messages to queue clients (newly provisioned or otherwise selected) in a nearby geographical location. Queue clients may be migrated again and again according to hourly cycles, daily cycles, weekly cycles, monthly cycles, etc. In this manner, the performance, cost, and/or risk of the distributed strict queue system 2700 may be optimized repeatedly and/or continuously.

In one embodiment, the queue client(s) may be relocated based on network latencies or other performance metrics that are currently being experienced. In one embodiment, the queue client(s) may be relocated based on network latencies or other performance metrics that are predicted to occur.

Network latency or other performance metrics may be predicted using any suitable basis, such as the use of historical data and/or machine learning.

Figure 31:
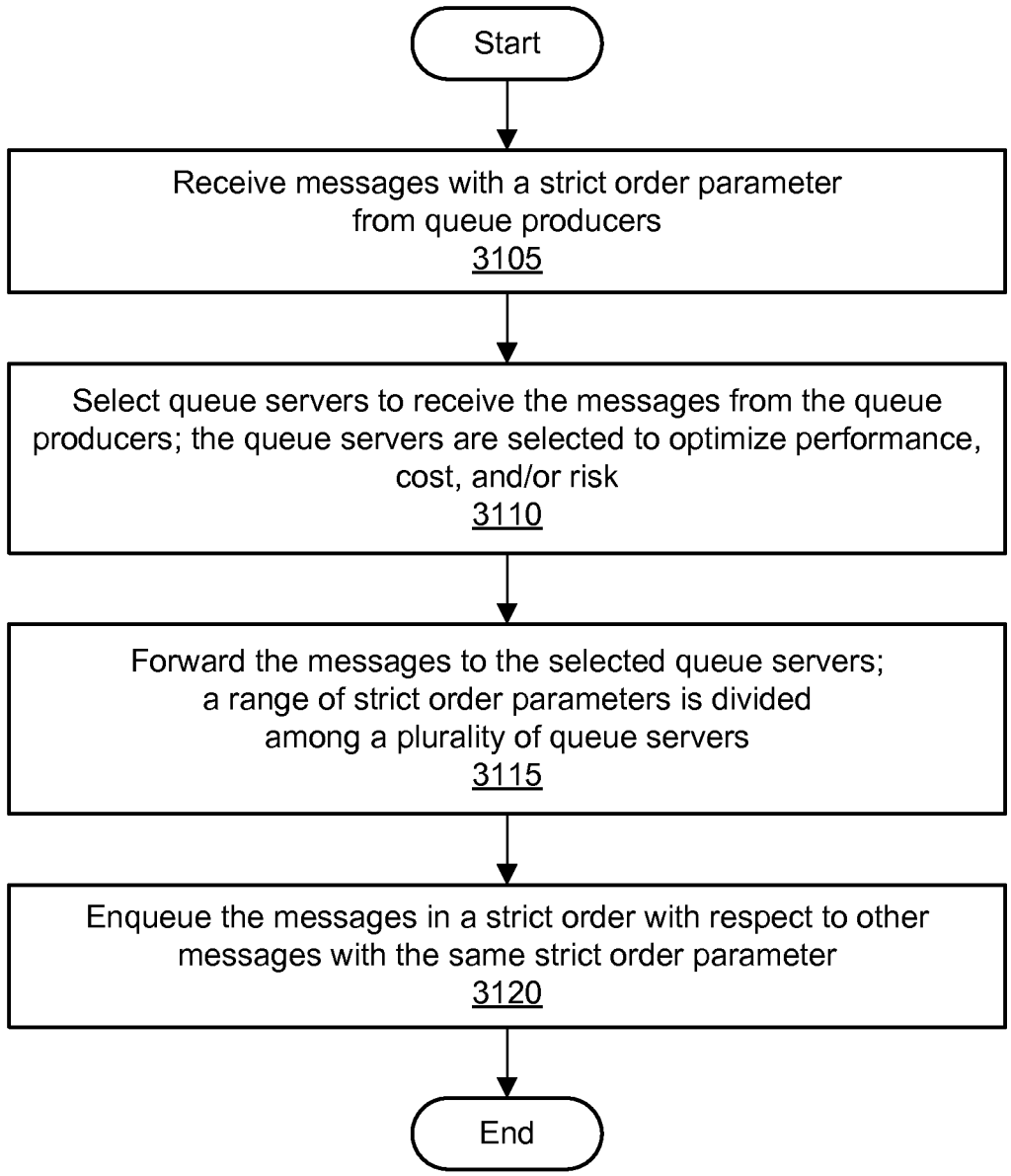
FIG. 31 is a flowchart illustrating a method for implementing geographic awareness in a distributed strict queue, according to one embodiment.

FIG. 31 is a flowchart illustrating a method for implementing geographic awareness in a distributed strict queue, according to one embodiment. As shown in 3105, a plurality of messages may be received at a distributed strict queue system. Each message may be received from a queue producer (e.g., a client, client account, process, instance, resource, etc.) and may have a strict order parameter assigned by the queue producer. The distributed strict queue system may receive the messages using any suitable component(s), such as one or more proxy servers and/or one or more queue servers. In one embodiment, the distributed strict queue system may compute a stable hash of the strict order parameter upon receipt of a message.

As shown in 3110, a plurality of queue servers may be selected to receive the messages from the queue producers. Each queue server may be selected from a pool of available queue servers. The queue servers may be selected to optimize or otherwise improve the performance, cost, and/or risk in the distributed strict queue system. For example, network latency may be optimized or reduced by selecting particular queue servers in particular geographical locations, e.g., a queue server with the same geographical zone as a queue producer. The interactions between the queue servers and the queue producers may include receiving messages at the queue servers from the queue producers.

As shown in 3115, each message may be forwarded to the selected queue server. A range of strict order parameters may be divided among the queue servers. Each strict order parameter may be assigned to one and only one of the queue servers. In one embodiment, a range of one or more values for the strict order parameter may be assigned to a queue server when the queue server is selected to receive the messages from the queue producer(s). The messages may then be delivered to the selected queue server based on the strict order parameter.

As shown in 3120, each message may be enqueued based on the time of receipt. The time of receipt may be based on the receipt of the first or last byte of the message at the destination queue server. The message may be placed in a queue in a strict order with respect to other messages with the same value for the strict order parameter. In some cases, however, the message may be out of order with respect to messages with other values for the strict order parameter. In this manner, the distributed strict queue system may ensure that messages with the same strict order parameter (i.e., with the same values thereof) are strictly ordered in a queue while messages with different strict order parameters (i.e., with different values thereof) are not necessarily in the correct order (i.e., weakly ordered or non-strictly ordered). In one embodiment, the primary server may update one or more backup servers (e.g., a secondary server and a tertiary server) with updates regarding the enqueuing of the message. One or more queue clients may be configured to dequeue and process the messages.

Multi-Tiered Processing

Figure 32:
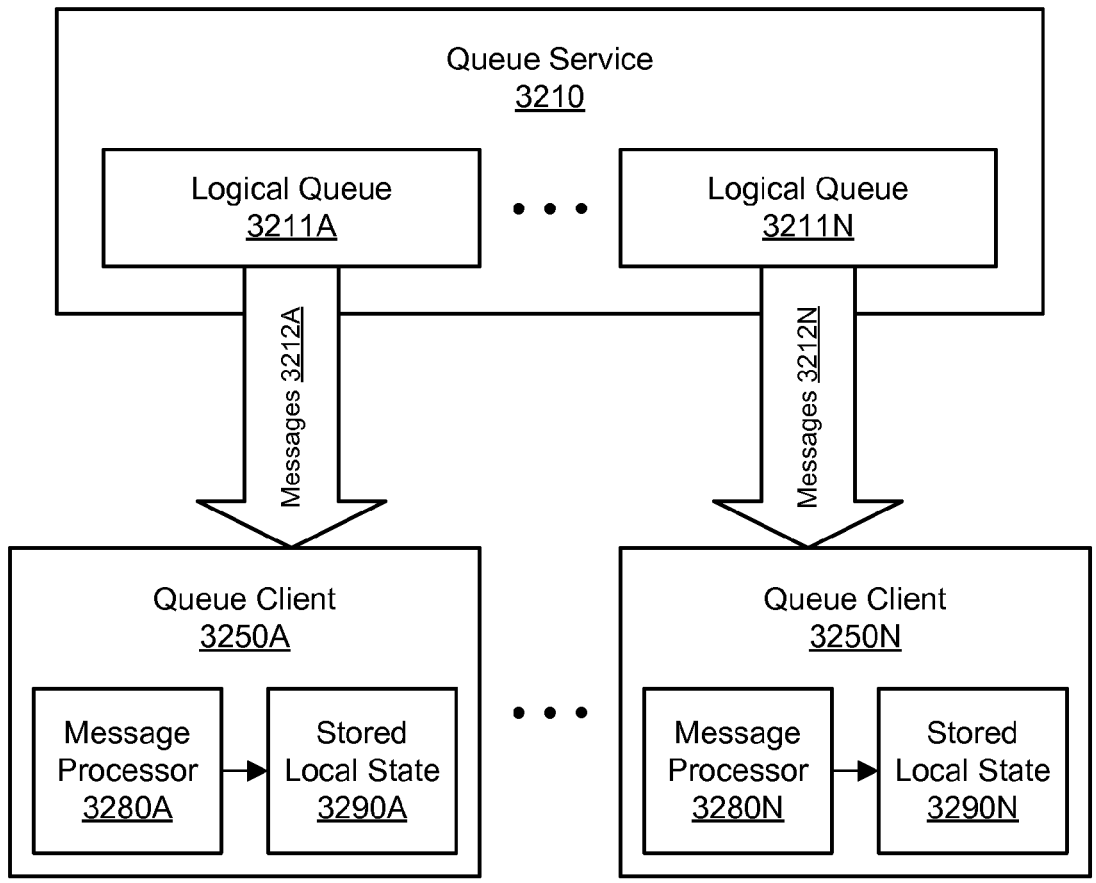
FIG. 32 illustrates an example system environment for multi-tiered processing using a distributed strict queue, according to one embodiment.

FIG. 32 illustrates an example system environment for multi-tiered processing using a distributed strict queue, according to one embodiment. A queue service 3210 may be implemented as part of a distributed strict queue system, such as the distributed strict queue system 100. Additionally, the queue service 3210 may be implemented using any combination of the features described herein with respect to queue services, such as the queue service 110. For example, the queue service 3210 may be implemented using one or more queue servers, such as queue servers 115A-115N shown in FIG. 1. As discussed above with respect to the queue service 110, the queue service 3210 may implement one or more logical queues (such as logical queues 3211A-3211N) in which messages with the same value for a strict order parameter are presented in their intended order. Queue clients 3250A-3250N may be implemented using any combination of the features described herein with respect to queue consumers and/or queue clients, such as the queue consumers 160A-160N. The queue clients 3250A-3250N may receive the messages from the logical queue(s) (in their intended order for each value of the strict order parameter) and execute instructions in the messages or otherwise implement the messages. In one embodiment, the queue service 3210 may deliver each message only once.

It is contemplated that the queue service 3210 and queue clients 3250A-3250N may include additional components not shown, fewer components than shown, or different combinations, configurations, or quantities of the components shown. For example, although two queue clients 3250A and 3250N are shown for purposes of example and illustration, it is contemplated that different quantities and combinations of queue clients may be used. The queue service 3210 and queue clients 3250A-3250N may be implemented using one or more computing devices, any of which may be implemented by the example computing device 5000 illustrated in FIG. 36. In some embodiments, the queue service 3210 and/or queue clients 3250A-1320N may be implemented as one or more virtual compute instances and/or physical compute instances. In various embodiments, portions of the functionality shown in FIG. 32 may be provided by the same computing device or by any suitable number of different computing devices. If any of the components shown in FIG. 32 are implemented using different computing devices, then the components and their respective computing devices may be communicatively coupled, e.g., via a network. Each of the illustrated components may represent any combination of software and hardware usable to perform their respective functions.

The queue service 3210 may maintain one or more logical queues, such as logical queue 3211A and logical queue 3211N. Although two logical queues 3211A and 3211N are shown for purposes of example and illustration, it is contemplated that different quantities of logical queues may be used. Each logical queue may use a first-in, first-out (FIFO) data structure to store one or more messages associated with a particular value for a strict order parameter. For example, the logical queue 3211A may store a series of ordered messages having one value for the strict order parameter, and the logical queue 3211N may store another series of ordered messages having another value for the strict order parameter. The messages may represent tasks or requests to be executed or otherwise implemented using appropriate computing resources. For example, a message may describe or reference one or more instructions to be executed or interpreted using source data from one or more indicated data sources and/or storing results in one or more indicated data destinations. Accordingly, each of the queue clients 3250A-3250N may include a message processor, such as message processor 3280A for queue client 3250A and message processor 3280N for queue client 3250N. The message processors 3280A-3280N may implement the instructions in the messages, potentially by invoking the functionality of one or more backend systems.

In one embodiment, the queue service 3210 may implement a strict client preference for one or more the queue clients 3250A-3250N. Based on the strict client preference, a particular queue client may know with certainty that it is receiving all messages for its assigned range of values of the strict order parameter. To implement the strict client preference, the queue service 3210 may be configured not to forget the assignment of the strict order parameter range to a particular queue client, even if there are no messages within the range in the logical queues 3211A-1311N. In other words, the assignment of a slice of the strict order parameter space may be locked to the queue client.

In one embodiment, the queue client 3250A may obtain messages 3212A from the logical queue 3211A using a strict client preference. In one embodiment, the queue client 3250N may obtain messages 3212N from the logical queue 3211N using a strict client preference. In one embodiment, a queue client may pull messages from the queue service 3210. The client may pull messages from one or more of the logical queues 3211A-3211N sending one or more requests for one or more additional messages to the queue service 3210 or by otherwise initiating the pulling of messages from the queue service. In one embodiment, the queue service 3210 may push messages to a queue client. The queue client may send to the queue service 3210 an indication of the client's health at appropriate points in time. In one embodiment, messages may be pushed to the queue client periodically based on an analysis of the queue client's health by the queue service 3210.

In one embodiment, each of the queue clients 3250A-3250N may store local state data, such as stored local state 3290A for queue client 3250A and stored local state 3290N for queue client 3250N. The stored local state may indicate aspects of the message processing on the local queue client. The stored local state may include results of message processing for one or more messages such as aggregate metrics, counts of items, etc. The stored local state may be carried over from one message to the next. Elements of the stored local state may be associated with a value for the strict order parameter. In one embodiment, elements of the stored local state may be removed or allowed to expire from the stored local state when the processing of a corresponding set of messages has successfully completed. The queue clients 3250A-3250N may use any suitable storage technologies, such as transient memory, cache memory, or persistent memory, to store the local state. In one embodiment, the queue clients 3250A-3250N may store the local state using local (i.e., on-host) memory resources for the corresponding queue client.

Figure 33:
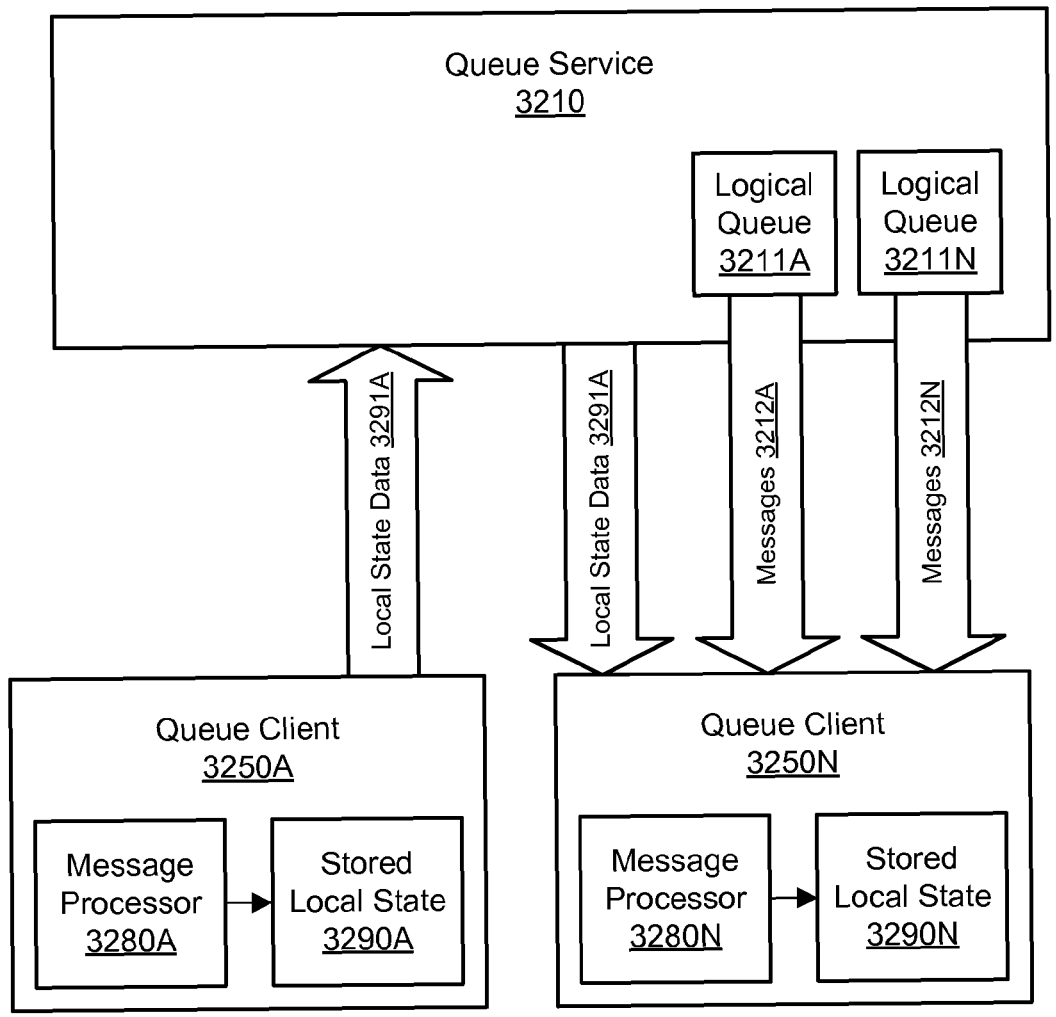
FIG. 33 illustrates an example system environment for multi-tiered processing using a distributed strict queue, including migration of client state, according to one embodiment.

FIG. 33 illustrates an example system environment for multi-tiered processing using a distributed strict queue, including migration of client state, according to one embodiment. In one embodiment, the queue service 3210 may transfer the assignment of one or more values for the strict order parameter from one queue client to another queue client. The assignment may be transferred for any suitable reason, such as load balancing among the queue clients 3250A-3250N, the termination or deprovisioning of a queue client, the failure of a queue client (e.g., the failure to process one or more messages successfully), etc.

When the queue service 3210 transfers an assignment of the strict order parameter space, the queue service may also transfer at least a portion of the stored local state from the donor client to the recipient client. For example, as shown in FIG. 33, the queue service 3210 may transfer an assignment of one or more values for the strict order parameter from queue client 3250A to queue client 3250N. The transferred assignment may correspond to a value for the strict order parameter associated with logical queue 3211A. To implement the transfer, the queue service 3210 may obtain local state data 3291A that represents all or part of the stored local state 3290A (e.g., the portions of the stored local state 3290A that relate to message processing for the transferred value for the strict order parameter). In one embodiment, the queue service 3210 may obtain the local state data 3291A by sending a control message to the queue client 3250A to request the local state data 3291A. The queue client 3250A may also send any other control messages to the queue client 3250A to terminate the client's responsibility for the transferred value for the strict order parameter. The queue service 3210 may then send the local state data 3291A to the queue client 3250N that is assuming responsibility for the transferred value for the strict order parameter. Using a strict client preference, the queue client 3250N may resume processing messages from the logical queue 3211A that was previously linked to the queue client 3250A with a strict client preference.

Figure 34A:
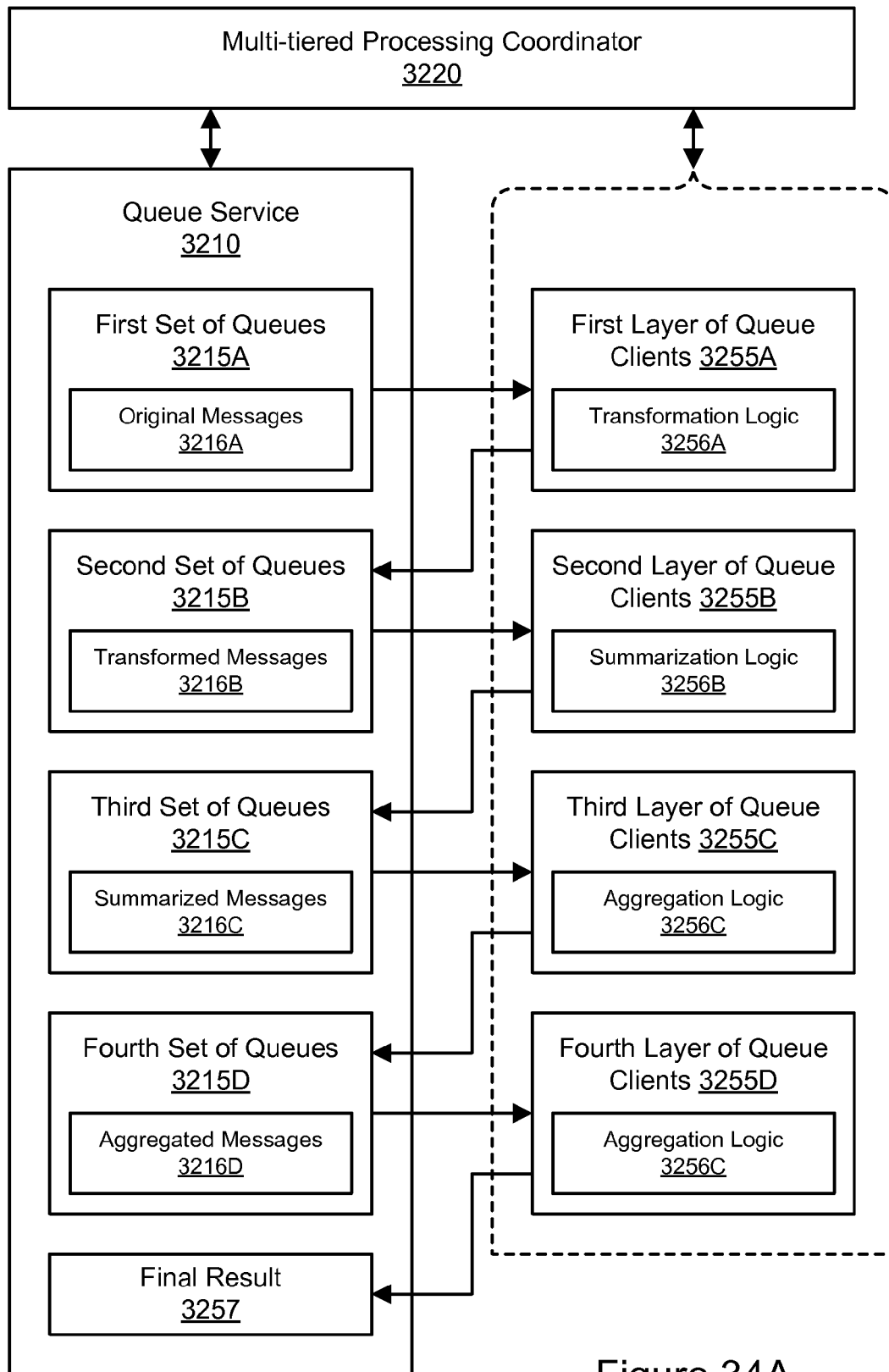
FIG. 34A illustrates an example system environment for multi-tiered processing using a distributed strict queue, including three layers of queue clients, according to one embodiment.

FIG. 34A illustrates an example system environment for multi-tiered processing using a distributed strict queue, including three layers of queue clients, according to one embodiment. In one embodiment, a multi-tiered processing coordinator 3220 may coordinate the activities of multiple queues and multiple layers (or tiers) of queue clients to perform processing tasks based on a set of input data. The multi-tiered processing coordinator 3220 may use any suitable interfaces to coordinate the multi-tiered processing algorithm, e.g., by causing the creation and/or configuration of various queues, causing the provisioning and/or configuration of queue clients, etc. The multi-tiered processing coordinator 3220 may take advantage of the strict client preference and the stored local state to ensure the correctness of final results. The multi-tiered processing coordinator 3220 may be implemented using one or more computing devices, any of which may be implemented by the example computing device 5000 illustrated in FIG. 36.

In one embodiment, the multi-tiered processing may be implemented using three or more sets of queues. Each set of queues (potentially including multiple queues) may provide messages to a corresponding set of queue clients (potentially including multiple clients) that generate messages for the set of queues at the next level. In one embodiment, the number of queues and/or queue clients are each level may be greater than the corresponding number at the next level. Accordingly, intermediate results may cascade down through the multiple queues until a final result is generated. The final result may reflect the contributions of the original messages.

The multi-tiered processing controller 3220 may coordinate aspects of the multi-tiered processing. In one embodiment, multi-tiered processing controller 3220 may configure any of the sets of queues (e.g., the first set of queues 3215A, the second set of queues 3215B, and/or the third set of queues 3215C). In one embodiment, the multi-tiered processing controller 3220 may provision or configure any of the sets of queue clients (e.g., the first layer of queue clients 3255A, the second layer of queue clients 3255B, and/or the third layer of queue clients 3255C). The multi-tiered processing controller 3220 may also monitor the health of the queue clients and take any suitable actions to mitigate client problems, such as by rebalancing the range of strict order parameters across a layer or otherwise transferring an assignment of a strict order parameter from client to client.

In one embodiment, the queue service 3210 may implement the multi-tiered processing using queues and clients at three or more layers. As shown in FIG. 34A, a first set of one or more queues 3215A may include a plurality of original messages 3216A. The original messages may be produced by any suitable set of queue producers and enqueued using the queue service 3210. A first layer of one or more queue clients (typically multiple clients) 3255A may dequeue the original messages 3216A, apply transformation logic 3256A to the original messages, and place the transformed messages 3216B in a second set of one or more queues 3216B. As used herein, "transformation" generally includes modification of the data structure of the input, extraction of data from the input, and/or other modification of data in the input. Each of the queue clients in the first layer 3255A may generate a single transformed message based on one or more original messages. In one embodiment, the transformation logic 3256A may be configured to extract data from the original messages 3216A and generate a data structure that includes the extracted data. The data structure may be similar to a data structure used for a final result 3257 of the multi-tiered processing. In one embodiment, the transformation logic 3256A may assign values for the strict order parameter to the transformed messages. In one embodiment, aspects of the transformation logic 3256A, such as the assignment of values for the strict order parameter and/or the generation of appropriate data structures, may instead be performed by queue producers. Accordingly, in one embodiment, the first layer of queue clients 3255A may be optional.

In one embodiment, a second layer of one or more queue clients (typically multiple clients) 3255B may dequeue the transformed messages 3216B, apply summarization logic 3256B to the transformed messages, and place the summarized messages 3216C in a third set of one or more queues 3216C. As used herein, "summarization" of input generally includes representing the input using a smaller quantity or size of data. Each of the queue clients in the second layer 3255B may generate a single summarized message based on a plurality of transformed messages. In one embodiment, the summarization logic 3256B may be configured to generate a data structure that includes a summarization of the data extracted by the first layer of queue clients 3255A. The data structure may be similar to a data structure used for a final result 3257 of the multi-tiered processing.

In one embodiment, a third layer of one or more queue clients (typically multiple clients) 3255C may dequeue the summarized messages 3216C, apply aggregation logic 3256C to the summarized messages, and produce one or more aggregated messages. As used herein, "aggregation" of input generally includes combining aspects of the input into a single output or a smaller quantity of output items than input items. Each of the queue clients in the third layer 3255C may generate a single aggregated message based on a plurality of summarized messages. In one embodiment, the aggregation logic 3256C may be configured to generate a data structure that includes an aggregation of the data extracted by the first layer of queue clients 3255A and summarized by the second layer of queue clients 3255B. The data structure may be similar to a data structure used for a final result 3257 of the multi-tiered processing.

If the third layer includes only one queue client, then the aggregated message that it produces may represent the final result 3257. If not, then additional layers of queue clients may implement the aggregation logic 3256C until a single aggregated message (representing the final result 3257) is generated by a single queue client in a final layer. For example, as shown in FIG. 34A, the third layer 3255C may place aggregated messages 3216D into a fourth set of queues 3215D, and a fourth layer of one or more queue clients 3255D may apply the same aggregation logic 3256C to the aggregated messages to produce one or more further aggregated messages. The final result 3257 may ultimately be based on cascading tiers of aggregation using the aggregation logic 3256C.

Figure 34B:
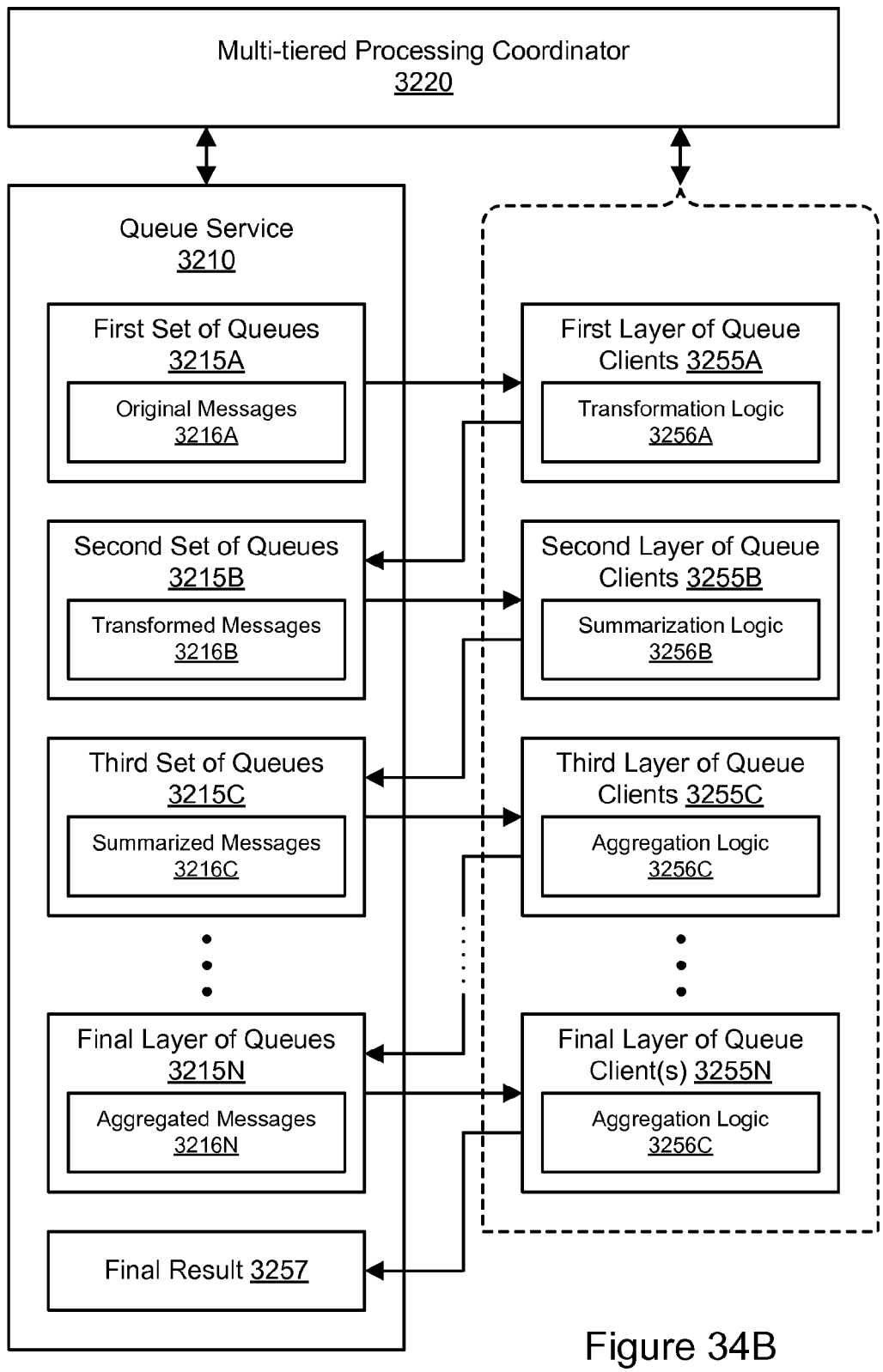
FIG. 34B illustrates an example system environment for multi-tiered processing using a distributed strict queue, including multiple aggregation layers of queue clients, according to one embodiment.

FIG. 34B illustrates an example system environment for multi-tiered processing using a distributed strict queue, including multiple aggregation layers of queue clients, according to one embodiment. In one embodiment, the aggregation functionality of the third layer of queue clients 3255C may be extended to one or more additional layers of queue clients. As shown in FIG. 34B, the aggregation logic may be implemented by any suitable number of layers of queue clients, including the third layer 3255C through a final layer 3255N. Each client in the third through final layers may implement the aggregation logic 3256C as discussed above. Until the final layer of one or more queue clients 3255N, the queue clients in the third layer through the next to final layer may generate aggregated messages such as aggregated messages 3216N. The queue client(s) at each successive layer beyond the third layer may further aggregate the aggregated data from the previous layer.

In one embodiment, queue clients at multiple layers may run on the same computing instance at the same time. In one embodiment, queue clients at multiple layers may run on the same computing instance at different times. Any suitable number of queue servers, queue clients, network proxies, and/or multi-tiered processing coordinators may run on the same computing instance. The amount of hardware reuse may be determined dynamically, e.g., based on metrics and/or parameters described herein with respect to queue client selection in addition to similar metrics and/or parameters for queue servers.

As intermediate results are generated through the summarization and aggregation, the number of queue clients at each successive layer may be fewer than the number of queue clients at the previous layer. Accordingly, the multi-tiered processing algorithm may represent a cascade from more queue clients (and corresponding queues) to fewer queue clients (and corresponding queues). At each successive layer, the messages may be segregated based on the number of clients at the next layer. In one embodiment, each client in the second layer and beyond may receive messages from a set of queues based on one or more values for the strict order parameter and based on a strict client preference. The amount of data may be reduced in each successive layer from the second layer to the final layer. In one embodiment, the value for the strict order parameter assigned to a summarized message or aggregated message may be based on the contents of the message. For example, the value may be an alphanumeric string or a random hash of the message. In one embodiment, the values for the strict order parameter may be shorter at each successive layer, and the range of values may be reduced in each successive layer from the second layer to the final layer.

In one embodiment, the queue service 3210 may isolate among queue clients for individual values or ranges of values for the strict order parameter. In processing sensitive information for a particular customer, a client may be isolated from clients processing messages for other customers, e.g., at a network level. Accordingly, the queue service 3210 may provision different queue clients to process messages for different values for the strict order parameter, e.g., representing different customers. In one embodiment, each value for the strict order parameter may be isolated and may be sent to one and only one client.

The multi-tiered processing algorithm described herein may represent an improvement on the MapReduce algorithm. The first and second layers may broadly correspond to the Map phase of MapReduce. However, in contrast to the MapReduce algorithm, a shuffle phase between the Map and Reduce phases may be avoided using the multi-tiered processing algorithm described herein. The third layer and any additional layers may broadly correspond to the Reduce phase of MapReduce. In the multi-tiered processing scheme described herein, the first layer may be referred to as a Map phase, the second layer as a Reduce phase, and the third layer as a Collect phase. Using these three or more layers of queue clients, the queue service 3210 may implement multi-tiered processing that is more efficient than a corresponding MapReduce solution.

The following example may illustrate the use of the multi-tiered processing implemented by the queue service 3210. In this example, the original messages in the firsts set of queues may represent a real-time (or near-real-time) stream of messages from a social media hub over an interval of time. Some of the original messages may contain hashtags or other items of interest. The multi-tiered processing algorithm may be used to determine the top N hashtags over the interval of time. Each client in the first layer may read one or more messages from one of the first queues, extract any hashtag(s) from the message(s), and generate a transformed message including the hashtag. Each transformed message may correspond to a single one of the original messages; however, not every one of the original messages may produce a transformed message. The first client may assign a value for the order parameter to the transformed message; the value may be based on the content (e.g., the hashtag), such as a string representing the hashtag.

In this example, each client in the second layer may read a plurality of transformed messages from one or more of the second set of queues. Each client in the second layer may collect the transformed messages into local memory and maintain a list of the top N hashtags it has seen over the interval of time. After the interval of time has ended, each client in the second layer may generate a summarized message representing the top N hashtags over the interval of time. In one embodiment, the summarized message may represent the most seen hashtag(s) and a count of the number of times each hashtag has been seen by the client over the interval of time.

In this example, each client in the third layer may receive a plurality of summarized messages and aggregate the top N hashtags into an aggregated data structure representing the top N hashtags for all the summarized messages viewed by the client at the third layer. Similarly, each client in any subsequent layer may receive a plurality of aggregated messages and aggregate the top N hashtags into another aggregated data structure representing the top N hashtags for all the aggregated messages viewed by the client at the third layer. In one embodiment, the aggregated message may represent the most seen hashtag(s) and a count of the number of times each hashtag has been seen by the client over the interval of time. At each layer from the second through the next to final layer, a queue client may perform its logic based on only a subset of the original messages, e.g., to generate the top N hashtags over a subset of the original messages. After the data structures cascade down to the final layer, the final result may be a data structure representing the top N hashtags for all (or substantially all) the original messages.

At the second layer, third layer, or any subsequent layer, the queue service 3210 may monitor the performance of the queue clients. If the queue service 3210 determines that any of the clients does not have sufficient resources to process messages for its range of values for the strict order parameter, the queue service 3210 may split the order parameter space at that layer and assign one or more values to other queue clients. If a single value for the order parameter space must be assigned to two or more clients so that one client is not overloaded, then the value for the order parameter may be modified, e.g., by concatenating a random number (within the range of the number of clients for the value) to the original value. If any of the queue clients experiences a failure or is otherwise terminated, the queue service 3210 may transfer the saved local state to another client at the same layer, along with a transferred assignment of one or more values for the strict order parameter.

Figure 35A:
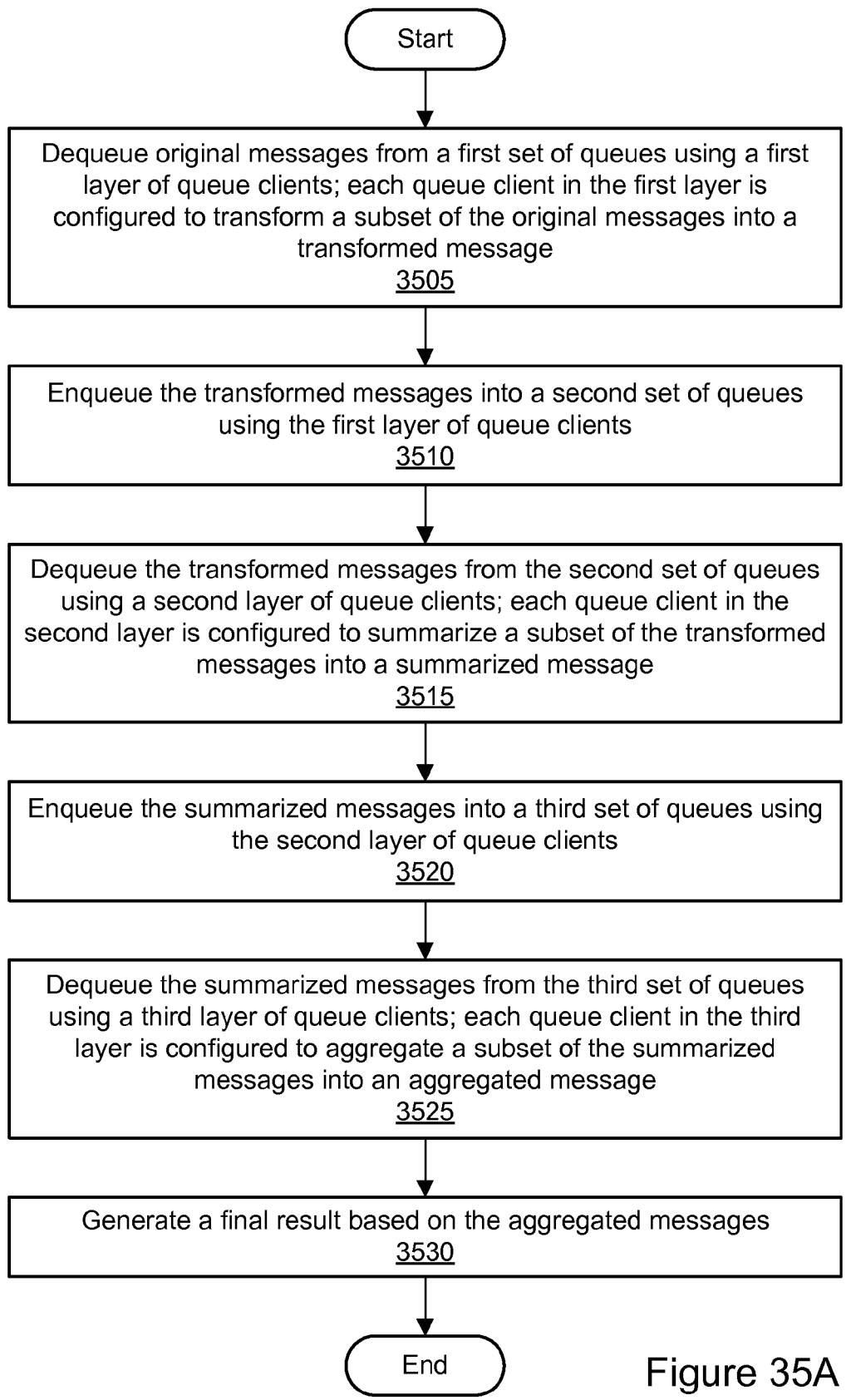
FIG. 35A is a flowchart illustrating a method for implementing multi-tiered processing using a distributed strict queue, according to one embodiment.

FIG. 35A is a flowchart illustrating a method for implementing multi-tiered processing using a distributed strict queue, according to one embodiment. As shown in 3505, a plurality of original messages may be dequeued from a first set of queues using a first layer of queue clients. The plurality of original messages may be segregated among the first layer of queue clients. Each queue client in the first layer of queue clients may be configured to transform a subset of the original messages into a respective transformed message. As shown in 3510, the transformed messages may be enqueued into a second set of queues using the first layer of queue clients. Each of the transformed messages may comprise a respective value for a strict order parameter, and a range of values for the strict order parameter is reduced from the current layer of queue clients to the next layer of queue clients.

As shown in 3515, the plurality of transformed messages may be dequeued from the second set of queues using a second layer of queue clients. The plurality of transformed messages may be segregated among the second layer of queue clients. Each queue client in the second layer of queue clients may be configured to summarize a subset of the transformed messages into a respective summarized message. As shown in 3520, the summarized messages may be enqueued into a third set of queues using the second layer of queue clients. Each of the summarized messages may comprise a respective value for a strict order parameter, and a range of values for the strict order parameter is reduced from the current layer of queue clients to the next layer of queue clients.

As shown in 3525, the plurality of summarized messages may be dequeued from the third set of queues using a third layer of queue clients. The plurality of summarized messages may be segregated among the third layer of queue clients. Each queue client in the third layer of queue clients may be configured to aggregate a subset of the summarized messages into a respective aggregated message. In one embodiment, the third layer of queue clients may enqueue the aggregated messages into a fourth set of queues, and additional layers of queue clients may further aggregate the aggregated messages using any suitable number of layers and queues. Each of the aggregated messages may comprise a respective value for a strict order parameter, and a range of values for the strict order parameter is reduced from the current layer of queue clients to the next layer of queue clients.

As shown in 3530, a final result may be generated based on the aggregated messages. The final result may be indicative of respective contributions from the plurality of original messages. In one embodiment, a final aggregated message may represent the final result.

Figure 35B:
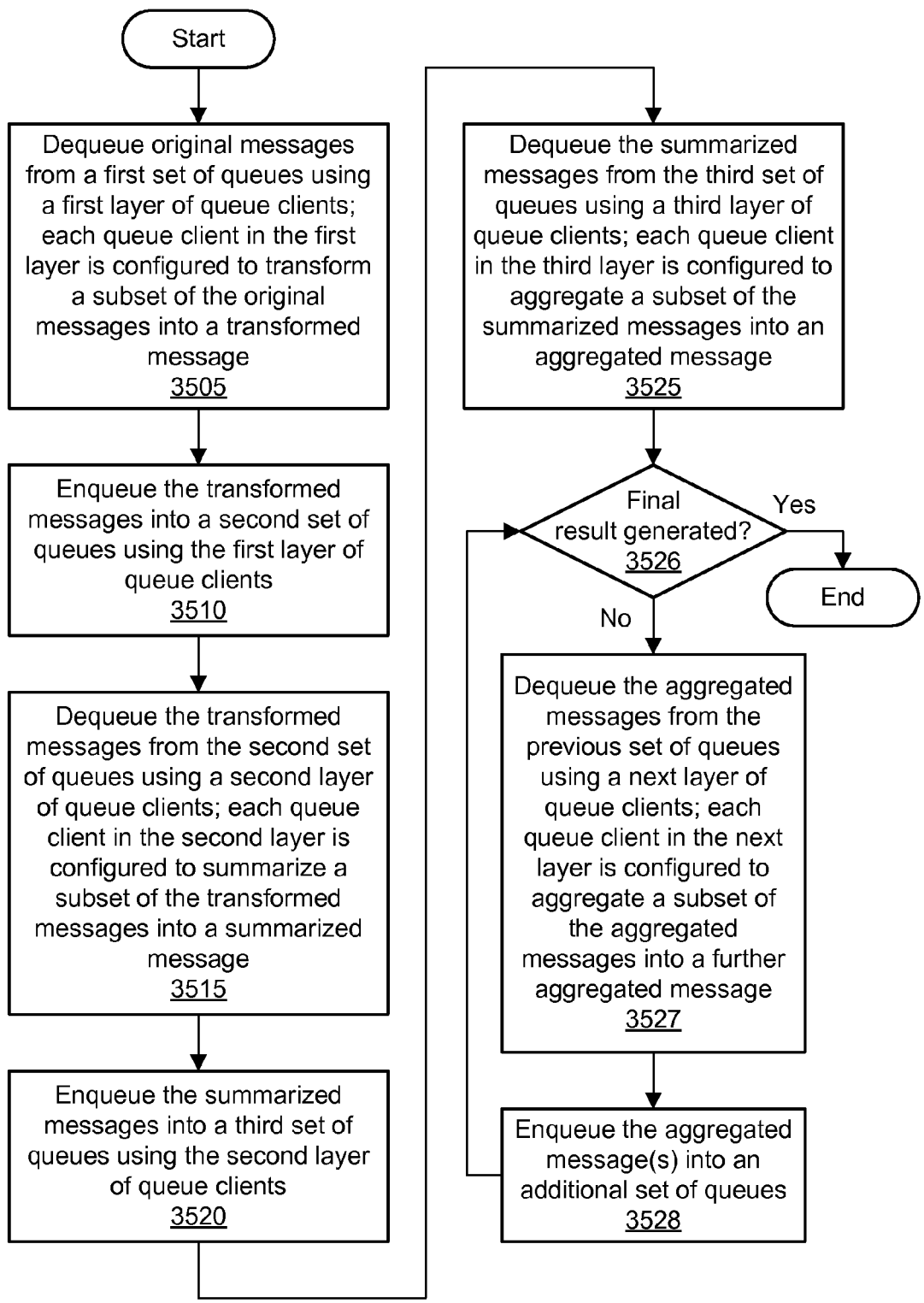
FIG. 35B is a flowchart illustrating a method for implementing multi-tiered processing using a distributed strict queue, according to one embodiment.

FIG. 35B is a flowchart illustrating a method for implementing multi-tiered processing using a distributed strict queue, according to one embodiment. As shown in 3505, a plurality of original messages may be dequeued from a first set of queues using a first layer of queue clients. The plurality of original messages may be segregated among the first layer of queue clients. Each queue client in the first layer of queue clients may be configured to transform a subset of the original messages into a respective transformed message. As shown in 3510, the transformed messages may be enqueued into a second set of queues using the first layer of queue clients. Each of the transformed messages may comprise a respective value for a strict order parameter, and a range of values for the strict order parameter is reduced from the current layer of queue clients to the next layer of queue clients.

As shown in 3515, the plurality of transformed messages may be dequeued from the second set of queues using a second layer of queue clients. The plurality of transformed messages may be segregated among the second layer of queue clients. Each queue client in the second layer of queue clients may be configured to summarize a subset of the transformed messages into a respective summarized message. As shown in 3520, the summarized messages may be enqueued into a third set of queues using the second layer of queue clients. Each of the summarized messages may comprise a respective value for a strict order parameter, and a range of values for the strict order parameter is reduced from the current layer of queue clients to the next layer of queue clients.

As shown in 3525, the plurality of summarized messages may be dequeued from the third set of queues using a third layer of queue clients. The plurality of summarized messages may be segregated among the third layer of queue clients. Each queue client in the third layer of queue clients may be configured to aggregate a subset of the summarized messages into a respective aggregated message. As shown in 3526, it may be determined (e.g., by the multi-tiered processing coordinator) whether a final result has been generated. For example, the final result may be generated if the current layer of one or more queue clients has produced a single aggregated message. If a final result has been generated, then the method may end. If a final result has not been generated, then as shown in 3527, the plurality of aggregated messages may be dequeued from the previous set of queues using a next layer of queue clients. The plurality of aggregated messages may be segregated among the next layer of queue clients. Each queue client in the next layer of queue clients may be configured to aggregate a subset of the aggregated messages into a respective aggregated message. As shown in 3528, the aggregated message(s) may be enqueued into an additional set of one or more queues. Each of the aggregated messages may comprise a respective value for a strict order parameter, and a range of values for the strict order parameter is reduced from the current layer of queue clients to the next layer of queue clients.

Illustrative Computer System

In at least some embodiments, a computer system that implements a portion or all of one or more of the technologies described herein may include a general-purpose computer system that includes or is configured to access one or more computer-readable media. FIG. 36 illustrates such a general-purpose computing device 5000. In the illustrated embodiment, computing device 5000 includes one or more processors 5010 (e.g., processors 5010A and 5010B through 5010N) coupled to a system memory 5020 via an input/output (I/O) interface 5030. Computing device 5000 further includes a network interface 5040 coupled to I/O interface 5030.

In various embodiments, computing device 5000 may be a uniprocessor system including one processor 5010 or a multiprocessor system including several processors 5010 (e.g., two, four, eight, or another suitable number). Processors 5010 may include any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store program instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 5020 as code (i.e., program instructions) 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computing device 5000 and other devices 5060 attached to a network or networks 5050, such as other computer systems or devices as illustrated in FIG. 1, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 5000 via I/O interface 5030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040. Portions or all of multiple computing devices such as that illustrated in FIG. 36 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a distributed strict queue system, wherein the distributed strict queue system comprises a plurality of queue servers, and wherein the distributed strict queue system is configured to:
      receive a plurality of messages, wherein each of the plurality of messages comprises a respective value for a strict order parameter;
      forward each of the plurality of messages to a respective queue server of the plurality of queue servers based at least in part on the respective value for the strict order parameter, wherein a range of values for the strict order parameter is divided among the plurality of queue servers;
      enqueue the plurality of messages at the plurality of queue servers, wherein individual ones of the plurality of messages that share a respective value for the strict order parameter are enqueued in a strict order based at least in part on time of receipt at the respective queue server;
      determine a respective message processing capability of individual ones of a plurality of queue clients, wherein the respective message processing capability is based at least in part on a respective hardware configuration;
      determine a respective message processing throughput of individual values for the strict order parameter; and
      select a respective one of the queue clients to process messages for one or more values for the strict order parameter, wherein the respective one of the queue clients is selected based at least in part on the respective message processing capability of the selected queue client and the respective message processing throughput of the one or more values for the strict order parameter.

2. The system as recited in claim 1, wherein the respective message processing capability is based at least in part on one or more performance metrics indicative of message processing performance of the individual ones of the plurality of queue clients.

3. The system as recited in claim 1, wherein the respective one of the queue clients is selected based at least in part on cost optimization.

4. The system as recited in claim 1, wherein the respective one of the queue clients is selected based at least in part on a respective message size parameter for individual ones of the enqueued messages.

5. A computer-implemented method, comprising:
   distributing a plurality of messages to a plurality of queue servers based at least in part on a respective value for a strict order parameter for individual ones of the messages, wherein individual ones of the messages that share a respective value for the strict order parameter are distributed to a respective one of the queue servers;
   enqueueing the plurality of messages at the plurality of queue servers, wherein individual ones of the plurality of messages that share a respective value for the strict order parameter are enqueued in a strict order based at least in part on time of receipt at the respective one of the queue servers; and
   selecting, from a pool of available queue clients, a queue client to process messages for one or more values for the strict order parameter, wherein the queue client is selected based at least in part on a respective message processing capability of individual ones of the pool of available queue clients and a respective message processing throughput of the one or more values for the strict order parameter.

6. The method as recited in claim 5, wherein the respective message processing capability is based at least in part on one or more hardware parameters and one or more performance metrics indicative of message processing performance.

7. The method as recited in claim 5, wherein the queue client is selected based at least in part on cost optimization.

8. The method as recited in claim 7, wherein the cost optimization comprises optimization of a respective software licensing cost at individual ones of the pool of available queue clients.

9. The method as recited in claim 5, wherein the queue client is selected based at least in part on the selected queue client having available throughput for message processing.

10. The method as recited in claim 5, wherein the queue client is selected based at least in part on a message size parameter for an individual one of the enqueued messages.

11. The method as recited in claim 5, further comprising:
deprovisioning individual ones of the pool of available queue clients based at least in part on a software licensing cost;
accumulating a plurality of additional messages at the plurality of queue servers; and
provisioning one or more additional queue clients to process individual ones of the additional messages, wherein the one or more additional queue clients are provisioned after the software licensing cost is warranted by a quantity or size of the plurality of additional messages.

12. The method as recited in claim 5, further comprising:
anticipating a receipt of a plurality of additional messages at the plurality of queue servers; and
in response to the anticipating, provisioning one or more additional queue clients to process individual ones of the additional messages having individual values for the strict order parameter, wherein the one or more additional queue clients are selected based at least in part on a respective message processing capability of the additional queue clients and a respective message processing throughput of the individual values for the strict order parameter.

13. A non-transitory computer-readable storage medium storing program instructions computer-executable to perform:
sending a plurality of messages to a plurality of queue servers based at least in part on a respective value for a strict order parameter for individual ones of the messages, wherein individual ones of the messages that share a respective strict order parameter are sent to a respective one of the queue servers;
enqueueing the plurality of messages at the plurality of queue servers, wherein individual ones of the plurality of messages that share a respective value for the strict order parameter are enqueued in a strict order based at least in part on time of receipt at the respective one of the queue servers; and
selecting, from a pool of available queue clients, a queue client to process messages for one or more values for the strict order parameter, wherein the queue client is selected based at least in part on a respective message processing capability of individual ones of the pool of available queue clients and a respective message processing throughput of the one or more values for the strict order parameter.

14. The non-transitory computer-readable storage medium as recited in claim 13, wherein the respective message processing capability is based at least in part on one or more hardware parameters and one or more performance metrics indicative of message processing performance.

15. The non-transitory method as recited in claim 13, wherein the queue client is selected based at least in part on cost optimization.

16. The non-transitory computer-readable storage medium as recited in claim 15, wherein the cost optimization comprises optimization of a respective software licensing cost at individual ones of the pool of available queue clients.

17. The non-transitory computer-readable storage medium as recited in claim 13, wherein the queue client is selected based at least in part on the selected queue client having available throughput for message processing.

18. The non-transitory computer-readable storage medium as recited in claim 13, wherein the queue client is selected based at least in part on a message size parameter for an individual one of the enqueued messages.

19. The non-transitory computer-readable storage medium as recited in claim 13, wherein the program instructions are further computer-executable to perform:
deprovisioning individual ones of the pool of available queue clients based at least in part on a software licensing cost;
accumulating a plurality of additional messages at the plurality of queue servers; and
provisioning one or more additional queue clients to process individual ones of the additional messages, wherein the one or more additional queue clients are provisioned after the software licensing cost is warranted by a quantity or size of the plurality of additional messages.

20. The non-transitory computer-readable storage medium as recited in claim 13, wherein the program instructions are further computer-executable to perform:
anticipating a receipt of a plurality of additional messages at the plurality of queue servers; and
in response to the anticipating, provisioning one or more additional queue clients to process individual ones of the additional messages having individual values for the strict order parameter, wherein the one or more additional queue clients are selected based at least in part on a respective message processing capability of the additional queue clients and a respective message processing throughput of the individual values for the strict order parameter.

* * * * *